United States Patent
Laroia et al.

(10) Patent No.: US 7,610,024 B2
(45) Date of Patent: *Oct. 27, 2009

(54) METHODS AND APPARATUS OF PROVIDING TRANSMIT AND/OR RECEIVE DIVERSITY WITH MULTIPLE ANTENNAS IN WIRELESS COMMUNICATION SYSTEMS

(75) Inventors: Rajiv Laroia, Basking Ridge, NJ (US); Junyi Li, Somerset, NJ (US); Sundeep Rangan, Jersey City, NJ (US); Murari Srinivasan, Palo Alto, CA (US); Frank A. Lane, Asbury, NJ (US); Prashanth Hande, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/284,285

(22) Filed: Nov. 21, 2005

(65) Prior Publication Data

US 2006/0099915 A1    May 11, 2006

Related U.S. Application Data

(63) Continuation of application No. 10/964,885, filed on Oct. 14, 2004, now Pat. No. 7,039,370.

(60) Provisional application No. 60/511,965, filed on Oct. 16, 2003.

(51) Int. Cl.
*H04B 7/06* (2006.01)

(52) U.S. Cl. ............... 455/101; 455/132; 455/562.1; 455/277.1

(58) Field of Classification Search ............... 455/101, 455/102, 132, 562.1, 277.1–277.4, 267, 272; 370/208, 347

See application file for complete search history.

(56) References Cited

U.S. PATENT DOCUMENTS 4,584,709 A    4/1986    Kneisel et al.

(Continued)

OTHER PUBLICATIONS

Alamouti: "A Simple Transmitter Diversity Technique for Wireless Communications", IEEE Journal on Selected Areas in Communication, vol. 16, pp. 1451-1458, Oct. 1998.

(Continued)

*Primary Examiner*—Philip J Sobutka
(74) *Attorney, Agent, or Firm*—Michael P. Straub; Milan I. Patel

(57) ABSTRACT

Transmit and/or receive diversity is achieved using multiple antennas. In some embodiments, a single transmitter chain within a wireless terminal is coupled over time to a plurality of transmit antennas. At any given time, a controllable switching module couples the single transmitter chain to one the plurality of transmit antennas. Over time, the switching module couples the output signals from the single transmitter chain to different transmit antennas. Switching decisions are based upon predetermined information, dwell information, and/or channel condition feedback information. Switching is performed on some dwell and/or channel estimation boundaries. In some OFDM embodiments, each of multiple transmitter chains is coupled respectively to a different transmit antenna. Information to be transmitted is mapped to a plurality of tones. Different subsets of tones are formed for and transmitted through different transmit chain/antenna sets simultaneously. The balance of tones allocated to the subsets for each antenna are changed as a function of predetermined information, dwell information, and/or channel condition feedback information.

14 Claims, 28 Drawing Sheets

U.S. PATENT DOCUMENTS

| | | | |
|---|---|---|---|
| 7,039,370 B2 * | 5/2006 | Laroia et al. | 455/101 |
| 2002/0061005 A1 * | 5/2002 | Lee et al. | 370/347 X |
| 2002/0181390 A1 * | 12/2002 | Mody et al. | 370/208 |

OTHER PUBLICATIONS

International Search Report - PCT/US04/034128 - International Search Authority -United States - Mar. 17, 2005.

International Preliminary Report on Patentability PCT/US04/034128-IB/WIPO Geneva, Switzerland, Apr. 18, 2006.

Written Opinion PCT/US04/034128, ISA/US Mar. 17 ,2005.

International Search Report - PCT/US04/034128 - International Search Authority -United States - Mar. 17, 2005.

Alamouti: "A Simple Transmitter Diversity Technique for Wireless Communications", IEEE Journal on Selected Areas in Communication, vol. 16, pp. 1451-1458, Oct. 1998.

* cited by examiner

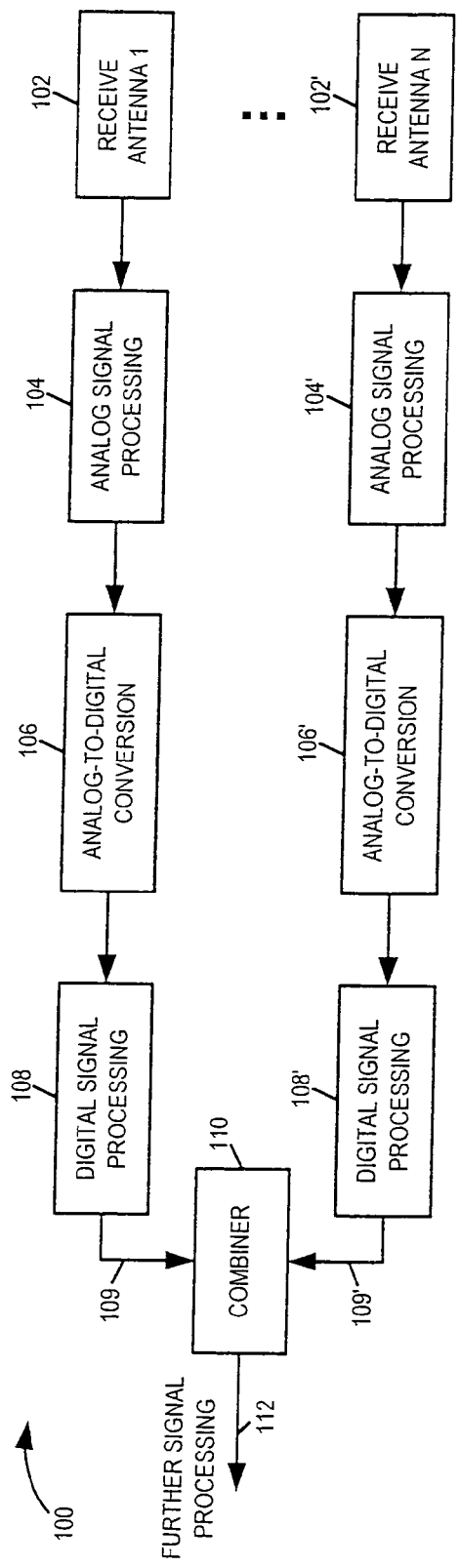
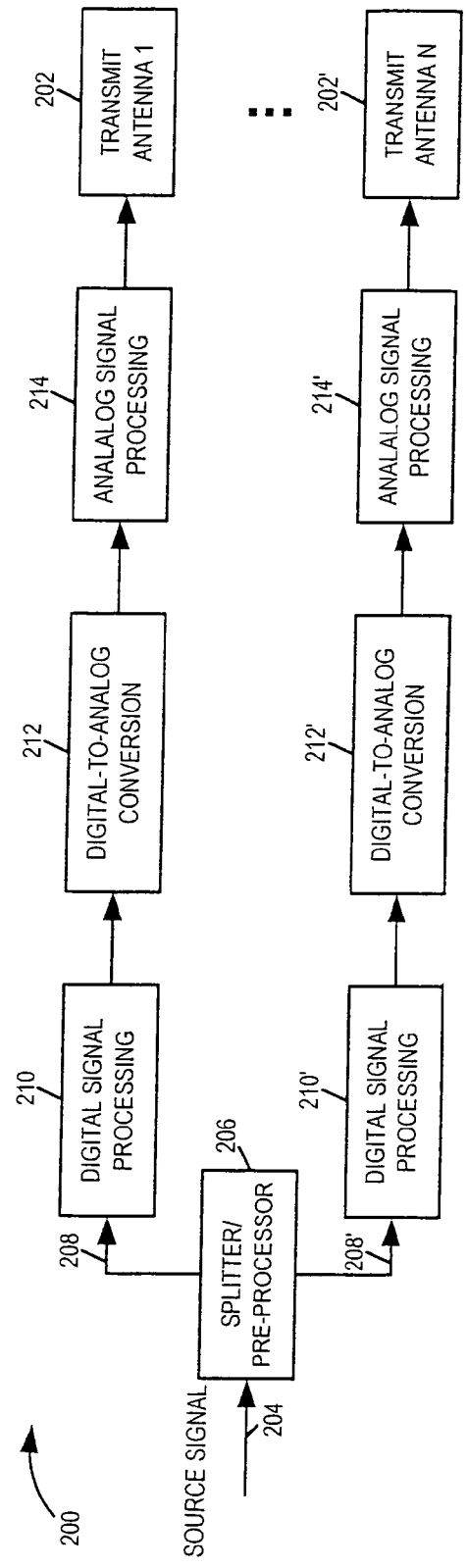

METHODS AND APPARATUS OF PROVIDING TRANSMIT AND/OR RECEIVE DIVERSITY WITH MULTIPLE ANTENNAS IN WIRELESS COMMUNICATION SYSTEMS

RELATED APPLICATIONS

The present application is a continuation of U.S. patent application Ser. No. 10/964,885 filed Oct. 14, 2004 now U.S. Pat. No. 7,039,370 which claims the benefit of U.S. Provisional Patent Application Ser. No. 60/511,965 filed Oct. 16, 2003.

FIELD OF THE INVENTION

The present invention relates to communications systems and, more particularly, to methods and apparatus for providing transmit and/or receive diversity with multiple antennas in wireless communications systems.

BACKGROUND OF THE INVENTION

Channel fading is a ubiquitous and fundamental characteristic of wireless communication systems. Fading deteriorates the link reliability of the wireless channel, thereby reducing system capacity and/or degrading user service experience. Diversity is a well-known principle that effectively combats wireless channel fading. The methods of achieving diversity include utilizing space, angle, polarization, frequency, time, and multipath. Diversity can be achieved at the transmitter and/or the receiver.

Consider the forms of diversity that can be realized by using multiple antennas at the transmitter and/or receiver of a wireless communication system. These are grouped under the categories of transmit and receive diversity respectively.

FIG. 1 illustrates a simplified diagram of a receiver 100 in a prior art wireless system that is equipped with multiple antennas (receive antenna 1 102, receive antenna N 102') and exploits receive diversity. In this receiver 100, the multiple antennas (102. 102') receive multiple versions of the same information-bearing signal. Assume that the wireless channel associated with any receive antenna is substantially statistically independent of the channel experienced by the other antennas. Then, the probability of each of the receive antennas being simultaneously faded is significantly smaller than that of any receive antenna being faded. Hence, the combined signal is much less likely to be faded, thereby improving the link reliability. In practice, the receive diversity gain is realized as follows. The signals received from the multiple receive antennas (102, 102') are first individually processed with separate receive chains, each of which typically includes an analog signaling processing block (104, 104'), an analog-to-digital conversion block (106, 106'), and a digital signal processing block (108, 108'), respectively. The processed signals (109, 109') are then combined in a combiner block 110. Combiner bock 110 may, for example, use selective combining or maximum ratio combining methods. The combiner 110 outputs signal 112, which may be subjected to further signal processing.

Similarly, FIG. 2 illustrates a simplified diagram of a transmitter 200 in a prior art wireless system equipped with multiple antennas (transmit antenna 1 202, transmit antenna N 202') that exploits transmit diversity. In the FIG. 2 transmitter 200 illustrated here, the same information-bearing signal, source signal 204, is first split and pre-processed by splitter pre-processor 206 to generate multiple transmit signals (208, 208'), which are correlated with each other. These multiple transmit signals (208, 208') are then individually passed through separate transmit chains including digital signal processing blocks (210, 210'), digital-to-analog conversion blocks (212, 212'), analog signal processing blocks (214, 214') and transmitted with multiple antennas (202, 202'), respectively.

Transmit diversity refers to the realization of diversity gain by sending multiple, correlated signals over a channel from the transmitter. Typically, transmit diversity techniques make use of multiple transmit antennas to transmit these correlated signals. Firstly, transmit diversity is not straightforward to realize, in general. Transmitting the same signal through multiple transmit antennas typically results in no diversity gain whatsoever.

One of the earliest transmit diversity techniques that was proposed is delay diversity, in which the transmitter sends multiple copies of the same information with different delays through different antennas. A more sophisticated version of this scheme which uses two transmit antennas was proposed by Alamouti described in S. M. Alamouti, "*A simple transmitter diversity scheme for wireless communications,*" *IEEE Journal on Selected Areas in Communication*, vol. 16, pp. 1451-1458, October 1998.

Let the signal that is to be communicated be denoted by S(t) where t is assumed to be a discrete time instant. In the Alamouti scheme, two consecutive symbols are blocked off and transmitted over two time instants using the two antennas. Let $X_1(t)$ and $X_2(t)$ represent the output signals from the two antennas respectively, which may be expressed as $$\begin{bmatrix} X_1(t) & X_1(t+1) \\ X_2(t) & X_2(t+1) \end{bmatrix} = \begin{bmatrix} S(t) & -S^*(t+1) \\ S(t+1) & S^*(t) \end{bmatrix}$$

Suppose that the time-varying channel responses from the two transmit antennas, e.g., two base station transmit antennas, to the receiver, e.g., a mobile receiver, are denoted by $h_1(t)$ and $h_2(t)$ respectively. For simplicity of explanation we can assume a flat channel but the more general case where the channel is frequency dependent can also be handled. If the channel coefficients are assumed to remain constant over two symbols, which is a mild assumption, the composite signal received by the mobile receiver can be represented by $$Y(t)=h_1X_1(t)+h_2X_2(t)+W(t)$$

$$Y(t+1)=h_1X_1(t+1)+h_2X_2(t+1)+W(t+1)$$

which may be rewritten in terms of the original signal S(t) as $$\begin{bmatrix} Y(t) \\ Y(t+1) \end{bmatrix} = \begin{bmatrix} h_1 S(t) + h_2 S(t+1) + W(t) \\ -h_1 S^*(t+1) + h_2 S^*(t) + W(t+1) \end{bmatrix}$$

or alternatively, $$\begin{bmatrix} Y(t) \\ Y^*(t+1) \end{bmatrix} = \begin{bmatrix} h_1 & h_2 \\ h_2^* & -h_1^* \end{bmatrix} \begin{bmatrix} S(t) \\ S(t+1) \end{bmatrix} + \begin{bmatrix} W(t) \\ W^*(t+1) \end{bmatrix}$$

If the channel responses from the two transmit antennas to the receiver are known, it is straightforward to invert the transmitter code construction and extract the transmitted signal by the following transformation:

$$\begin{bmatrix} \hat{S}(t) \\ \hat{S}(t+1) \end{bmatrix} = \begin{bmatrix} h_1^* & h_2 \\ -h_2 & h_1 \end{bmatrix} \begin{bmatrix} Y(t) \\ Y(t+1) \end{bmatrix}$$

$$= (|h_1|^2 + |h_2|^2) \begin{bmatrix} S(t) \\ -S(t+1) \end{bmatrix} + \text{noise}$$

which results in second-order diversity over a fading channel. The Alamouti scheme is simple, but requires the receiver to track the gains from each of the two transmit antennas separately, which normally requires two sets of pilots to be used. This is especially challenging in the cellular uplink, e.g., where a mobile device transmits to a base station receiver. Furthermore, the requirement of known transmit diversity techniques to use multiple transmitter chains, each of which normally includes both digital and analog signal processing blocks can be cost prohibitive in many applications.

In view of the above discussion, there is a need for improved methods and apparatus of achieving transmit and/or receive diversity in wireless communications systems. Methods and apparatus that achieve diversity while reducing the amount of signaling dedicated to pilots over known methods would be beneficial. Methods and apparatus that achieve diversity without the need for multiple transmit chains would also be beneficial.

SUMMARY

Methods and apparatus for achieving transmitter and/or receiver diversity in a wide variety of communications applications are described. In various embodiments, transmit and/or receive diversity is achieved using multiple antennas. In some embodiments, a single transmitter chain within a wireless terminal is coupled over time to a plurality of transmit antennas. At any given time, a controllable switching module couples the single transmitter chain to one the plurality of transmit antennas. Over time, the switching module couples the output signals from the single transmitter chain to different transmit antennas. Switching decisions are based upon predetermined information, dwell information, and/or channel condition feedback information. Switching is performed on some dwell and/or channel estimation boundaries. In some OFDM embodiments, each of multiple transmitter chains is coupled respectively to a different transmit antenna. Information to be transmitted is mapped to a plurality of tones. Different subsets of tones are formed for and transmitted through different transmit chain/antenna sets simultaneously. The balance of tones allocated to the subsets for each antenna are changed as a function of predetermined information, dwell information, and/or channel condition feedback information.

While described with regard to many possible OFDM implementations, the method and apparatus can be used with a wide variety of communications techniques including CDMA.

Numerous additional features, benefits and embodiments of the present invention are discussed in the detailed description which follows.

BRIEF DESCRIPTION OF THE FIGURES

FIG. 1 is a simplified diagram of receiver in a prior art wireless system equipped with multiple antenna that exploits receive diversity.

FIG. 2 is a simplified diagram of a transmitter in a prior art equipped with multiple antennas that exploits transmit diversity.

DETAILED DESCRIPTION OF THE INVENTION

Although the principle of diversity helps to improve the wireless link reliability, the use of multiple transmit and/or receive chains increases the cost and complexity of the transmitter and/or receiver. Typically, in a wireless communications system, there are many wireless terminals for each base station deployed. The wireless terminals may be, e.g., consumer owned and operated portable battery powered mobile devices such as cell phones or cellular data communication devices. The increased cost and complexity are particularly important considerations at the wireless terminal, e.g., mobile node, side. Various aspects and features of the present invention are directed to wireless systems equipped with multiple antennas that can achieve diversity with a minimal increase in cost and/or complexity.

Various aspects of providing transmit diversity, in accordance with the present invention, shall now be described. In accordance with various embodiments of the invention, transmit diversity can be achieved in a wireless communication system by employing a single transmit chain and by switching between multiple transmit antennas.

Figure 3:
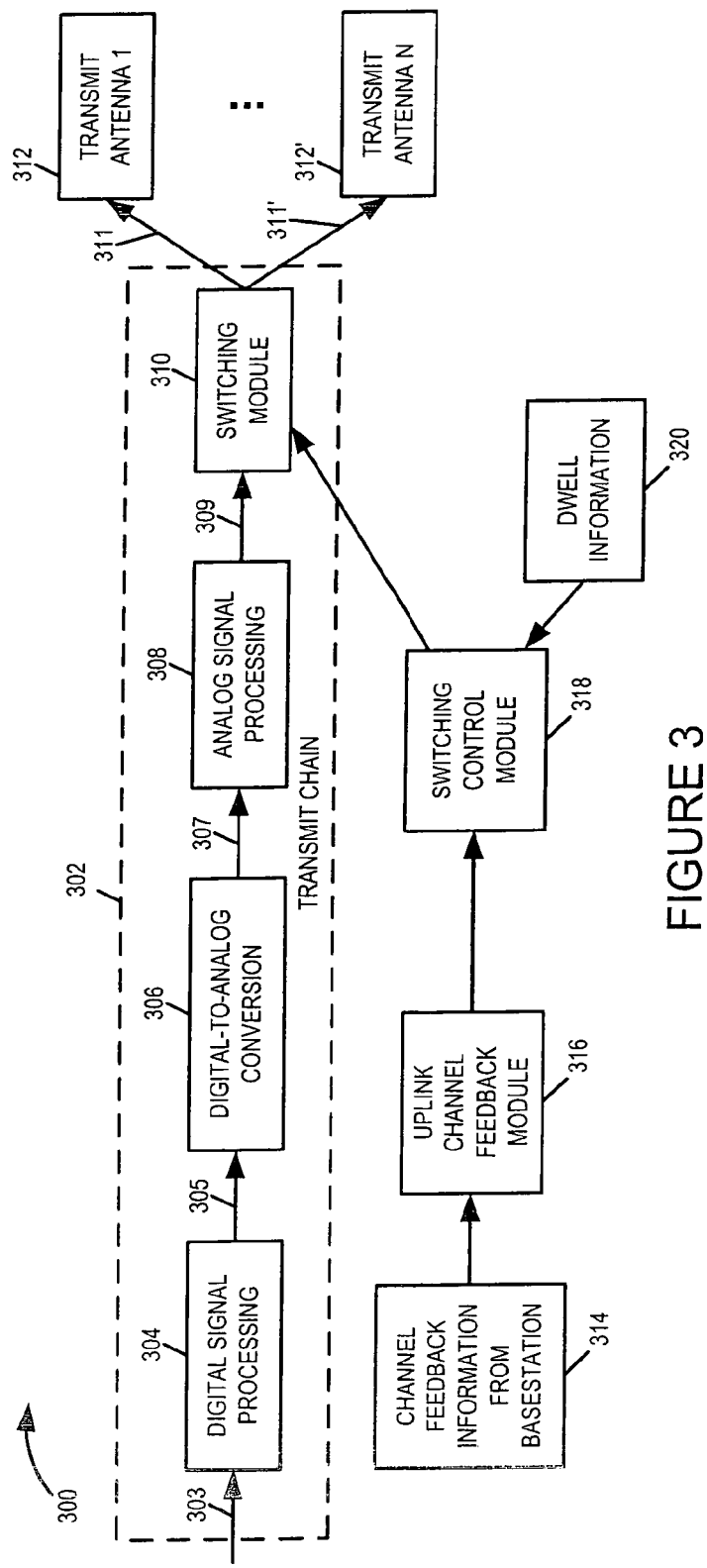
FIG. 3 is a drawing of an exemplary transmit chain and a plurality of transmit antennas, implemented in accordance with the present invention.

FIG. 3 is a drawing 300 including an exemplary transmit chain 302 in accordance with the present invention. The exemplary transmit chain 302 includes a digital signal processing block 304, a digital-to-analog conversion block 306, an analog signal processing block 308, and a switching module 310. An input signal 303 is input to the digital signal processing block 304. The digital signal processing block 304 encompasses and performs digital domain signal processing functions, such as encoding, modulation and digital filtering. The digital signal processing block 304 typically includes a baseband digital chain. An output digital signal 305 from the digital signal processing block 304 is input to the digital-to-analog conversion block 306. The digital-to-analog conversion block 306 converts digital signal 305 to analog signal 307, which becomes the input to the analog signal processing block 308. The analog signal processing block 308 encompasses and performs analog domain signal processing functions, such as up-conversion to carrier frequency, analog filtering and power amplification. The analog signal processing block 308 typically includes a baseband analog chain and RF analog chain. The output of the analog signal processing block 308 is then routed via switching module block 310 as output signal (311 or 311') and then transmitted through one of the plurality of transmit antennas (transmit antenna 1 312 or transmit antenna N 312'), respectively. The switching module block 310 determines which transmit antenna (312, 312') to be used at any given time. From time to time, the switching module block 310 chooses to use different transmit antennas (312, 312'), and directs the output 309 of the analog signal processing block 308 to the chosen transmit antenna (312 or 312').

The switching module 310 is controlled by signals received from a switching control module 318. Channel feedback information 314 from the base station is input to an uplink channel feedback module 316. The uplink channel feedback module 316 determines which transmit antenna (312, 312') results in better channel quality and forward that information to the switching control module 318. In addition, dwell information 320, e.g., dwell boundary information, is input to the switching control module 318. The switching control module can use the received information to make decisions regarding antenna selection. For example, the switching control module 318, can control switching on dwell boundaries. In some embodiments, the switching control module 318 alternates between antennas as a function of the dwell number and the number of antennas. In some embodiments, the switching control module can choose, based upon channel quality estimate information, to either use the antenna associated with the better channel quality exclusively or use that antenna more often than others. In some embodiments, an uplink channel feedback module 314 is not used and switching is controlled based upon dwell information 320 without using channel feedback information 314.

Note that although there are multiple physical transmit antennas (312, 312'), the transmitter 300 uses a single transmit chain 302. This is very different from the prior art system illustrated in FIG. 2, which employs multiple transmit chains, each used for one transmit antenna (202, 202').

Let N denote the number of the transmit antennas. Let $\{H_k, k=1, \ldots, N\}$ denote the wireless channel response from each of the transmit antennas to the receiver. The transmit antennas are, in some embodiments, spatially arranged in such a manner that the ensemble of channel responses, $\{H_k\}$, are substantially independent. By switching from one transmit antenna to another, the effective channel response from the transmitter to the receiver varies among $\{H_k\}$, therefore realizing transmit diversity. For example, suppose N=2. Suppose that the switching block chooses to use the transmit antenna 1 from time t1 to t2, and to use the transmit antenna 1 from time t2 to t3. Suppose that a coding block is transmitted in the time interval from t1 to t3. Then, part of the coding block experiences the channel response $H_1$ and the remaining experiences the channel response $H_2$. Hence, assuming $H_1$ and $H_2$ are independent, the coding block may see the benefit of the second-order diversity. This is especially true when low code rates (below ½ in this case) are used.

In various embodiments of the present invention, it is useful for the receiver to be aware of the time instants when the transmitter switches antennas. This may be important, for example, when the receiver maintains different channel estimates corresponding to the different antennas, and evolves the appropriate channel estimate in any particular antennas transmit duration.

For the sake of illustration, consider the invention in the context of the spread spectrum orthogonal frequency division multiplexing (OFDM) multiple-access system. Note that the present transmit diversity technique is applicable to other systems, e.g., code division multiple access (CDMA) systems, as well.

Figure 4:
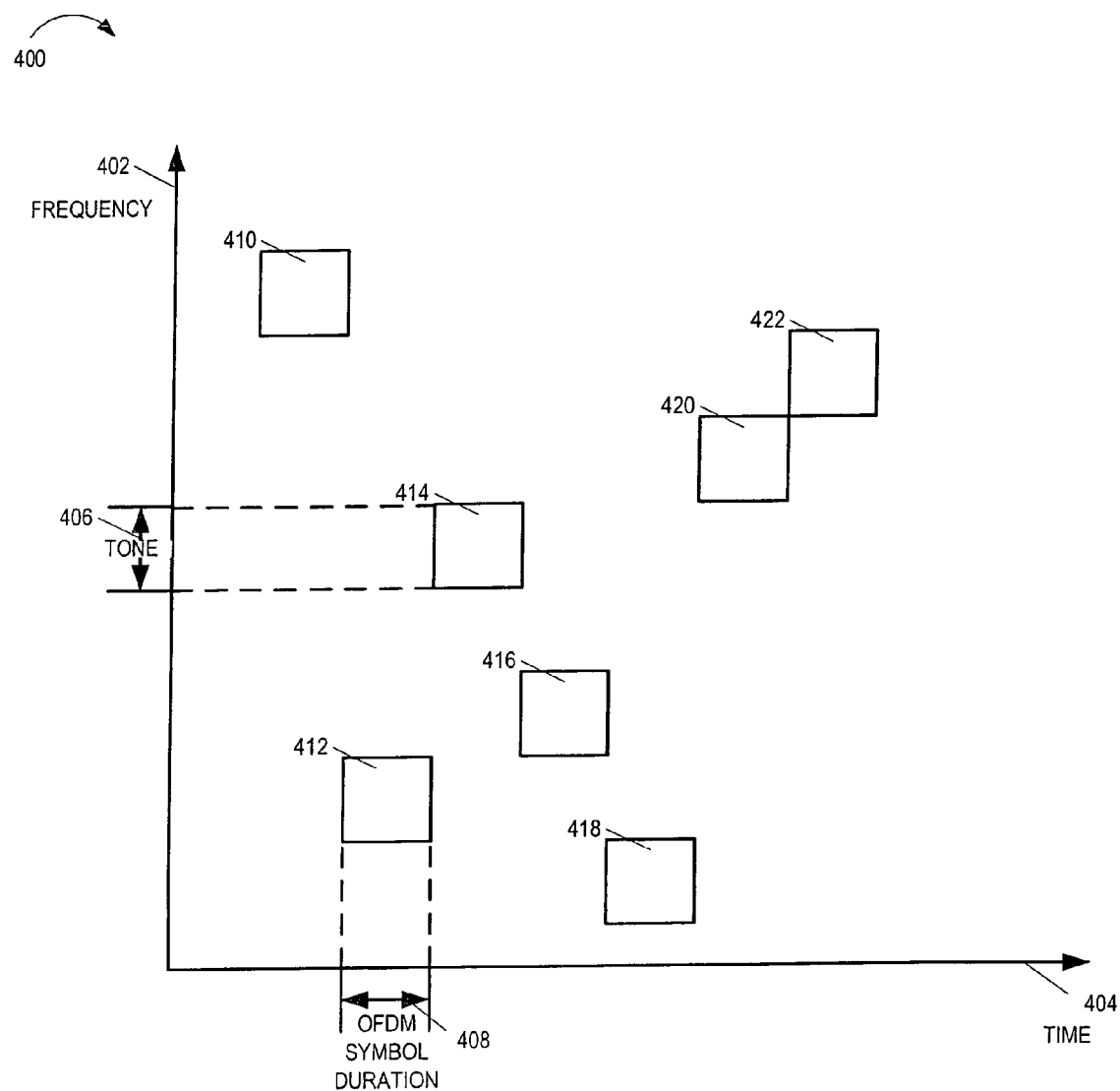
FIG. 4 is a drawing illustrating exemplary downlink tone hopping in an exemplary OFDM system.

In the exemplary OFDM system, tones hop to realize spread spectrum advantages. In the downlink, from the base station to the wireless terminal, tones hop every OFDM symbol. Each logical tone is mapped to a different physical tone and this mapping is varied on every OFDM symbol boundary as illustrated in FIG. 4. FIG. 4 is a drawing 400 of frequency on the vertical axis 402 vs time on the horizontal axis 404 illustrating exemplary OFDM downlink tone hopping. The basic unit on the frequency axis is a physical tone 406, while the basic unit on the horizontal axis 404 is an OFDM symbol duration 408. An exemplary logical tone being hopped to different physical tones and being varied on every OFDM symbol boundary is illustrated by the sequence of squares (410, 412, 414, 416, 418, 420, and 422) which illustrates changes in the physical tone position on each OFDM symbol boundary. This hopping facilitates that a coding block including some subset of logical tones is spread across the available frequency band.

Figure 5:
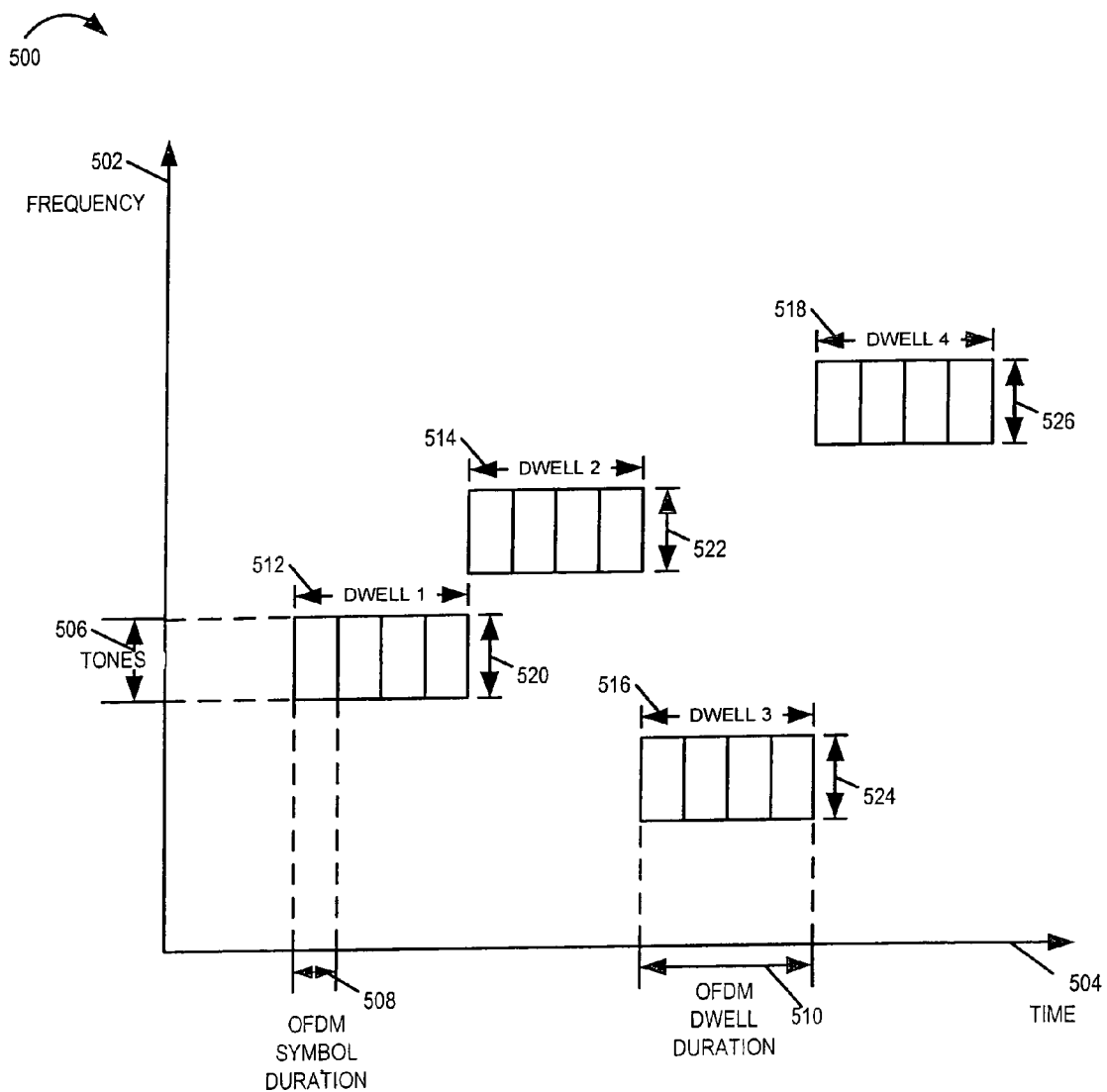
FIG. 5 is a drawing illustrating exemplary uplink tone hopping based on dwells in an exemplary OFDM system.

In the uplink, from the wireless terminal to the base station, every logical tone is mapped to a physical tone with the mapping held constant for a few OFDM symbol periods. This duration is known as a dwell period. The process of uplink hopping across dwell periods is illustrated in FIG. 5. FIG. 5 is a drawing 500 illustrating frequency on the vertical axis 502 vs time on the horizontal axis 504 and is used for illustrating exemplary uplink tone hopping. The basic unit on the vertical axis 502 is the physical tone; area 506 shows several, e.g., two, exemplary contiguous physical tones. The basic unit on the horizontal axis 504 is an OFDM symbol duration 508. Each OFDM dwell duration 510 includes four successive OFDM symbol durations. In other embodiments, a dwell duration may include a different number of OFDM symbol durations, e.g., seven OFDM symbol durations. FIG. 5 shows four successive OFDM dwell intervals: dwell 1 512, dwell 2 514, dwell 3 516, and dwell 4 518. As shown in FIG. 5, logical tones are mapped to physical tones with the mapping held constant for four successive OFDM symbol durations; represented by tone set 520 during dwell 1 512, tone set 522 during dwell 2 514, tone set 524 during dwell 3 516, and tone set 526 during dwell 4 518.

Figure 6:
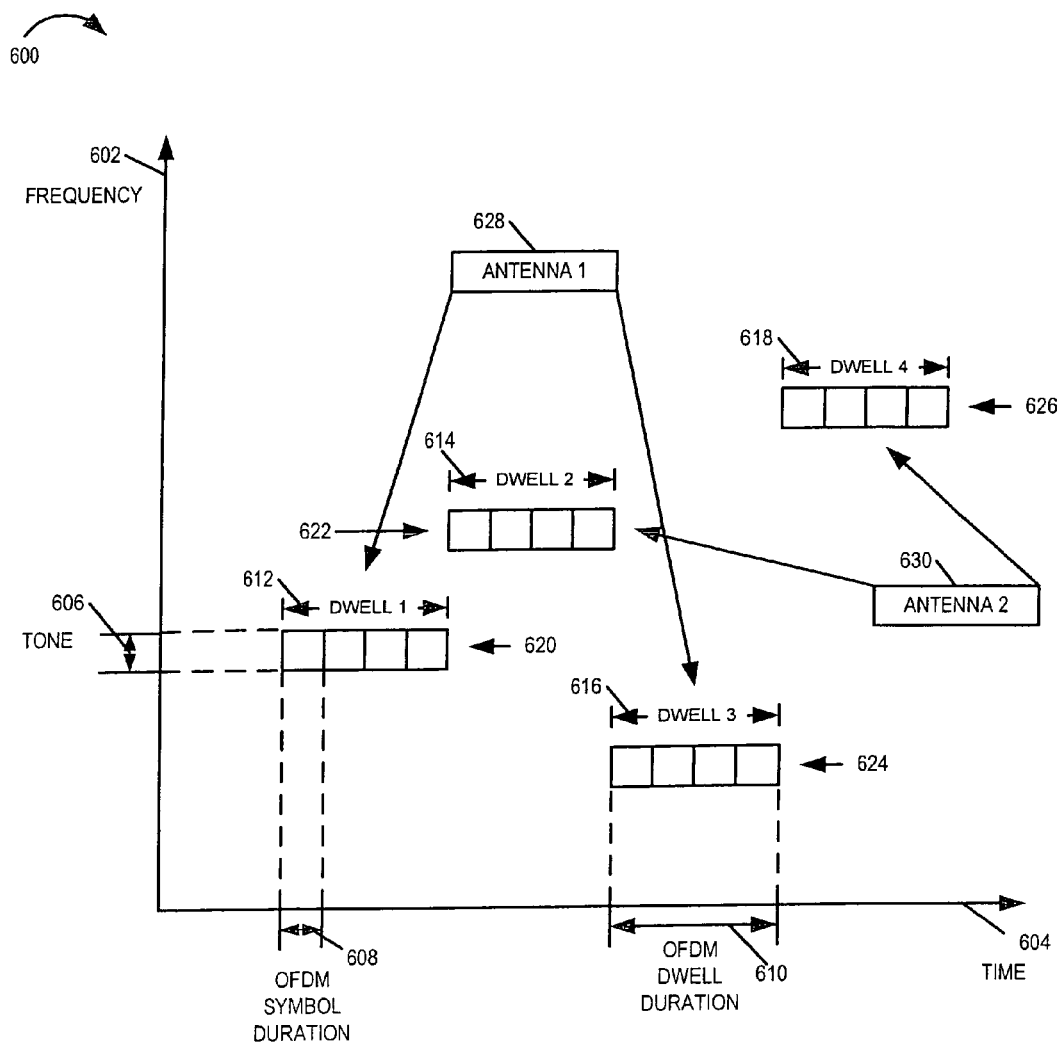
FIG. 6 is a drawing illustrating exemplary uplink tone hopping and antenna switching for an exemplary OFDM uplink system in which a wireless terminal uses two different transmit antennas to achieve transmit diversity, in accordance with the present invention.

Various embodiments of the present invention can be used at the transmitter of the wireless terminal to achieve transmit diversity in the cellular uplink. An exemplary embodiment, in accordance with the present invention, switches the transmit antennas at the dwell boundaries of the uplink signal. That is, suppose dwell 1 512 and dwell 2 514 are two successive dwells. Then, the switching block chooses to use one transmit antenna in dwell 1 512 and to switch to another transmit antenna in dwell 2 514. The transmitter may switch the antenna once every dwell or once every few dwells. For example, FIG. 6 shows a drawing 600 illustrating exemplary uplink tone hopping and antenna switching for an exemplary OFDM uplink system with two transmit antennas. Drawing 600 includes a graph of frequency on vertical axis 602 vs time on horizontal axis 604. The basic unit of frequency is tone 606. The basic unit of time is OFDM symbol duration 608, and an OFDM dwell duration 610 includes four successive OFDM symbol durations 608. Logical tones are frequency hopped to physical tones and the hopping changes on dwell boundaries. For example, during (dwell 1 612, dwell 2 614, dwell 3 616, dwell 4 618), physical tone (620, 622, 624, 626) is used. In FIG. 6, the signal in the odd dwells (612, 616) is transmitted through antenna 1 628 and that in the even dwells (614, 618) is transmitted through antenna 2 (630). Assume that the base station receiver does not assume any channel coherence from one dwell to another. For example, the receiver may not carry out channel estimation across dwells. Then, switching transmit antennas at the dwell boundaries does not affect the operations carried out at the receiver. Indeed, in this situation, the receiver may not even be aware of the use of the present transmit diversity invention. If a coding block is transmitted over a time interval of a few dwells, then the coding block may see the benefit of second-order diversity, especially for low code rates.

Figure 7:
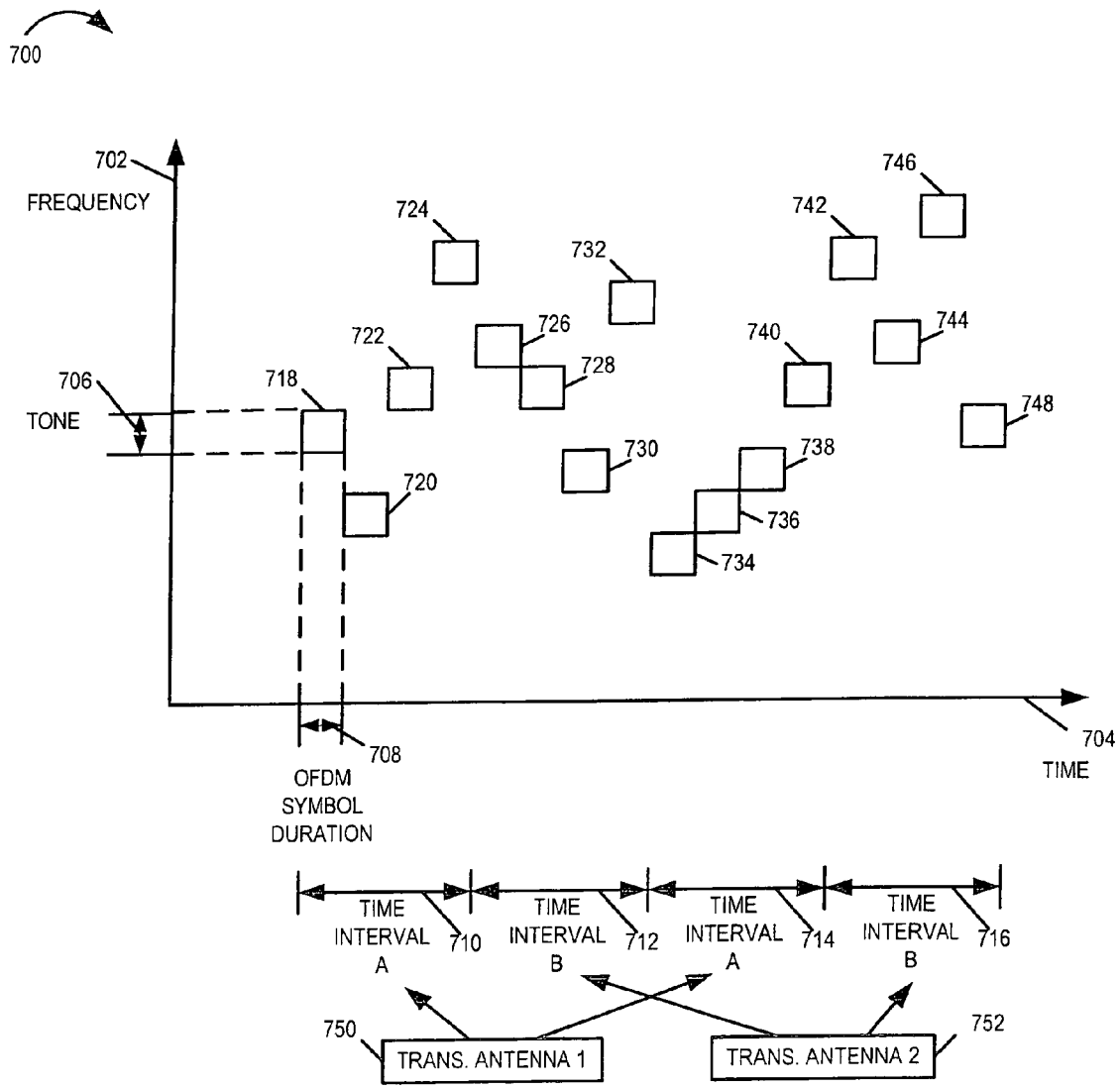
FIG. 7 is a drawing illustrating exemplary downlink tone hopping and antenna switching for an exemplary OFDM downlink system with two transmit antennas, in accordance with the present invention.

Similarly, the various features of the invention can be used at the base station to achieve transmit diversity in the cellular downlink. In some embodiments of the present invention, the base station switches the transmit antennas once every few OFDM symbols, and the wireless terminal knows when antenna switching occurs. FIG. 7 shows a drawing 700 illustrating exemplary downlink tone hopping and antenna switching for an exemplary OFDM downlink system with two transmit antennas. Drawing 700 includes a graph of frequency on vertical axis 702 vs time on horizontal axis 704. The basic unit of frequency is tone 706. The basic unit of time is OFDM symbol duration 708. Logical tones are frequency hopped to physical tones and the hopping changes for successive OFDM symbol durations. FIG. 7 illustrates an exemplary logical tone for one OFDM symbol duration being hopped to different physical tones as illustrated by the sequence of squares (718, 720, 722, 724, 726, 728, 730, 732, 734, 736, 738, 740, 742, 744, 746, 748). FIG. 7 may correspond to an exemplary OFDM downlink system with two transmit antennas (antenna 1 750 and antenna 2 752), where switching antennas occurs once every 4 OFDM symbols. For example, the signal in time intervals (710, 714) denoted A is transmitted through antenna 1 750, and that in time intervals (712, 716) denoted B is transmitted through antenna 2 752. The wireless terminal receiver maintains two separate channel estimates. The first channel estimate is trained and used in the time intervals A (710, 714), while the second channel estimate is trained and used in the time intervals B (712, 716).

In the above exemplary descriptions, the switching block at the transmitter chooses each of the transmit antennas substantially equally. Now suppose, in some embodiments of the present invention, that the receiver feeds back some indication of the channel quality to the transmitter. Then in a slow time-varying environment, the transmitter can find out which transmit antenna results in better channel quality and choose to either use that antenna exclusively or use that antenna more often than others.

As a practical matter, in radio frequency (RF) transmit circuits, there is usually a transient response associated with switching antennas. The use of the cyclic prefix in the exemplary OFDM system can effectively absorb the antenna transient response and maintain the basic properties of the OFDM system, such as orthogonality.

This invention realizes transmit diversity gains without the need for multiple transmit chains. There is no explicit pre-processing of the signal involved, e.g., in space-time codes, which requires the transmitted information signals over the different antennas to be different. There are other advantages conferred by various embodiments of the present invention. Most transmit diversity schemes require the use of different pilots in the signals transmitted by the different antennas in order that the receiver may track the channel responses separately. Various embodiments of the present invention obviate the need for multiple pilots since the same information signal is transmitted through different antennas at different times.

Various aspects of providing receive diversity, in accordance with the present invention, shall now be described. In accordance with the invention, receive diversity can be achieved in a wireless communication system by employing a single receive chain and by switching between multiple receive antennas.

Figure 8:
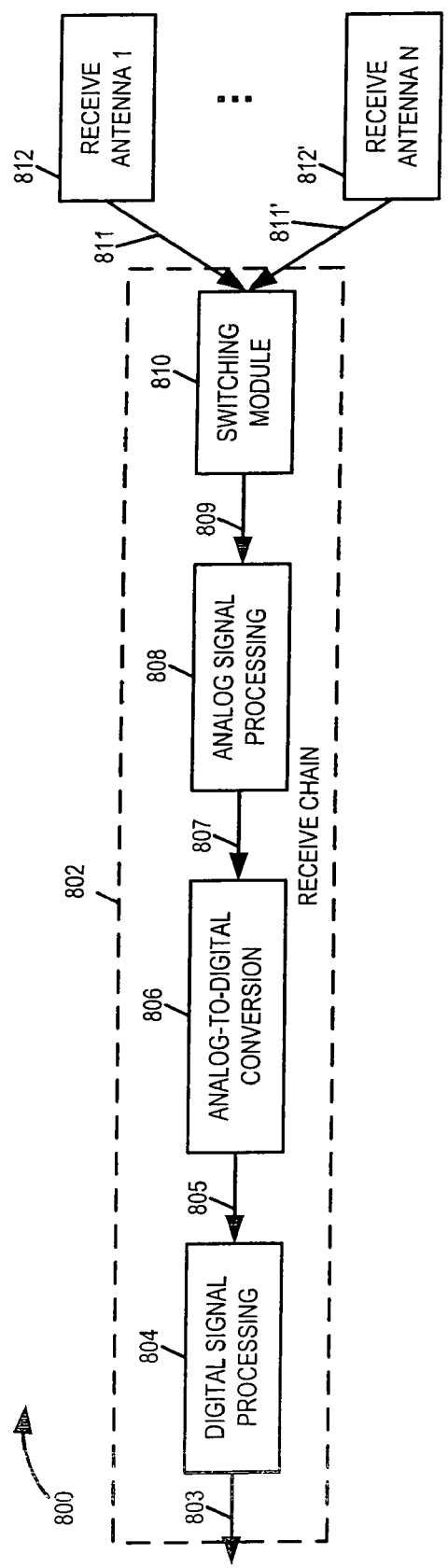
FIG. 8 is a drawing of an exemplary receive chain and a plurality of receive antennas, in accordance with the present invention.

FIG. 8 shows a drawing 800 of an exemplary receive chain 802 and a plurality of receive antennas (receive antenna 1 812, receive antenna N), in accordance with the invention. Exemplary receive chain 802 includes a switching module 810, an analog signal processing block 808, an analog-to-digital conversion block 806, and a digital signal processing block 804. The switching module block 810 determines which receive antenna (812, 812') to be used at any given time. For time to time, the switching module block 810 chooses to use different receive antennas, and directs signal (811, 811') from the chosen receive antenna (812, 812'), respectively, to the input 809 of the analog signal processing block 808. The input 809 of the analog signal processing block 808 can come from one of the receive antennas (812, 812'). The analog signal processing block 808 encompasses and performs analog domain signal processing functions, analog filtering, low-noise amplification, and down-conversion to baseband. The analog signal processing block 808 typically includes baseband analog chain and a RF analog chain. The output of the analog signal processing block 808 is signal 807. The analog-to-digital-conversion block 806 converts the output 807 of the analog signal processing block 808 to a digital signal 805, which becomes the input of the digital signal processing block 804. The digital signal processing block 804 encompasses and performs digital domain signal processing functions, such as digital filtering, decoding, and demodulation. The digital signal processing block 804 typically includes a baseband digital chain. The output of digital signal processing block 804 is digital signal 803.

Note that although there are multiple receive antennas (812, 812'), the wireless system has a single receive chain 802. This is very different from the prior art system illustrated in FIG. 1, which employs multiple receive chains, each used for one receive antenna.

Various features of the present invention can be used at the wireless terminal to achieve downlink receive diversity. In an exemplary embodiment, an exemplary wireless terminal, with two receive antennas, switches the receive antennas once every few OFDM symbols. This embodiment is very similar to the embodiment of this invention which switches transmit antennas at the base station, which is shown in FIG. 7. In particular, the signal in time intervals A (710, 714) is received through receive antenna 1 812, and that in time intervals B (712, 716) is received through antenna 2 812'. The wireless terminal receiver maintains two separate channel estimates, trained and used in the time intervals A and B, respectively.

Similarly, features of the invention can be used at the base station to achieve uplink receive diversity. An exemplary embodiment is to switch the receive antennas at the dwell boundaries of the uplink signal. The embodiment is very similar to that which employs switching of transmit antennas at the wireless terminal transmitter, which is shown in FIG. 6. In particular, consider an exemplary base station with two receive antennas; the signal in the odd dwells (612, 616) is received through receive antenna 1 812 and that in the even dwells (614, 618) is received through receive antenna 2 812'. Assuming that the receiver does not assume any channel coherence from one dwell to another, switching receive antennas at the dwell boundaries does not affect the operations carried out at the receiver.

In the above description, the switching module block 810 chooses each of the receive antennas substantially equally. This switching may be under processor control or preconfigured to occur in a specific manner or sequence. Now suppose that the receiver estimates the channel quality. Then, the receiver can find out which receive antenna results in better channel quality and choose to either use that antenna exclusively or use that antenna more often than others.

Note that this invention may be used in combination with other methods of realizing diversity. For example, consider a wireless system in which the transmitter at the wireless terminal uses two switched antennas as described in this invention. The base station receiver uses traditional maximal ratio combining with two antennas. Together, this realizes fourth-order diversity in the cellular uplink.

Tone-splitting shall now be described in the context of the present invention. The orthogonality properties of tones in exemplary spread spectrum OFDM (orthogonal frequency division multiplexing) multiple-access systems enable a unique method of obtaining transmit diversity gains. Consider drawing 900 of FIG. 9, which illustrates an exemplary OFDM symbol 904 including multiple tones (tone 0 906, tone 1 908, tone 2 910, tone 3 912, tone 4 914, tone 5 916, tone 6 918, tone 7 920) being transmitted through two antennas (antenna 1 922, antenna 2 926) as signals (924, 928), respectively. The tones of the symbol which are shaded (908, 912, 916, 920) are transmitted through transmit antenna 1 922, while those marked with clear boxes (906, 910, 914, 918) are transmitted using transmit antenna 2 926. This may allow second-order transmit diversity, especially for low code-rates since the coded block is distributed across several OFDM symbols. Half the modulation symbols in the coded block are transmitted through each of the antennas (922,926). Extensions of this transmit diversity method to multiple transmit antennas are straightforward.

Figure 9:
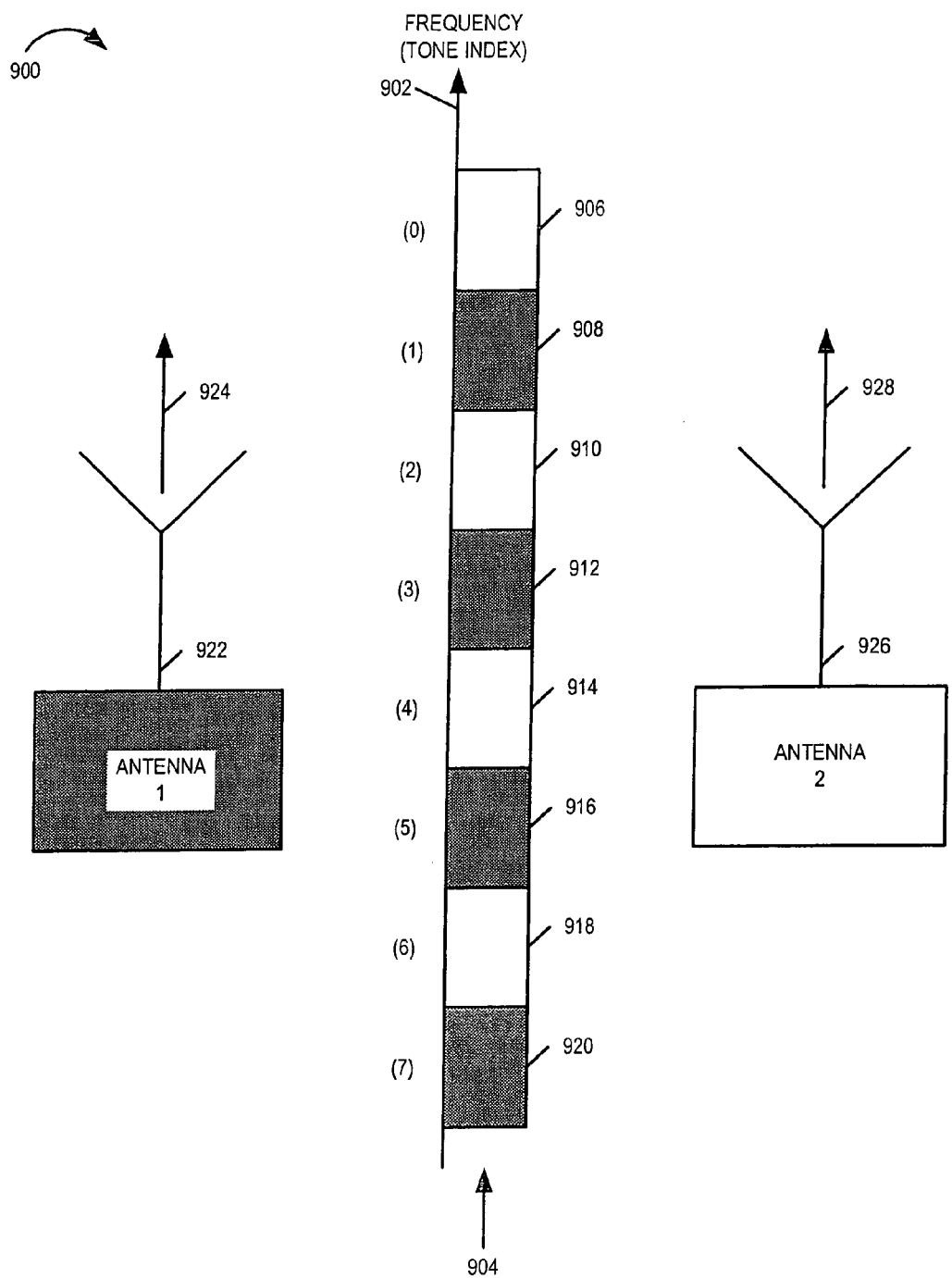
FIG. 9 is a drawing which illustrates an exemplary OFDM symbol including multiple tones, the multiple tones split between two transmit antennas, the multiple tones being transmitted simultaneously, in accordance with the present invention.
Figure 10:
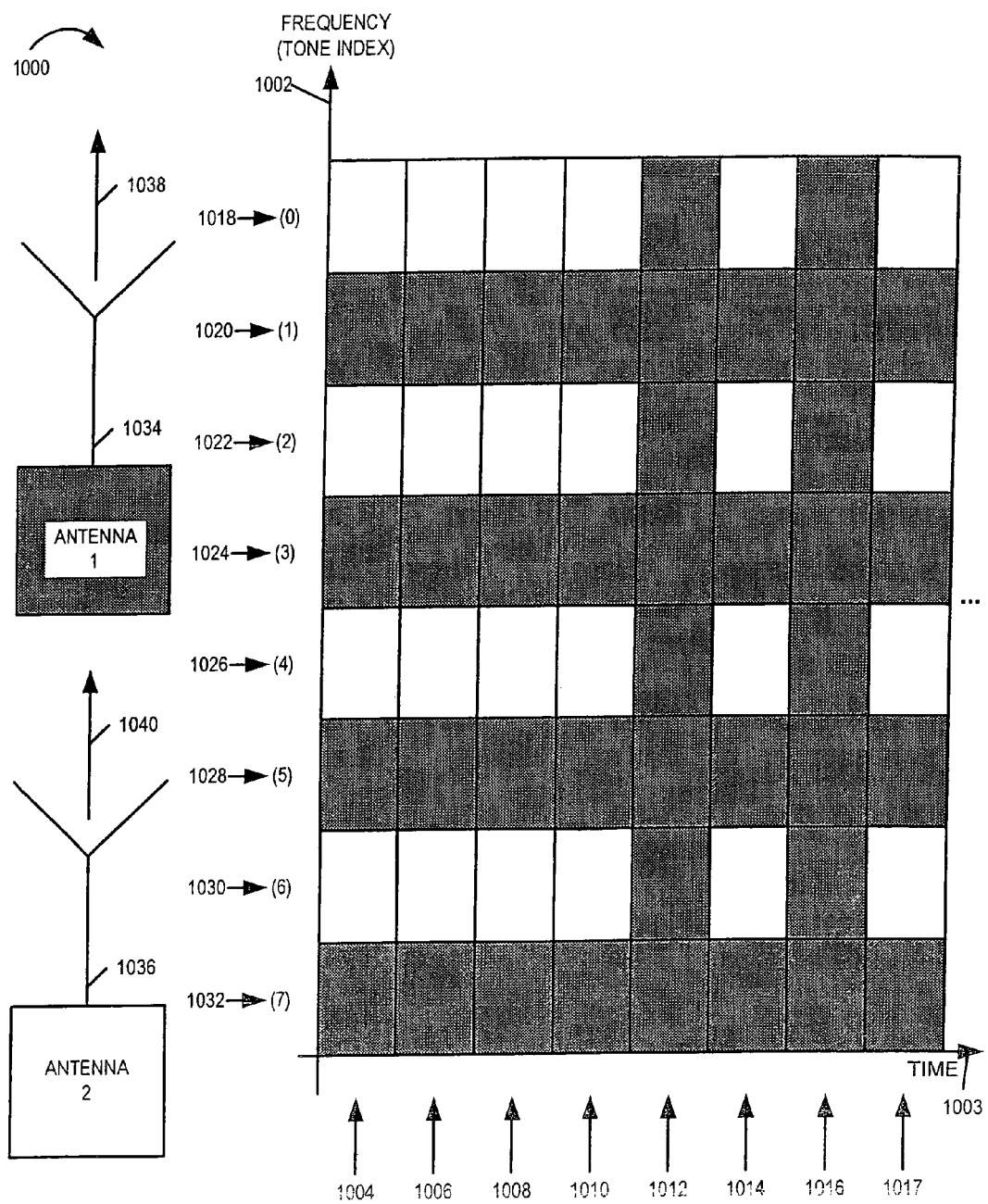
FIG. 10 illustrates an exemplary variation of the tone-splitting illustrated in FIG. 9, in accordance with the present invention, including: changes in the tone-splitting over time, a full allocation of tones to first antenna and a zero allocation of tones to a second antenna, and repetitive assignment of tone splitting.

Drawing 1000 of FIG. 10 illustrates a variation of the tone-splitting described in FIG. 9, in accordance with the present invention. FIG. 10 includes a plot of frequency, represented by tone index number ranging from 0 . . . 7, on the vertical axis 902 vs time on the horizontal axis 1003. The basic units of the time axis are OFDM symbol times. Exemplary OFDM symbols (1004, 1006, 1008, 1010, 1012, 1014, 1016, 1017) each include multiple tones (tone 0 1018, tone 1 1020, tone 2 1022, tone 3 1024, tone 4 1026, tone 5 1028, tone 6 1030, tone 7 1030) being transmitted through two antennas (antenna 1 1034, antenna 2 1036) as signals (1038, 1040), respectively. The tones of the each OFDM symbol which are shaded are transmitted through transmit antenna 1 1034, while those identified with clear boxes are transmitted using transmit antenna 2 1036. Each tone in each OFDM symbol transmits a modulation symbol conveying encoded information. Initially, for the first four OFDM symbol time intervals (1004, 1006, 1008, 1010), half of the modulation symbols are transmitted through antenna 1 1034 and half through antenna 2 1036. Then, the communicating device decides to emphasize antenna 1 1034. For example, feedback information to the communications device may have indicated that the channel from antenna 1 to a receiver is better than the channel from antenna 2 to a receiver, e.g., based upon received power levels and/or based upon ack/nak information. The communications device changes the number of tones assigned to each antenna. During interval 1012, antenna 1 1034 receives the full set of tones, while antenna 2 receives 0 tones to use for transmission. During the next interval 1014, each antenna receives half of the tones to use for transmission. This pattern of alternating between tone allocation duty cycles repeats until a decision is made to change the balance between antennas 1034, 1036. In some embodiments, the basic unit of time is an interval comprising several consecutive OFDM symbol times. In some embodiments, e.g., where the communications device is a wireless terminal and the communications device transmits uplink signals to a base station, the basic unit of time is a dwell comprising several consecutive OFDM symbol times.

Figure 11:
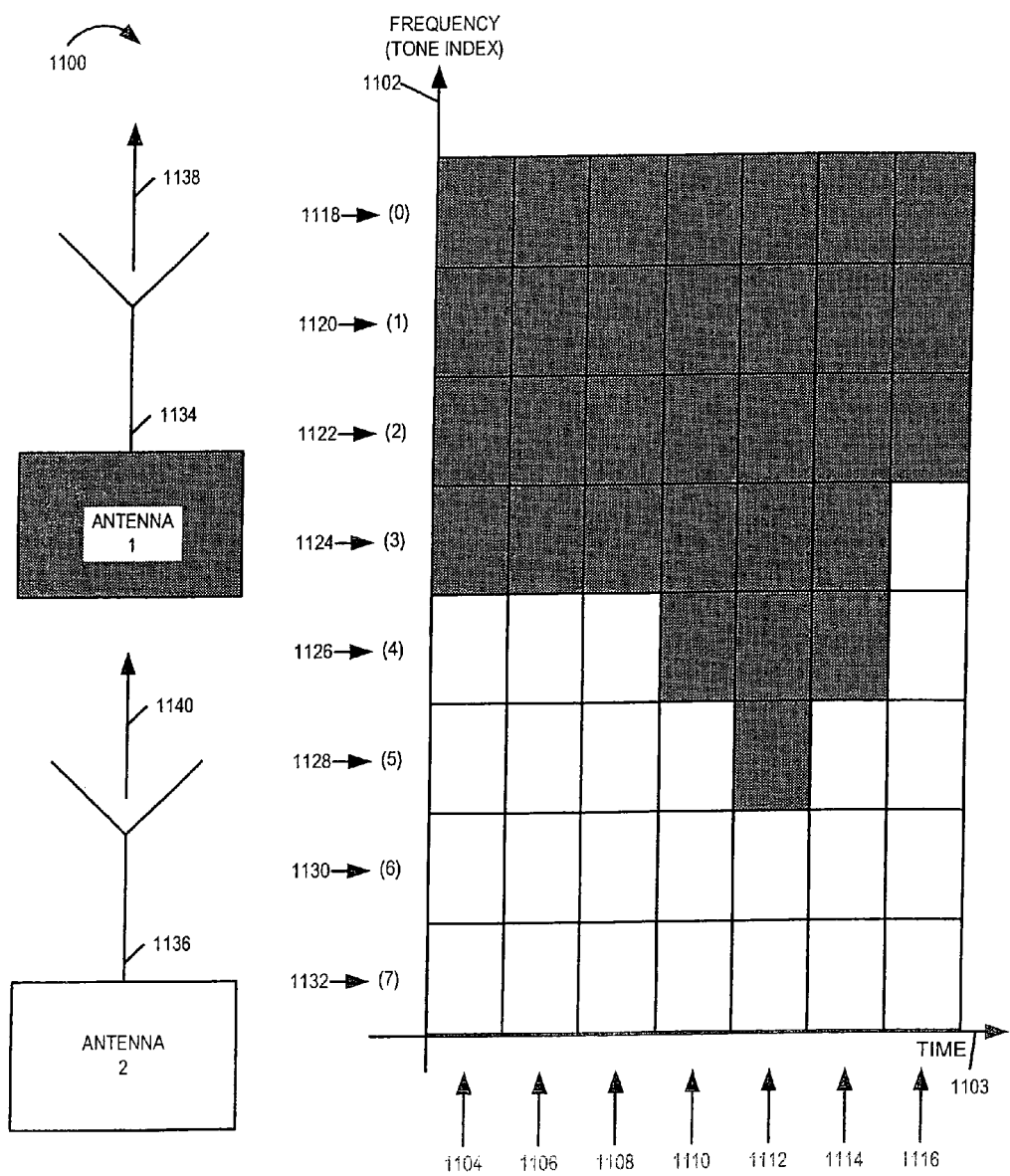
FIG. 11 illustrates another exemplary variation of the tone-splitting illustrated in FIG. 9, in accordance with the present invention, is which the tone-splitting is varied in steps as function of channel quality feedback information.

Drawing 1100 of FIG. 11 illustrates another variation of the tone-splitting described in FIG. 9, in accordance with the present invention. FIG. 11 includes a plot of frequency, represented by tone index number ranging from 0 ... 7, on the vertical axis 1102 vs time on the horizontal axis 1103. The basic units of the time axis are OFDM dwells. Exemplary OFDM dwells (1104, 1106, 1108, 1110, 1112, 1114, 1116) each include multiple tones (tone 0 1118, tone 1 1120, tone 2 1122, tone 3 1124, tone 4 1126, tone 5 1128, tone 6 1130, tone 7 1132) being transmitted through two antennas (antenna 1 1134, antenna 2 1136) as signals (1138, 1140), respectively. The tones of the each OFDM dwell which are shaded are transmitted through transmit antenna 1 1134, while those identified with clear boxes are transmitted using transmit antenna 2 1136. Each tone in each OFDM dwell transmits a set of modulation symbol, e.g., one modulation symbol for each OFDM symbol time interval in the dwell, the modulation symbols conveying encoded information. Initially, for the first three OFDM dwells (1104, 1106, 1108), half of the modulation symbols are transmitted through antenna 1 1134 and half through antenna 2 1136. Then, the communicating device decides to emphasize antenna 1 1134, and changes the tone balance to slightly favor antenna 1 for dwell 1110. For example, feedback information to the communications device may have indicated that the channel from antenna 1 1134 to a base station receiver is better than the channel from antenna 2 1136 to the base station receiver, e.g., based upon received power levels and/or based upon ack/nak information. The communications device continues to monitor feedback information and make adjustments to the tone balance between antennas as observed by the changes from exemplary dwells 1110 to 1112, 1112 to 1114, and 1114 to 1116. In some embodiments, changes are not performed on dwell boundaries, but rather on a given number of OFDM symbol times or on channel condition measurement boundaries.

Figure 12:
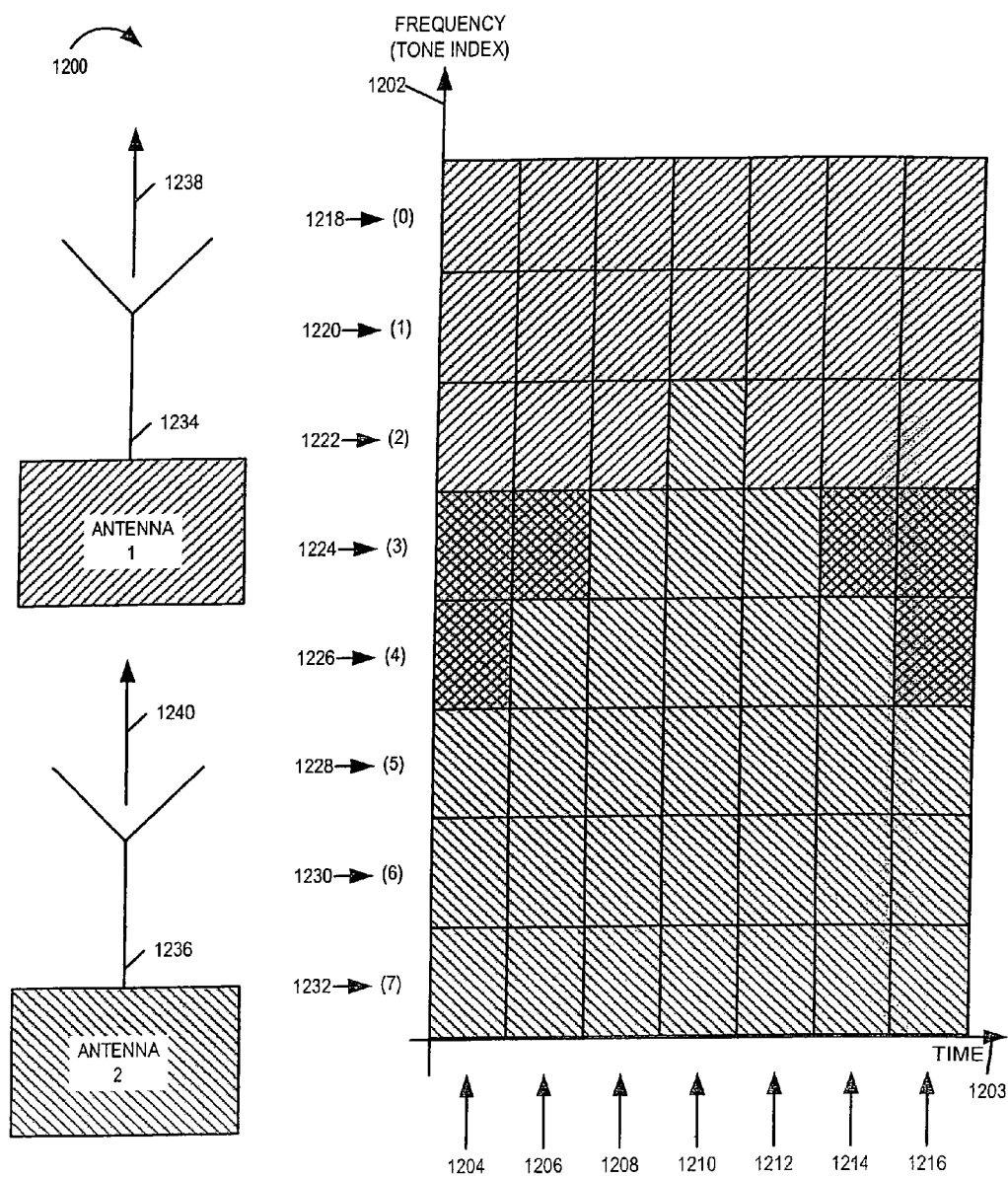
FIG. 12 illustrates another exemplary variation of the tone-splitting illustrated in FIG. 9, in accordance with the present invention, in which the tone subsets associated with each antenna at any give time interval may be overlapping and the number of tones associated with each subsets changes as a function of channel quality feedback information.

In the examples illustrated in FIGS. 9 and 10, the tones assigned to the antennas are mutually exclusive, at any given time. However, in various embodiments of the present invention, the subsets of tones assigned to each antenna can include overlapping subsets of tones. Drawing 1200 of FIG. 12 illustrates another variation of the tone-splitting described in FIG. 9, in accordance with the present invention. FIG. 12 includes a plot of frequency, represented by tone index number ranging from 0 ... 7, on the vertical axis 1202 vs time on the horizontal axis 1203. The basic units of the time axis are OFDM dwells. Exemplary OFDM dwells (1204, 1206, 1208, 1210, 1212, 1214, 1216) each include multiple tones (tone 0 1218, tone 1 1220, tone 2 1222, tone 3 1224, tone 4 1226, tone 5 1228, tone 6 1230, tone 7 1232) being transmitted through two antennas (antenna 1 1234, antenna 2 1236) as signals (1238, 1240), respectively. The tones of the each OFDM dwell which are shaded by diagonal lines increasing from left to right are transmitted through transmit antenna 1 1234, while those tones shaded by diagonal lines decreasing from left to right are transmitted using transmit antenna 2 1236. Note that in exemplary OFDM dwells 1204 and 1216, representing a balance condition between the two antennas (1234, 1238), three tones (tone 0 1218, tone 1 1220, and tone 2 1222) are transmitted using antenna 1 1234 exclusively, three tones (tones 5 1228, tone 6 1230, and tone 7 1232) are transmitted using antenna 2 1236 exclusively, and 2 tones (1224 and 1226) are transmitted by both of the antennas (1234 and 1236). Each tone in each OFDM dwell is used to transmit a set of modulation symbols, e.g., one modulation symbol for each OFDM symbol time interval in the dwell, the modulation symbols conveying encoded information. As the communicating device decides to emphasize antenna 2 1236, it changes the tone balance to favor antenna 2 as observed in dwells 1206, 1208, 1210, 1212, and 1214. The amount of tone imbalance is adjusted, e.g., from dwell to dwell. For example, feedback information to the communications device may have indicated that the channel from antenna 2 to a receiver is better than the channel from antenna 1 to a receiver, e.g., based upon received power levels and/or based upon ack/nak information, and the degree of channel quality difference is used to decide the level of tone imbalance. In some embodiments, changes are not performed on dwell boundaries, but rather on a given number of OFDM symbol times or on channel condition measurement boundaries.

Although tone hopping has not been illustrated in the examples of FIGS. 10-12, for simplicity of illustration, it is to be understood that in many embodiments the tones are hopped from one OFDM symbol duration to the next OFDM symbol duration on the downlink or from one dwell to the next dwell on the uplink. In addition, the tones associated with one transmit antenna at any one given time may form a subset of tones, the subset of tones being a disjoint set of tones. This method of realizing transmit diversity, by employing tone splitting techniques, uses multiple transmit chains.

Figure 13:
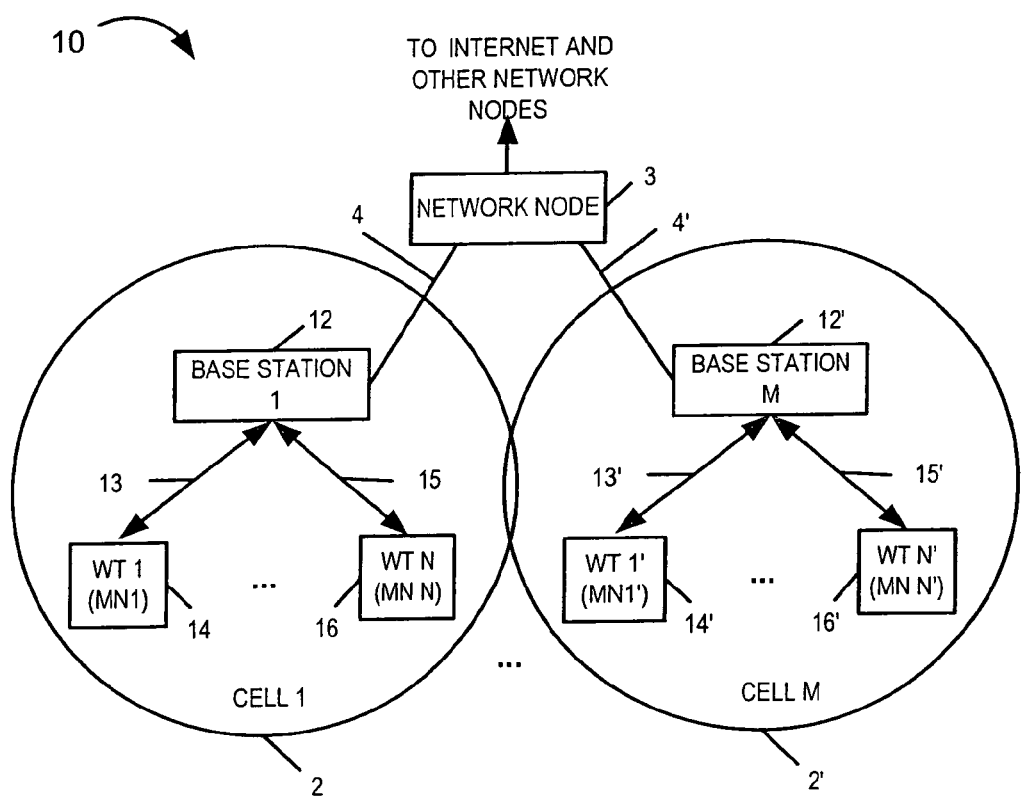
FIG. 13 illustrates an exemplary communications system implemented in accordance with the present invention and using methods of the present invention.

FIG. 13 illustrates an exemplary communications system 10 implemented in accordance with the invention, e.g., to achieve benefits of transmit and/or receive diversity using multiple antennas or antenna elements. Exemplary system 10 includes a plurality of cells (cell 1 (2), cell M (2')). Each cell (cell 1 (2), cell M (2')) represents a wireless coverage area for a base station (BS 1 (12), BS 2 (12')), respectively. System 10 also includes a network node 3 coupled to the base stations (BS 1 (12), BS 2 (12')) via network links (4, 4'), respectively. The network node 3, e.g., a router, is also coupled to the Internet and other network nodes via network link 5. The network links (4, 4', 5) may be, e.g., fiber optic links. Each cell includes a plurality of wireless terminals that are coupled to the cell's base station via wireless links, and if the wireless terminals are mobile devices they may move throughout the system 10. In cell 1 (2), multiple wireless terminals (WT 1 (14), WT N (16)), shown as mobile nodes (MN 1 (14) through MN N (16)), communicate with base station 1 (12) through the use of communication signals (13, 15), respectively. In cell M (2'), multiple wireless terminals (WT 1' (14'), WTN' (16')), shown as mobile nodes (MN 1' (14') through MN N' (16')), communicate with base station M (12') through the use of communication signals (13', 15'), respectively. Each mobile terminal may correspond to a different mobile user and are therefore sometimes referred to as user terminals. The signals (13, 15, 13', 15') may be, e.g., orthogonal frequency division multiplexing (OFDM) signals. In some embodiments the signals (13, 15, 13', 15') may be, e.g., code division multiple access (CDMA) signals. The base stations (12, 12') and wireless terminals (MN1, MN N, MN 1', MN N') (14, 16, 14', 16') each implement the method of the present invention. Thus, signals (13, 15, 13', 15') include signals of the type discussed in this application, which are transmitted in accordance with the invention.

Figure 14:
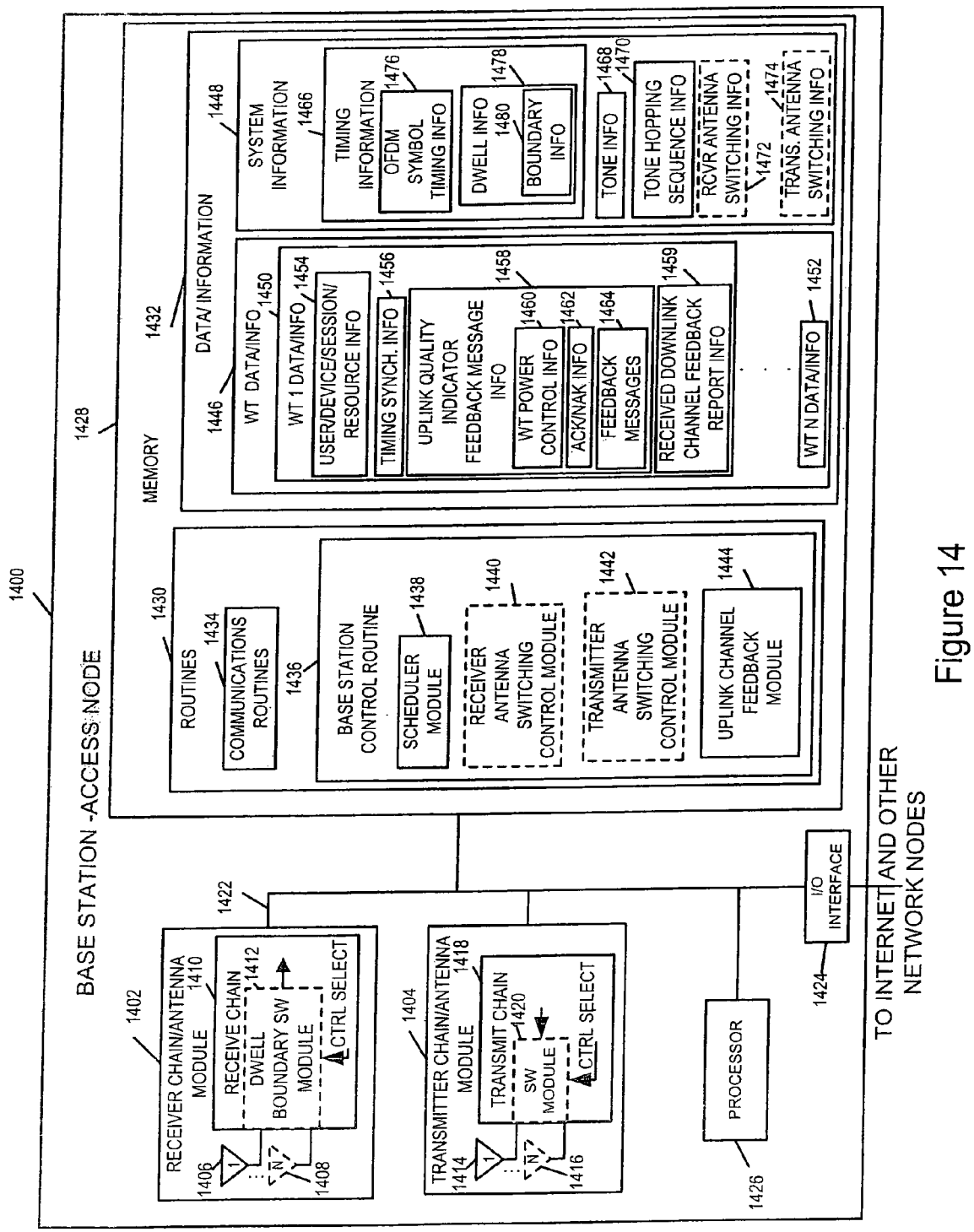
FIG. 14 illustrates an exemplary base station, implemented in accordance with the present invention, which may use dwell boundary antenna switching.

FIG. 14 illustrates an exemplary base station—access node 1400, implemented in accordance with the invention. Base station 1400 may be any of the exemplary base stations 12, 12' of FIG. 13. The base station 1400 includes receiver chain/antenna module 1402 and transmitter chain/antenna module 1404. The receiver chain/antenna module 1402 may be implemented similarly to or the same as shown in FIG. 8. The transmitter chain/antenna module 1404 may be implemented similarly to that shown in FIG. 3, but with switching control a function of OFDM timing structure information, predetermined information, and/or downlink channel feedback information from WTs. The receiver chain/antenna module 1402 includes a receive antenna or antenna element 1406 and a receive chain 1410. Module 1402, in some embodiments, includes multiple antennas or antenna elements (receive antenna 1 1406, receive antenna N 1408) and its receiver chain 1410 includes a dwell boundary controllable switching module 1412, e.g. switching circuitry. The transmitter chain/antenna module 1404 includes a transmit antenna or antenna element 1414 and a transmitter chain 1418. In some embodiments, module 1404 includes multiple antennas or antenna elements (transmit antenna 1 1414, transmit antenna N 1416) and its transmitter chain 1418 includes a controllable switching module 1420. The receiver module 1402 receives uplink signals from WTs including uplink signals transmitted from different WT transmit antennas or antenna elements of the same WT during different dwells. The transmitter module 1404 transmits downlink signals to the WTs including channel quality indicator feedback signals indicative of the received WT uplink signals. The modules 1402, 1404 are coupled by a bus 1422 to an I/O interface 1424, processor 1426, e.g., CPU, and memory 1428. The I/O interface 1426 couples the base station 1400 to the Internet and to other network nodes, e.g., routers, other base stations, AAA nodes, etc. The memory 1428 includes routines 1430 and data/information 1432. The processor 1426 executes the routines 1430 and uses the data/information 1432 in memory 1428 to cause the base station 1400 to operate in accordance with the invention.

Routines 1430 includes communications routines 1434 used for controlling the base station 1400 to perform various communications operations and implement various communications protocols. The routines 1430 also includes a base station control routine 1436 used to control the base station 1400 to implement the steps of the method of the present invention. The base station control routine 1436 includes a scheduler module 1438 used to control transmission scheduling and/or communication resource allocation, e.g., the assignment of uplink and downlink segment to WTs. Base station control routine 1436 also includes, in some embodiments, e.g., those including dwell boundary switching module 1412 and multiple receive antennas (1406, 1408), a receiver antenna switching control module 1440. Base station control routines 1436 also includes, in some embodiments, e.g., those including switching module 1420 and multiple transmit antennas (1414, 1416), a transmitter antenna switching control module 1442. The switching devices 1412 in this receiver chain 1410 and 1420 in the transmitter chain 1418, when implemented, are responsive to control signals generated by the processor 1426 when operating under direction of these modules (1440, 1442), respectively. The control signals cause switching between antennas or antenna elements in accordance with the invention. The receiver antenna switching control modules 1440 may use the data/information 1432 including the uplink quality indicator feedback information 1458, dwell information 1478, and receiver antenna switching information 1472 in making antenna switching decisions. The transmitter antenna switching control module 1442 may use the data/information 1432 including the OFDM symbol timing information 1476, received downlink channel feedback report information 1459, and transmitter antenna switching information 1474 in making antenna switching decisions.

Base station control routine 1436 also includes uplink channel feedback module 1444 which controls the evaluation of received uplink signals, generation, and transmission of channel quality indicator feedback signals such as feedback messages 1464 including WT power control feedback information 1460 and transmission acknowledgment/negative acknowledgement (ack/nak) feedback information 1462 indicating the success or failure in receipt of an uplink signal or signals.

Memory 1428 also includes data/information 1432 used by communications routines 1434 and control routine 1436. Data/information 1432 includes WT data/information 1446 and system information 1448. WT data/information 1446 includes a plurality of sets of WT information (WT 1 data/information 1450, WT N data/information 1452). WT 1 data/information 1450 includes user/device/session/resource information 1454, timing synchronization information 1456, uplink quality indicator feedback message information 1458, and received downlink channel feedback report information 1459. User/device/session/resource information 1454 includes user/device identification information, session information such as peer node information and routing information, and resource information such as uplink and downlink traffic channel segments assigned by the scheduler 1438 to WT1. Timing synchronization information 1456 includes information to synchronize WT1 timing with respect to BS timing, e.g., adjustment information to compensate for propagation delays. Uplink quality indicator feedback message information 1458 includes WT power control information 1460, ack/nak information 1462, and feedback messages 1464. Received downlink channel feedback report information 1459 includes information obtained from a received downlink channel feedback report transmitted by WT1 in response to downlink pilot broadcast signals transmitted by BS 1400. System information 1448 includes timing information 1466, tone information 1468, tone hopping sequence information 1470, optionally receiver antenna switching information 1472, and optionally transmitter antenna switching information 1474. Timing information 1466 includes OFDM symbol timing information, e.g., the time interval to transmit an OFDM symbol, synchronization information relative to the OFDM symbol intervals, timing information corresponding to grouping of OFDM symbol intervals such as superslots, beaconslots, and ultraslots, and/or timing information corresponding to fixed number of OFDM symbol intervals for transmission before switching between transmit antennas or antenna elements. Timing information 1466 also includes dwell information 1478, e.g., the grouping of a number of successive OFDM symbol intervals in which the logical to physical tone hopping is held constant during that interval for uplink signals. The tones used for uplink signaling are hopped differently from one dwell to the next dwell according to an uplink hopping sequence. Dwell information 1478 includes dwell boundary information 1480. The dwell boundary information 1478, in accordance with the invention, determines the time at which the WT can perform transmitter antenna switching. In some embodiments, the BS receiver module 1402 also performs dwell boundary switching operations between antennas and uses dwell boundary information 1480. Tone information 1468 includes sets of tones used for uplink and downlink signals, and subsets of tones assigned to specific segments at specific times. Tone hopping sequence information 1470 includes downlink tone hopping sequence information, e.g., where the tones are frequency hopped for successive OFDM symbol times and uplink tone hopping sequence information, e.g., where the tones are frequency hopped for successive dwells. Receiver antenna switching information 1472 includes information such as criteria, predetermined switching sequences, antenna element utilization information, and antenna element control information used by the receiver antenna switching control module 1440. Transmitter antenna switching information 1474 includes information such as criteria, predetermined switching sequences, antenna element utilization information, and antenna element control information used by the transmitter antenna switching control module 1442.

Figure 20:
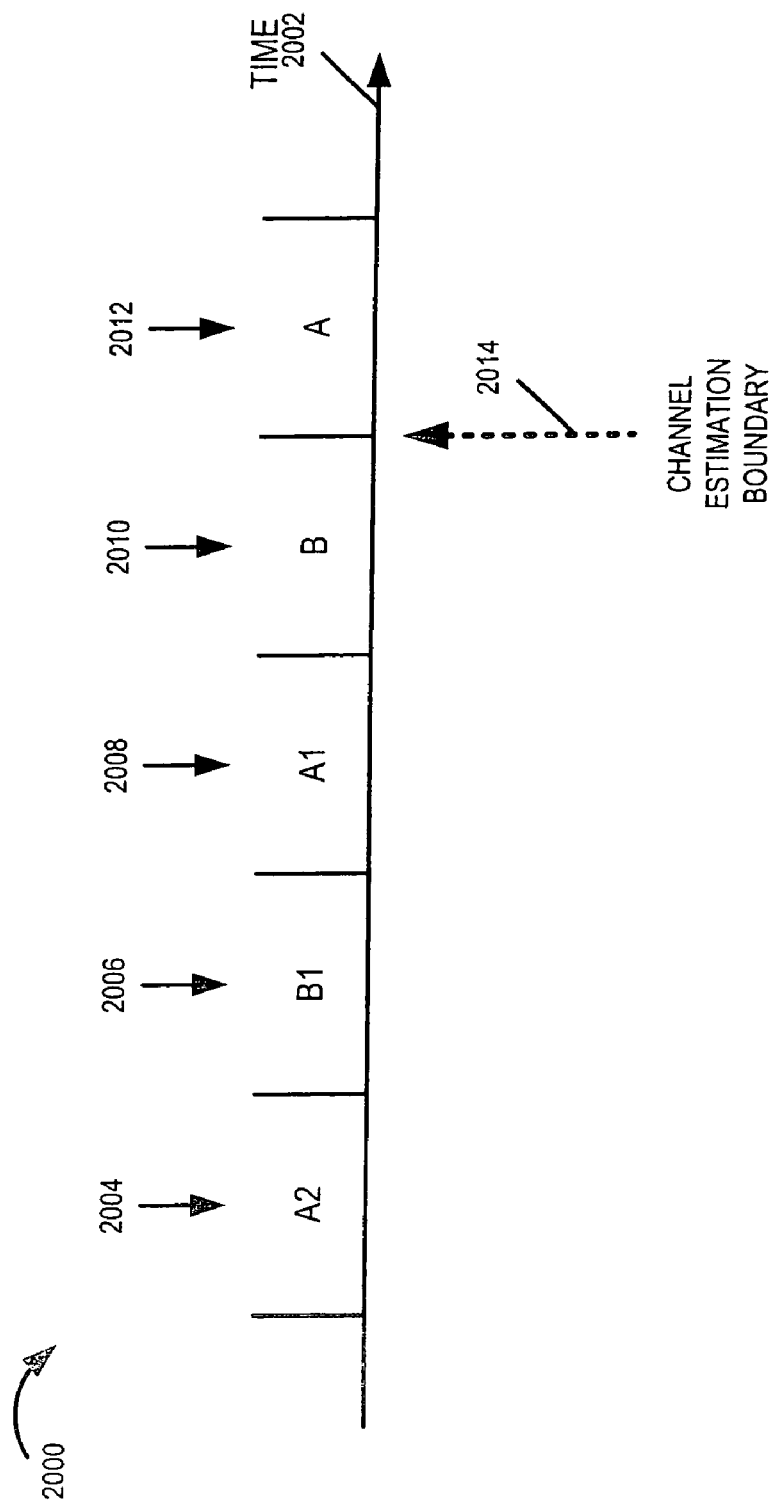
FIG. 20 is a drawing illustrating time divided into a sequence of time intervals by an exemplary base station receiver, which maintains separate channel estimations from one time interval to another, in accordance with the present invention.

In some systems, the base station receiver estimates the uplink channel of a wireless terminal in order to demodulate the signal received from that wireless terminal. The operation of channel estimation often depends on the structure of the received signal. Take an OFDM system as an example, where the tones of the uplink signal hop every few OFDM symbols. From one hop to another, the frequency location of tones may be assumed to be randomized. In such a case, the base station receiver may assume that the channel estimation changes dramatically from one hop to another, and as a result, may discard the memory of the channel estimation in a previous hop and carry out the channel estimation operation starting from the scratch during a new hop. In the case of an exemplary, CDMA system, the base station receiver may divide the time into a sequence of time intervals, as shown in FIG. 20, and maintain separate channel estimation from one time interval to another. Drawing 2000 of FIG. 20 shows a horizontal axis 2002 representing time which has been divided into an exemplary sequence of time intervals: A2 2004, B1 2006, A1 2008, B 2010, A 2012. For example, the channel estimation of time interval A 2012 is not based on the signal received in time interval B 2010. In this case, the time instant between time intervals A and B is called the channel estimation boundary 2014. In one embodiment, the channel estimation of time interval A 2012 may be independent of the received signal in any of the preceding time intervals, in which case, the channel estimation is solely based on the signal received in time interval A 2012. In another embodiment, the channel estimation of time interval A 2012 may be based on the received signal in the preceding time intervals A1 2008, A2 2004, and so on.

Figure 15:
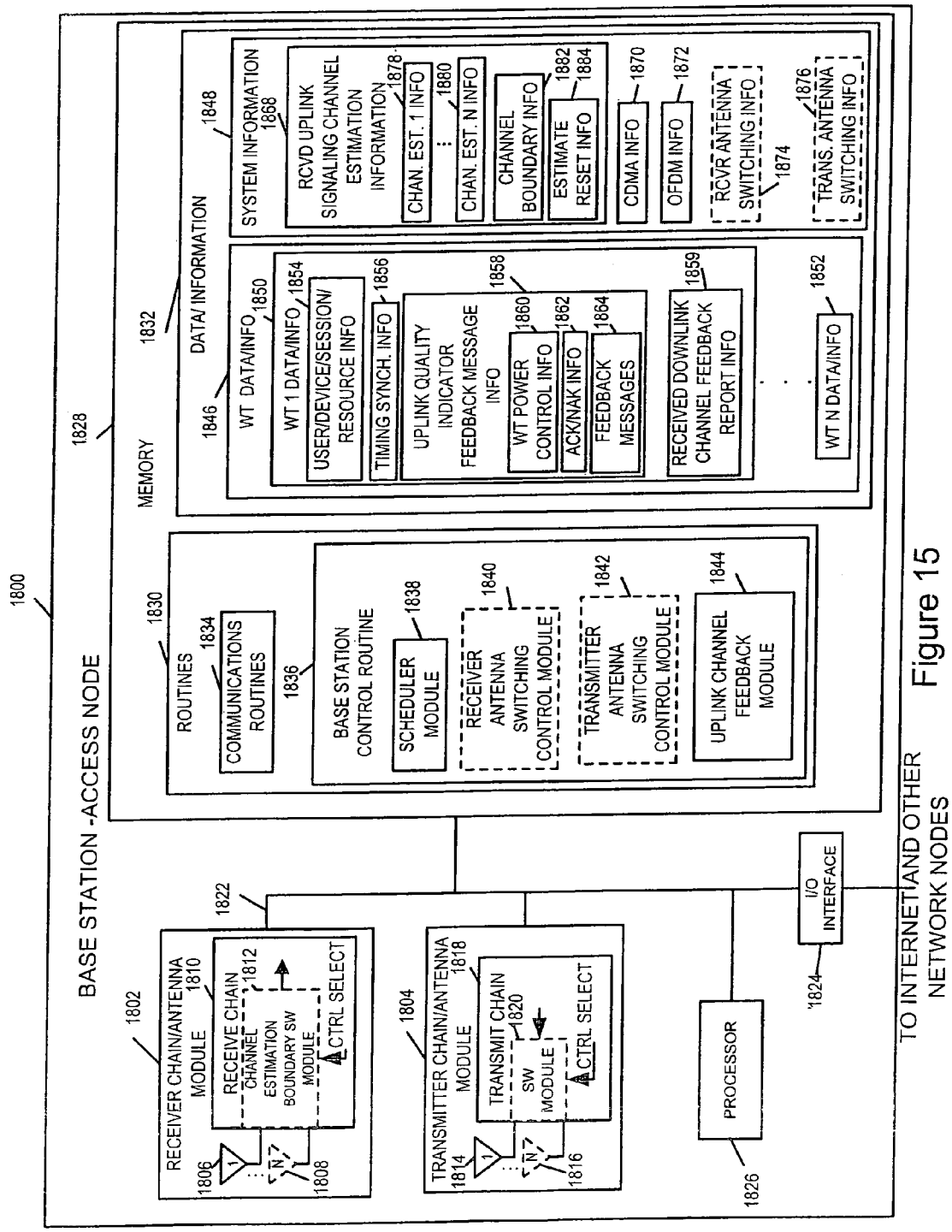
FIG. 15 illustrates another exemplary base station, implemented in accordance with the present invention, which may use channel estimation boundary antenna switching.

FIG. 15 illustrates another exemplary base station—access node 1800, implemented in accordance with the invention. Base station 1800 may be any of the exemplary base stations (12, 12') of FIG. 13. The base station 1800 includes receiver chain/antenna module 1802 and transmitter chain/antenna module 1804. The receiver chain/antenna module 1802 may be implemented similarly to or the same as shown in FIG. 8. The transmitter chain/antenna module 1804 may be implemented similarly to that shown in FIG. 3, but with the switching control a function of channel estimation boundary information and/or downlink channel feedback information from WTs. The receiver chain/antenna module 1802 includes a receive antenna or antenna element 1806 and a receive chain 1810. Module 1802, in some embodiments, includes multiple antennas or antenna elements (receive antenna 1 1806, receive antenna N 1808) and its receiver chain 1810 includes a channel estimation boundary controllable switching module 1812, e.g. switching circuitry. The transmitter chain/antenna module 1804 includes a transmit antenna or antenna element 1814 and a transmitter chain 1818. In some embodiments, module 1804 includes multiple antennas or antenna elements (transmit antenna 1 1814, transmit antenna N 1816) and its transmitter chain 1818 includes a controllable switching module 1820. The receiver module 1802 receives uplink signals from WTs including uplink signals transmitted from different WT transmit antennas or antenna elements of the same WT during different intervals corresponding to different base station channel estimations. The transmitter module 1804 transmits downlink signals to the WTs including channel quality indicator feedback signals indicative of the received WT uplink signals. The modules 1802, 1804 are coupled by a bus 1822 to an I/O interface 1824, processor 1826, e.g., CPU, and memory 1828. The I/O interface 1824 couples the base station 1800 to the Internet and to other network nodes, e.g., routers, other base stations, AAA nodes, etc. The memory 1828 includes routines 1830 and data/information 1832. The processor 1826 executes the routines 1830 and uses the data/information 1832 in memory 1828 to cause the base station 1800 to operate in accordance with the invention.

Routines 1830 includes communications routines 1834 used for controlling the base station 1800 to perform various communications operations and implement various communications protocols. The routines 1830 also includes a base station control routine 1836 used to control the base station 1800 to implement the steps of the method of the present invention. The base station control routine 1836 includes a scheduler module 1838 used to control transmission scheduling and/or communication resource allocation, e.g., the assignment of uplink and downlink segment to WTs. Base station control routine 1836 also includes, in some embodiments, e.g., those including channel estimation boundary switching module 1812 and multiple receive antennas (1806, 1808), a receiver antenna switching control module 1840. Base station control routines 1836 also includes, in some embodiments, e.g., those including switching module 1820 and multiple transmit antennas (1814, 1816), a transmitter antenna switching control module 1842. The switching devices 1812 in this receiver chain 1810 and 1820 in the transmitter chain 1818, when implemented, are responsive to control signals generated by the processor 1826 when operating under direction of these modules (1840, 1842), respectively. The control signals cause switching between antennas or antenna elements in accordance with the invention. The receiver antenna switching control modules 1840 may use the data/information 1832 including the uplink quality indicator feedback information 1858, received uplink signaling channel estimation information 1868, and receiver antenna switching information 1874 in making antenna switching decisions. The transmitter antenna switching control module 1842 may use the data/information 1832 including the received downlink channel feedback report information 1859, and transmitter antenna switching information 1876 in making antenna switching decisions.

Base station control routine 1836 also includes uplink channel feedback module 1844 which controls the evaluation of received uplink signals, generation, and transmission of channel quality indicator feedback signals such as feedback messages 1864 including WT power control feedback information 1860 and transmission acknowledgment/negative acknowledgement (ack/nak) feedback information 1862 indicating the success or failure in receipt of an uplink signal or signals.

Memory 1828 also includes data/information 1832 used by communications routines 1834 and control routine 1836. Data/information 1832 includes WT data/information 1846 and system information 1848. WT data/information 1846 includes a plurality of sets of WT information (WT 1 data/information 1850, WT N data/information 1852). WT 1 data/information 1850 includes user/device/session/resource information 1854, timing synchronization information 1856, uplink quality indicator feedback message information 1858, and received downlink channel feedback report information 1859. User/device/session/resource information 1854 includes user/device identification information, session information such as peer node information and routing information, and resource information such as uplink and downlink traffic channel segments assigned by the scheduler 1838 to WT1. Timing synchronization information 1856 includes information to synchronize WT1 timing with respect to BS timing, e.g., adjustment information to compensate for propagation delays. Uplink quality indicator feedback message information 1858 includes WT power control information 1860, ack/nak information 1862, and feedback messages 1864. Received downlink channel feedback report information 1859 includes information obtained from a received downlink channel feedback report transmitted by WT1 in response to downlink pilot broadcast signals transmitted by BS 1800. System information 1848 includes received uplink signaling channel estimation information 1868, CDMA information 1870, OFDM information 1872, optionally receiver antenna switching information 1874, and optionally transmitter antenna switching information 1876. Received uplink signaling channel estimation information 1868 includes a plurality of sets of channel estimation information (channel estimate 1 information 1878, channel estimate N information 1880), each channel estimate corresponding to a channel estimate of received uplink signaling from one WT using one antenna or antenna element. Information from channel estimates 1878, 1880 is associated with specific WTs, processed, and stored, e.g., in WT power control info 1860 and ack/nak info 1862. Information 1868 also includes channel boundary information 1882 and estimate reset information 1884. Channel boundary information 1882 identifies the times defining where the BS switches between intervals associated with a plurality of different channel estimates for the same WT, e.g., different channel estimates being associated with different WT transmitter antenna elements. Estimate reset information 1884 includes information identifying times that channel estimates are re-initialized, e.g., channel boundaries where a channel estimation filter is cleared and restarted.

CDMA information 1870 includes carrier frequency information, bandwidth information, CDMA timing synchronization information, and codeword information. OFDM information 1872 includes OFDM timing information, dwell information including dwell boundary information, tone information, and tone hopping information. In some embodiments, BS 1800 supports either CDMA communications or OFDM communications 1872, but not both, in which case the BS 1800 includes CDMA info 1870 or OFDM info 1872.

Receiver antenna switching information 1874 includes information such as switching criteria, predetermined switching sequences, antenna element utilization information, and antenna element control information used by the receiver antenna switching control module 1840. Transmitter antenna switching information 1876 includes information such as switching criteria, predetermined switching sequences, antenna element utilization information, and antenna element control information used by the transmitter antenna switching control module 1842.

Figure 16:
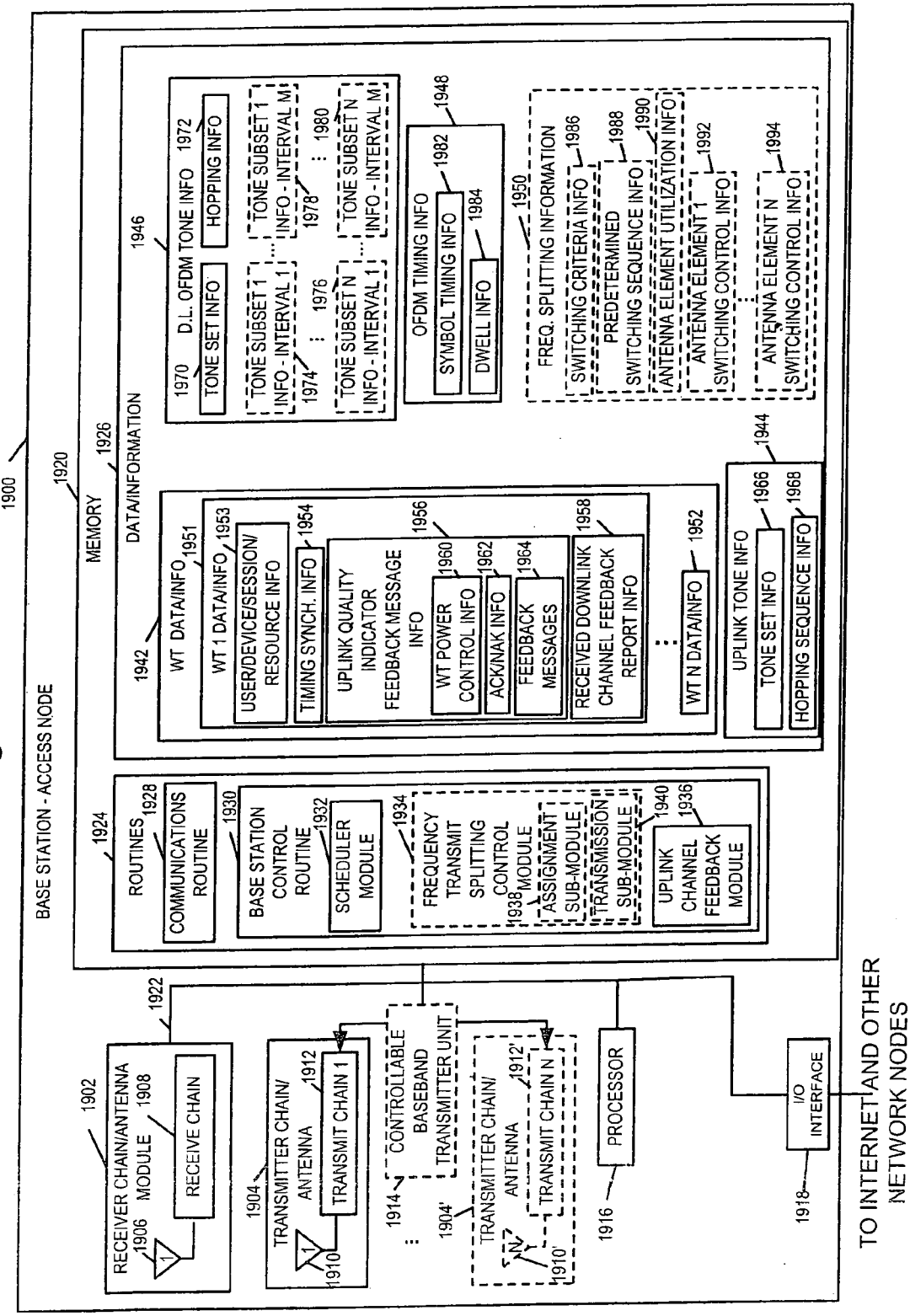
FIG. 16 illustrates another exemplary OFDM base station, implemented in accordance with the present invention, which may use assign different tone subsets to different transmit antennas for simultaneous transmission.

FIG. 16 illustrates another exemplary base station—access node 1900, implemented in accordance with the present invention. BS 1900 may any of the exemplary BSs (12, 12') of FIG. 13. The BS 1900 includes receiver chain/antenna module 1902 and a transmitter chain/antenna module 1904. The receiver chain/antenna module 1906 includes a receive antenna 1 1906 and a receiver chain 1908. The receiver chain antenna module 1906 receives uplink signals from different transmit antennas or antennas elements from the same WT, said signals including different subsets of tones, and said signals transmitted simultaneously from the same WT. In some embodiments, e.g., with a controllable baseband transmitter unit 1914, the BS 1900 includes a plurality of transmitter chain/antennas (1904, 1904'); module 1904 includes transmit chain 1 1912 coupled to transmit antenna or antenna element 1 1910, while module 1904' includes transmit chain N 1912' coupled to transmit antenna or antenna element N 1910'. Using multiple transmitter chains/antenna modules 1904, 1904' with subsets of frequencies or tones being transmitted at the same time on different antennas or antenna elements is used to obtain diversity, in accordance with the present invention. Transmitter chain/antenna module 1 1904 includes a transmit antenna 1910 coupled to a transmit chain 1912. Similarly, transmitter chain/antenna module N 1904' includes a transmit antenna 1910' coupled to a transmitter chain 1912'. The transmitter chains 1912, 1912' are coupled to the controllable baseband transmitter unit 1914. Receiver module 1902, optionally controllable baseband transmitter unit 1914, a processor 1916, e.g., CPU, I/O interface 1918, and a memory 1920 are coupled together via a bus 1922 over which the various elements may interchange data and information. In some embodiments without controllable baseband transmitter unit 1914, transmitter chain/antenna module 1904 is coupled to bus 1922. I/O interface 1918 couples the BS 1900 to the Internet and to other network nodes, e.g., other BSs 1900, AAA nodes, home agent nodes, routers, etc. Memory 1920 includes routines 1924 and data/information 1926.

Processor 1916, under control of one or more routines 1924 stored in memory 1920, uses the data/information 1926 and causes the base station 1900 to operate in accordance with the methods of the present invention. Routines 1924 include communications routine 1928 and base station control routine 1930. Communications routine 1928 performs various communications protocols and functions used by BS 1900. The base station control routine 1930 is responsible for insuring that the base station 1900 operates in accordance with the methods of the present invention.

The base station control routine 1930 includes a scheduler module 1932 and an uplink channel feedback module 1936. In some embodiments, e.g., some embodiments including controllable baseband transmitter unit 1914 and transmitter chain/antenna module 1904', base station control routine 1930 also includes a frequency transmit splitting control module 1934. The scheduler module 1932, e.g., a scheduler, schedules air link resources, e.g., uplink and downlink segments, to WTs.

The frequency transmit splitting control module 1934, when implemented, controls the operation of the controllable baseband transmitter unit 1914 to split the frequencies, e.g., set of tones, used for transmission, thus routing some of the information using a first subset of tones to transmitter chain antenna module 1 1904 and some of the information using a second subset of tones, to transmitter chain/antenna module N 1904', the first and second subsets of tones being different from one another by at least one tone. In some embodiments, more than two antennas or antenna elements are used for simultaneous transmission and more than two subsets of tones are simultaneously transmitted, e.g., one subset of tones corresponding to each antenna or antenna element to be used simultaneously. In some embodiments, the different subsets of tones associated with different transmitter chains/antennas are mutually exclusive. In some embodiments, there is partial overlapping between the tone subsets. In accordance with the invention, BS 1900 can simultaneously transmit both first and second sets of tones, the first set of tones being convey by a first communications channel from antenna 1 1910 to the WT, and the second set of tones being conveyed by a second communications channel from antenna N 1910' to the same WT. The frequency splitting control module 1934 includes an assignment sub-module 1938 for assigning tones from a set of tones to a plurality of different tone sub-sets including at least a first and a second tone subset, each of said different tone subsets being different from one another by at least one tone. The frequency splitting control module 1934 also includes a transmission sub-module for controlling the transmission of the selected subsets of tones.

Assignment sub-module 1938 uses data/information 1926 including predetermined switching sequence information 1988, switching criteria information 1986, received downlink channel report feedback information 1958, tone set info 1970, and/or hopping info 1972 to decide on and assign tones to the tone subsets (tone subset 1 info—interval 1 1974, tone subset N—interval 1 1976, tone subset 1 info—interval M 1978, tone subset N info—interval M 1980). The assignment sub-module 1938 also generates and stores antenna element control information (antenna element 1 switching control information 1992, antenna element N switching control information 1994). Transmission sub-module 1940 uses the data/information 1926 including the tone subsets (1974, 1976, 1978, 1980), OFDM timing information 1948, and antenna element switching control information (1992, 1993) to implement the decisions of the assignment module and control the operation of the controllable baseband transmitter unit 1914.

Uplink channel feedback module 1936 evaluates and processes received uplink signaling, obtaining WT power control information 1960 and ACK/NAK information 1962. From the information 1960, 1962, the uplink channel feedback module 1936 generates feedback messages 1964, which are subsequently transmitted to the WTs to be used in making decisions as to tone splitting among WT transmission antennas or antenna elements.

Data/information 1926 includes WT data/information 1942, uplink tone information 1944, downlink OFDM tone information 1946, and OFDM timing information 1948. In some embodiments, e.g., embodiments including frequency transmit splitting control module 1934, data/information 1926 also includes frequency splitting information 1950.

WT data/info 1942 includes a plurality of sets of data/information (WT1 data/information 1951, WTN data/information 1952). WT 1 data/info 1951 includes user/device/sessions/resource information 1953, timing synchronization information 1954, uplink quality indicator feedback message information 1956, and received downlink channel feedback report information 1958. User/device/session/resource information 1953 includes user/device identification information, session information including peer node identification and routing information, and resource information including uplink and downlink segments assigned by the BS 1900 to WT1.

Timing synchronization information 1954 includes information used to synchronize WT1 with BS 1900, e.g., to account for delay propagation.

Uplink quality indicator feedback message information 1956 includes WT power control information 1960, e.g., a received power level of a WT1 uplink signal, an SNR value, a WT1 transmission power adjustment signal, etc. indicative of uplink channel quality, acknowledgment/negative acknowledgement (ack/nak) signal information 1962, e.g., information indicating the success or failure in receipt of a WT1 transmitted uplink signal or signals, and feedback messages, e.g., messages to be communicated to WT1 including information from 1960 and/or 1962.

Received downlink channel feedback report information 1958 includes information from WT feedback reports, e.g., reporting back on the quality of the downlink channel in terms of power levels, SNRs, etc. based on received pilot signals. Received downlink channel feedback report information also includes ack/nak signal information communicated by the WT1 in response to downlink signals, e.g., downlink traffic channel signals. Information 1958 is used, in some embodiments, by the assignment sub-module 1938 in the frequency splitting control module 1934 when making decisions as to tone splitting.

Uplink tone information 1944 include tone set information 1944, e.g., a set of tones used for uplink signaling to the BS 1900 from WTs and hopping sequence information, e.g., an uplink hopping sequence used by the WTs, the hopping changing between dwells.

Downlink OFDM tone information 1946 includes tone set information 1970, e.g., a set of tones used for downlink signaling by the BS, and hopping information 1972, e.g., downlink hopping sequence which changes the tone mapping on an OFDM symbol time basis. OFDM tone information 1946 also includes, in some embodiments, e.g., some embodiments with frequency transmit splitting control module 1934, a plurality of tone subsets (tone subset 1 information—interval 1 1974, tone subset N information—interval 1 1976, tone subset 1 information—interval M 1978, tone subset N information—interval M 1980). Each tone subset of information (1974, 1976) being associated with a different transmitter chain/antenna (1904, 1904'), and the tone subsets (1974, 1976) to be transmitted simultaneously, in accordance with the invention. Similarly, each of the tone subsets of information (1978, 1980) is associated with a different transmitter chain/antenna (1904, 1904'), and the tone subsets (1978, 1980) are be transmitted simultaneously, in accordance with the invention. The weighting of tones, e.g., number of tones associated with each of the subsets, can change as a function of time. For example, during interval 1, tone subset 1 associated with transmitter chain/antenna 1 may use 6 tones and tone subset 2 associated with transmitter chain/antenna 2 may use 6 tones; however during the next successive interval, tone subset 1 associated with transmitter chain/antenna 1 may use 7 tones and tone subset 2 associated with transmitter chain 2/antenna 2 may use 5 tones. In addition, from OFDM symbol transmission time interval to OFDM symbol transmission time interval, the set of tones may be hopped according to a downlink tone hopping sequence.

OFDM timing information 1948 includes symbol timing information 1982 and dwell information 1984. Symbol timing information 1982 including the timing defining the transmission of a single OFDM symbol including multiple tones transmitted simultaneously. Dwell information 1984 includes information identifying a number of successive of OFDM symbols, e.g., 7, where the uplink tone mapping from logical to physical tones does not change for the duration of the dwell; the tones being hopped differently from dwell to dwell. Dwell information 1984 also includes information identifying dwell boundaries.

In some embodiments, the frequency splitting is on a predetermined basis, e.g., the tones being divided among the plurality of transmitter chain/antenna modules (1904, 1904'), e.g., in an alternating sequence with respect to physical indexing numbers. In other embodiments, weighting between the different transmitter chain/antenna modules (1904, 1904') changes as a function of received downlink channel feedback report information 1958 and the switching criteria information 1986 in the frequency splitting information 1950. For example, if the BS 1900 includes a first and second transmitter chain/antenna module 1904 and 1904' and the feedback information indicates that the channel qualities are substantially equivalent, e.g., the difference in channel qualities is below a first criteria level, the tones may be split evenly between the two modules 1904, 1904'. However, if the same exemplary BS 1900 determines that the quality of the channel corresponding to transmitter chain/antenna module 1904 is significantly better than the channel quality corresponding to transmitter module 1904', yet the channel quality of both channels is still acceptable, based on feedback information and comparisons to second and third criteria levels, then the frequency splitting control module 1934 can control baseband transmitter unit 1914 to dedicate more tones, e.g., twice as many tones to module 1904 as to module 1904'.

Frequency splitting information 1950 includes switching criteria information 1986, predetermined switching sequence information 1988, antenna element utilization information 1990, and a plurality of sets of antenna element switching control information (antenna element 1 switching control information 1992, antenna element N switching control information 1994). Switching criteria information 1986 includes threshold limits used by the assignment sub-module 1938 in evaluating the antenna element feedback info included or derived from received downlink channel feedback report info 1958 in making decisions as to whether, when, and to what extend to change the balance of tones split between the various transmitter chains/antennas (1904, 1904'). Predetermined switching sequence information 1988 includes a plurality of predetermined sequences that may be selected among by the assignment sub-module 1938. For example, a first predetermined sequence may alternate, e.g., on each or some fixed number of OFDM symbol transmission time interval or intervals, between (i) a 50-50 split of uplink tones between a first transmitter chain/antenna and second transmitter chain/antenna and (ii) a 60-40 split of uplink tones between the first transmitter chain/antenna and the second transmitter chain/antenna; a second predetermined sequence may alternate, e.g., between (i) a 50-50 split of uplink tones between a first transmitter chain/antenna and second transmitter chain/antenna and (ii) a 40-60 split of uplink tones between the first transmitter chain/antenna and the second transmitter chain/antenna. In some embodiments, the BS 1900 shall follow a predetermined switching sequence, which does not change as a function of feedback information, e.g., a fixed predetermined sequence which results in equal or nearly equal frequency splitting among transmitter chains/antennas (1904, 1904') over time. Antenna element utilization information 1990 includes information identifying the utilization of each antenna element (1910, 1910'), e.g., in terms of number of tones in the assigned tone subset relative to the set of tones or relative to the other tone subsets to be simultaneously transmitted over different transmit antenna elements. Antenna element switching control information (antenna element 1 switching control information 1992, antenna element N switching control information 1994) includes information such as number of tones, index or frequency of assigned tones associated with antenna element (1,N), respectively. Information 1992, 1994 is used by the controllable baseband transmitter unit 1914.

Figure 17:
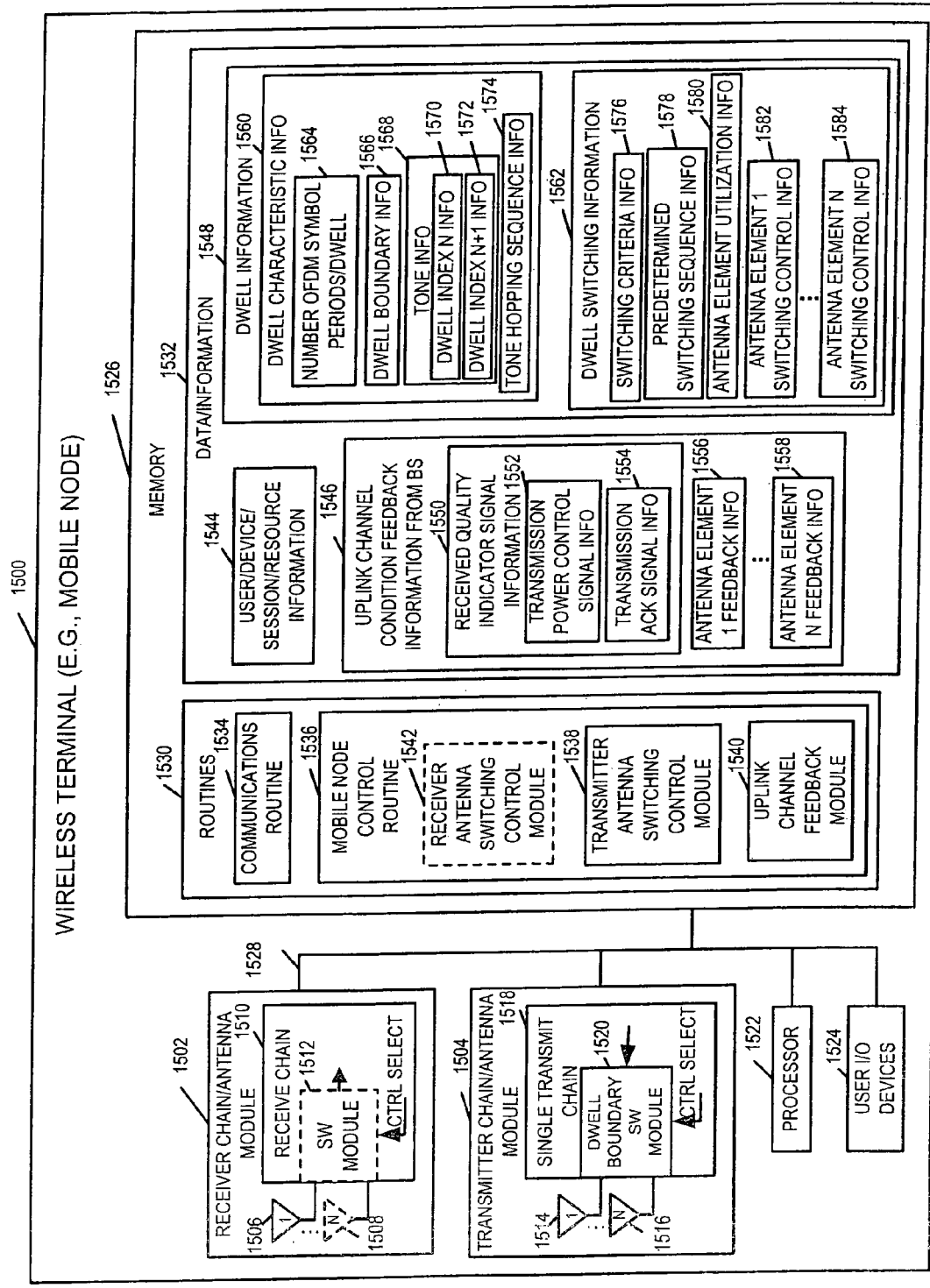
FIG. 17 illustrates an exemplary wireless terminal, implemented in accordance with the present invention and using methods of the present invention including dwell boundary switching between multiple transmit antennas or antenna elements.

FIG. 17 illustrates an exemplary wireless terminal (WT) 1500, e.g., mobile node (MN), implemented in accordance with the present invention. Exemplary WT 1500 can switch between multiple transmit antennas or antenna elements on dwell boundaries, but not in between, in accordance with the present invention. MN 1500 may be any of the exemplary MNs (14, 16, 14', 16') of FIG. 13. Exemplary WT 1500 may be used in conjunction with exemplary BS 1400 of FIG. 14. The mobile node 1500 may be used as a mobile terminal (MT). The mobile node 1500 includes receiver chain/antenna module 1502 and transmitter chain/antenna module 1504 which may be implemented as shown in FIGS. 8 and 3, respectively. A single transmitter chain 1518 and transmit antenna switching is used to obtain diversity in accordance with the present invention. The receiver chain/antenna module 1502 includes receive antenna 1 1506 and a receive chain 1510. In some embodiments, receiver chain/antenna module 1502 includes multiple antennas or multiple antenna elements (receive antenna 1 1506, receive antenna N 1508), and receiver chain 1510 includes a controllable switching module 1512, e.g. switching circuitry. The transmitter chain/antenna module 1504 includes multiple antennas or multiple antenna elements (transmit antenna 1 1514, transmit antenna N 1516) and a single transmitter chain 1518 including a controllable dwell boundary switching module 1520. In some embodiments, the plurality of transmit antennas or antenna elements (1514, 1516) are oriented in different directions. In some embodiments, the plurality of different antennas or antenna elements (1514, 1516) are spaced apart so that a different communications path exists between the antennas or antenna elements and the base station. In some embodiments, the spacing between antennas or antenna elements is at least ¼ of a wavelength of the lowest frequency tone transmitted from the antenna or antenna element. The receiver module 1502, transmitter module 1504, a processor 1522, e.g., CPU, user I/O devices 1524, and a memory 1526 are coupled together via a bus 1528 over which the various elements may interchange data and information. Memory 1526 includes routines 1530 and data/information 1532.

The receiver chain/antenna module 1502 receives downlink signals by base stations including feedback signals such as quality indicator signals indicative of the quality of uplink signals. The transmitter chain/antenna module 1504 transmits uplink signals including uplink traffic channel signals to a base station, using a plurality of transmit antennas or antenna elements (1514, 1516), in which one of the plurality of antennas is coupled to the single transmitter chain 1518 for any given dwell, in accordance with the present invention.

Processor 1522 executes the routines 1530 and uses the data/information 1532 in memory 1526 to control the operation of the WT 1500 and implement the methods of the present invention. User I/O devices 1524, e.g., displays, speaker, microphone, keyboard, keypad, mouse, etc allow the user of WT 1500 to input user data and information intended for a peer node and to output user data and information from a peer node.

Routines 1530 include communications routine 1534 and mobile node control routine 1536. The mobile node control routine 1536 includes a transmitter antenna switching control module 1538 and an uplink channel feedback module 1540. In some embodiments, e.g., embodiments including multiple receiver antennas 1506, 1508 and switching module 1512, the mobile node control routine 1536 includes a receiver antenna switching control module 1542.

Data/information 1532 includes user/device/resource information 1544, uplink channel condition feedback information obtained from a base station 1546, and dwell information 1548. User/device/session/resource information 1544 includes information pertaining to communications sessions between WT1 500 and peer nodes such as, e.g., routing information, identification information, assigned traffic channel segment information, etc.

Uplink channel condition feedback information from base station 1546 includes received quality indicator signal information 1550 and a plurality of sets of antenna feedback information (antenna element 1 feedback information 1556, antenna element N feedback information 1558). A base station receiving uplink signals from WT 1500 determines the quality of the received uplink signals and sends feedback signals to WT 1500 indicative of the received quality. Received quality indicator signal information 1550 is information conveyed in those feedback signals and includes transmission power control signal information 1552 and transmission acknowledgment signal information 1554. Transmission power control signal information 1552 can include information indicative of power levels, relative power levels, signal-to-noise ratios, and commanded power level changes. Transmission acknowledgement signal information 1554 can include information indicating success or failure in receipt of a transmitted uplink signal or signals, e.g., as represented by an ack/nak or statistical information on acks/naks.

The base station need not know, and in many embodiments does not know that the WT 1500 is switching between multiple transmit antennas and/or when the WT 1500 is switching. The WT 1500 can use its knowledge as to which WT transmit antenna (1514, 1516) the WT 1500 used for a specific dwell and correlate the received feedback information, e.g., ack/naks received, with specific antennas, thus forming and maintaining sets of feedback information by antenna (antenna element 1 feedback information 1556, antenna element N feedback information 1558). In some embodiments, where the base station has knowledge of the different transmit antennas (1514, 1516) being used by the WT 1500, the BS can maintain different sets of feedback information and convey those sets to WT 1500 to be stored as antenna element feedback sets (antenna element 1 feedback info 1556, antenna element N feedback info 1558), without the WT 1500 having to perform the correlation.

Dwell information 1548 includes dwell characteristic information 1560 and dwell switching information 1562. Dwell characteristic information includes a specified number of OFDM symbol transmission time periods per dwell 1564, e.g., seven, dwell boundary information 1566, tone information 1568 and tone hopping sequence information 1574. Dwell boundary information 1566 includes timing information used by WT 1500 to distinguish when one dwell ends and the next dwell begins, and dwell boundary information 1566 is used to control the switching between transmit antennas (1514, 1516) so that antenna switching is performed on at least some dwell boundaries but not in between. Tone information 1568 includes dwell index N information 1570 and dwell index N+1 information 1572. Dwell index N information 1570 includes a set of tones to be used by the WT 1500 to transmit uplink signals to a base station during a first dwell, while dwell N+1 information 1572 includes a set of tones to be used by the WT 1500 to transmit uplink signals to the base station during a second dwell, the second dwell being an immediately consecutive dwell to the first dwell. The tone hopping sequence information 1574 includes information defining the hopping sequence from logical to physical tones to be used by WT 1500 in the uplink signaling, and thus is used in determining the dwell index N information 1570 and dwell index N+1 information 1572.

Dwell switching information 1562 includes switching criteria information 1576, predetermined switching sequence information 1578, antenna element utilization information 1580, and a plurality of sets of antenna switching control information (antenna element 1 switching control information 1582, antenna element N switching control information 1584). Switching criteria information 1576 includes information identifying methods and limits used for determining dwell boundary switching between transmit antennas (1514, 1516). For example, switching criteria information 1576 may include threshold limits that are applied to received feedback quality levels to determine switching. For example, one criteria may be a ratio value of naks/acks corresponding to one antenna that if exceeded triggers a transition to a different antenna element or is used to trigger a different proportion of number of the number of dwells allocated to a first antenna with respect to the number of dwells allocated to a second transmit antenna, in a given time or given number of dwells. Predetermined switching sequence information 1578 includes information identifying predetermined dwell boundary switching sequences that may be used. For example, an exemplary sequence may couple the single transmit chain 1518 to one of the antennas, e.g., antenna 1514, for a fixed number of successive dwells, and then switch to another transmit antenna, e.g., antenna 1516, and remain there for the same number of successive dwells, and then repeat the process, alternating between each of the transmit antennas (1514, 1516), and resulting in equal transmit antenna utilization. This method can be extended for more than two antennas, where the transmit antenna utilization is equal among each antenna. In some embodiments, when operating on a fixed predetermined switching sequence, received quality indicator signal information 1550 is not needed or used by the WT 1500, in performing dwell boundary switching, e.g., the WT 1500 follows a predetermined dwell boundary switching sequence irrespective of the variations in channel quality between the different antenna (1514, 1516). In other embodiments, predetermined switching sequences are used in conjunction with uplink channel condition feedback information from the BS 1546. For example, different predetermined switching sequences from information 1578 may be selected based on the quality feedback information, e.g., a specific predetermined sequence which favors one transmit antenna or rejects one transmit antenna. Alternately, in some embodiments, predetermined switching sequences are used initially and/or intermittently to evaluate different channel qualities, and then dwell boundary switching is based upon uplink channel quality feedback information. In some embodiments, a predetermined switching sequence is not used, and dwell boundary switching is performed as a function of uplink channel quality. Antenna utilization information 1580 includes information identifying the current utilization of each of the transmit antennas (1514, 1516), e.g., in terms of time and/or number of dwells in relation to the other transmit antennas, and changes in antenna utilization to be performed.

Different sets of switching control information (antenna element 1 switching control information 1582, antenna element N switching control information 1584) are maintained by the WT 1500 corresponding to the different sets of antenna feedback information (antenna element 1 feedback information 1556, antenna element N feedback information 1558).

Data/information 1532, previously described, can be used, in some embodiments, to select one or more channels from a plurality of channels created in accordance with the invention, the selected one or more channels having a higher channel quality than other channels, the selected one or more channels to be used more than the other channels with lower channel quality.

Communications routine 1534 implements the various communications protocols used by the WT 1500. The mobile node control routine 1536 controls the WT functionality including operation of receiver module 1502, transmitter module 1504, user I/O devices 1524, and implements the methods of the present invention including the processing of feedback information indicative of uplink signaling and the implementation and control of dwell boundary switching of the single transmitter chain 1518 between different antennas or antenna elements (1514, 1516), in accordance with the present invention.

Transmitter antenna switching control module 1538 uses the data/information 1532 to implement the dwell boundary switching method including making decisions regarding: antenna utilization, sequences, changes in sequences, and changes due to quality feedback information. For example, if the channel quality corresponding to antenna 1 1514 is determined by the WT 1500 to be higher than the channel quality corresponding to antenna N 1516, the transmitter antenna switching control module 1538 can, in some embodiments, select to use antenna 1 1514 for 3 dwells and antenna N 1516 for one dwell out of every four successive dwells. The transmitter antenna switching control module 1538 also controls the operation of the dwell boundary switching module 1520, e.g., via control select signals, to implement switching decisions.

Uplink channel feedback module 1540 controls the processing of received feedback signals extracting transmission power control signal information 1552 and/or transmission acknowledgment signal information 1554. Uplink channel feedback module 1540 can also separate the received feedback information 1550, using its knowledge as it which dwell was associated with which WT transmit antenna, into sets of information associated with different antennas (antenna element 1 feedback information 1556, antenna element N feedback information 1558). The output information obtained from the uplink channel feedback module 1540 can be used as input by the transmitter antenna switching control module 1538 to be used in reaching dwell switching decisions.

The optional receiver antenna switching control module 1542, when implemented, is used to control the switching of the receive chain switching control module 1512 to connect, at any one time, one of the plurality of receive antennas or antenna elements (1506, 1508) to the single receive chain 1510. Receiver antenna switching control module 1542 sends a control select signal to switching module 1512 to control the antenna selection. The receiver antenna switching control module 1542, by switching between antennas 1506, 1508 can provide receive diversity. Various implementations are possible in regard to the switching decision methodology, e.g., periodic switching between antennas (1506, 1508) and/or switching based on the quality of the received downlink signal, e.g., testing each channel and locking in on the antenna resulting in the best quality downlink channel.

Figure 18:
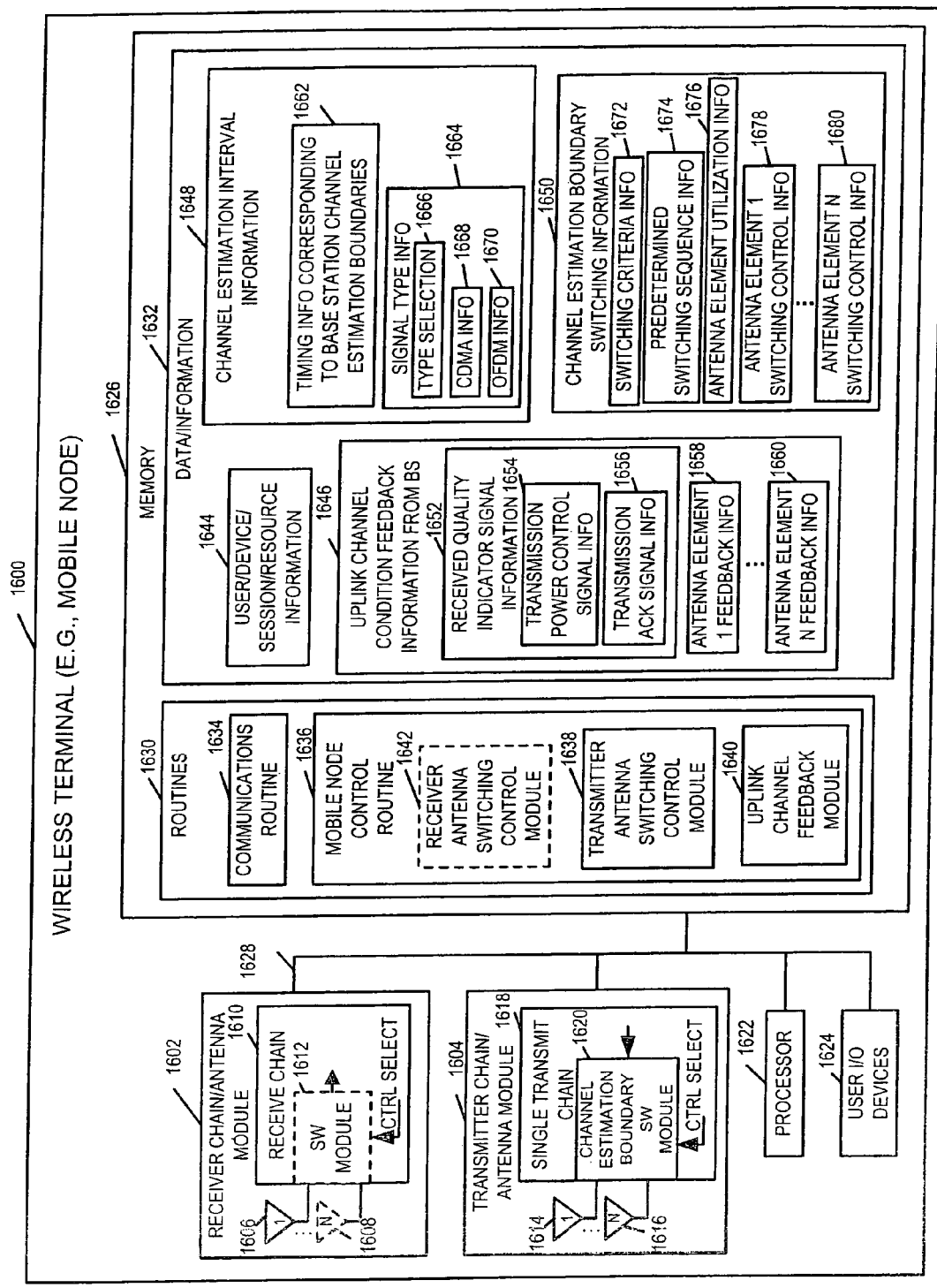
FIG. 18 illustrates another exemplary wireless terminal, implemented in accordance with the present invention and using methods of the present invention including channel estimation boundary switching between multiple transmit antennas or antenna elements.

FIG. 18 illustrates another exemplary wireless terminal (WT) 1600, e.g., mobile node (MN), implemented in accordance with the present invention. Exemplary WT 1600 can switch between multiple transmit antennas or antenna elements on signal boundaries corresponding to base station channel estimation signal boundaries, but not in between, in accordance with the present invention. MN 1600 may be any of the exemplary MNs (14, 16, 14', 16') of FIG. 13. Exemplary WT 1600 may be used in conjunction with exemplary BS 1800 of FIG. 15. The mobile node 1600 may be used as a mobile terminal (MT). The mobile node 1600 includes receiver chain/antenna module 1602 and transmitter chain/antenna module 1604. Receiver/antenna module 1802 may be implemented similarly or the same as that shown in FIG. 8. The transmitter/antenna module 1804 may be implemented similarly to that shown in FIG. 3, but with the switching controlled as a function of channel estimation boundary information and/or uplink channel estimation feedback information. A single transmitter chain 1618 and transmit antenna switching is used to obtain diversity, in accordance with the present invention. The receiver chain/antenna module 1602 includes receive antenna 1 1606 and a receive chain 1610. In some embodiments, receiver chain/antenna module 1602 includes multiple antennas or multiple antenna elements (receive antenna 1 1606, . . . , receive antenna N 1608), and receiver chain 1610 includes a controllable switching module 1612, e.g. switching circuitry. The transmitter chain/antenna module 1604 includes multiple antennas or multiple antenna elements (transmit antenna 1 1614, . . . , transmit antenna N 1616) and a single transmitter chain 1618 including a controllable channel estimation boundary switching module 1620. In some embodiments, the plurality of transmit antennas or antenna elements (1614, 1616) are oriented in different directions. In some embodiments, the plurality of different antennas or antenna elements (1614, 1616) are spaced apart so that a different communications path exists between the antennas or antenna elements and the base station. In some embodiments, the spacing between antennas or antenna elements is at least ¼ of a wavelength of the lowest frequency tone transmitted from the antenna or antenna element. The receiver module 1602, transmitter module 1604, a processor 1622, e.g., CPU, user I/O devices 1624, and a memory 1626 are coupled together via a bus 1628 over which the various elements may interchange data and information. Memory 1626 includes routines 1630 and data/information 1632.

The receiver chain/antenna module 1602 receives downlink signals by base stations including feedback signals such as quality indicator signals indicative of the quality of uplink signals. The transmitter chain/antenna module 1604 transmits uplink signals including uplink traffic channel signals to a base station, using a plurality of transmit antennas or antenna elements (1614, 1616), in which one of the plurality of antennas is coupled to the single transmitter chain 1618 at any given time, in accordance with the present invention.

Processor 1622 executes the routines 1630 and uses the data/information 1632 in memory 1626 to control the operation of the WT 1600 and implement the methods of the present invention. User I/O devices 1624, e.g., displays, speaker, microphone, keyboard, keypad, mouse, etc allow the user of WT 1600 to input user data and information intended for a peer node and to output user data and information from a peer node.

Routines 1630 include communications routine 1634 and mobile node control routine 1636. The mobile node control routine 1636 includes a transmitter antenna switching control module 1638 and an uplink channel feedback module 1640. In some embodiments, e.g., embodiments including multiple receiver antennas 1606, 1608 and switching module 1612, the mobile node control routine 1636 also includes a receiver antenna switching control module 1642.

Data/information 1632 includes user/device/session/resource information 1644, uplink channel condition feedback information obtained from a base station 1646, channel estimation interval information 1648 and channel estimation boundary switching information 1650. User/device/session/resource information 1644 includes information pertaining to communications sessions between WT 1600 and peer nodes such as, e.g., routing information, identification information, assigned traffic channel segment information, etc.

Uplink channel condition feedback information from base station 1646 includes received quality indicator signal information 1652 and a plurality of sets of antenna feedback information (antenna element 1 feedback information 1658, antenna element N feedback information 1660). A base station receiving uplink signals from WT 1600 determines the quality of the received uplink signals and sends feedback signals to WT indicative of the received quality. Received quality indicator signal information 1652 is information conveyed in those feedback signals and includes transmission power control signal information 1654 and transmission acknowledgment signal information 1656. Transmission power control signal information 1654 can include information indicative of power levels, relative power levels, signal-to-noise ratios, and commanded power level changes. Transmission acknowledgement signal information 1656 can include information indicating success or failure in receipt of a transmitted uplink signal or signals, e.g., as represented by an ack/nak or statistical information on acks/naks.

The base station need not know, and in many embodiments does not know that the WT 1600 is switching between multiple transmit antennas and/or when the WT 1600 is switching. However, the WT 1600 tracks the channel estimation intervals being used by the base station, and when switching between transmit antenna occurs, it occurs on a channel estimation boundary. For example, the base station can perform 1 channel estimation in a fixed amount of time, and then reinitialize the channel estimation and restart; the WT 1600 can select the time corresponding to the re-initialization point to switch antennas. The WT 1600 can use its knowledge as to which WT transmit antenna (1614, 1616) the WT 1600 used for the interval corresponding to the channel estimation and correlate the received feedback information, e.g., ack/naks received, with specific antennas, thus forming and maintaining sets of feedback information by antenna (antenna element 1 feedback information 1658, antenna element N feedback information 1660). In some embodiments, the base station maintains different ongoing channel quality estimates, e.g. one corresponding to each transmit antenna (1614, 1616), and the base station alternates between these ongoing channel estimates in coordination with the WT transmit antenna switching. This implementation is useful where the WT 1600 operates with a fixed number of transmit antennas (1614, 1616) on a predetermined periodic sequence, e.g., with uniform utilization between each antenna. In some embodiments, where the base station has knowledge of the different transmit antennas (1614, 1616) being used by the WT 1600, the BS can maintain different sets of feedback information and convey those sets to WT 1600 to be stored as antenna element feedback sets (antenna element 1 feedback info 1658, antenna element N feedback info 1660), without the WT 1600 having to perform the correlation.

Channel estimation interval information 1648 includes timing information corresponding to base station channel estimation boundaries 1662 and signal type information 1664. Timing information 1662 relates the base station uplink signal channel estimation cycles and intervals with respect to the WT timing so that antenna switching may be controlled at times corresponding to channel estimation boundaries to help to prevent corruption of base station channel estimates by the mixture of uplink signals from two different transmit antennas (1614, 1616). Signal type information includes type selection 1666, code division multiple access (CDMA) information 1668, and orthogonal frequency division multiplexing (OFDM) information 1670. The type selection 1666 includes a user or service provider selection of the type of communications signaling to be employed between the WT 1600 to the base station, e.g., CDMA signaling or OFDM signaling. As a function of the selection different circuitry is activated within WT 1600. CDMA information 1668 includes carrier frequency used, bandwidth, codeword used, and channel estimation interval time. OFDM information 1670 can include information identifying dwell intervals defined by a number of successive OFDM symbol transmission time periods, information identifying dwell boundaries, tone information including the tones used in a given dwell, and tone hopping sequence information. In some embodiments, WT 1600 supports one type of signaling but not the other, in which case, WT 1600 would include one set of information 1668 or 1670.

Channel estimation boundary switching information 1650 includes switching criteria information 1672, predetermined switching sequence information 1674, antenna element utilization information 1676, and a plurality of sets of antenna switching control information (antenna element 1 switching control information 1678, antenna element N switching control information 1680). Switching criteria information 1672 includes information identifying methods and limits used for determining channel boundary switching between transmit antennas (1614, 1616). For example, switching criteria information 1672 may include threshold limits that are applied to received feedback quality levels to determine switching. For example, one criteria may be a minimum value of filtered SNR that if crossed triggers a transition to a different antenna element. Predetermined switching sequence information 1674 includes information identifying predetermined channel estimation boundary switching sequences that may be used. For example, an exemplary sequence may couple the single transmit chain 1618 to one of the antennas, e.g., antenna 1614, for a fixed number of successive channel estimates, and then switch to another transmit antenna, e.g., antenna 1616, and remains there for the same number of successive channel estimates, and then repeat the process, alternating between each of the transmit antennas (1614, 1616), and resulting in equal transmit antenna utilization. This method can be extended for more than two antennas, where the transmit antenna utilization is equal among each antenna. In some embodiments, when operating on a fixed predetermined switching sequence, received quality indicator signal information 1652 is not needed or used by the WT 1600, in performing channel estimation boundary switching, e.g., the WT 1600 follows a predetermined channel estimation boundary switching sequence irrespective of the variations in channel quality between the different antenna (1614, 1616); however, WT 1600 needs to maintain timing synchronization between the channel estimations performed by the base station on the uplink signaling, and the switching points. In other embodiments, predetermined switching sequences are used in conjunction with uplink channel condition feedback information from the BS 1646. For example, different predetermined switching sequences from information 1674 may be selected based on the quality feedback information, e.g., a specific predetermined sequence which favors one transmit antenna or rejects one transmit antenna. Alternately, in some embodiments, predetermined switching sequences are used initially and/or intermittently to evaluate different channel qualities, and then channel boundary switching is based upon uplink channel quality feedback information. In some embodiments, a predetermined switching sequence is not used, and channel boundary switching is performed as a function of uplink channel quality. Antenna utilization information 1676 includes information identifying the current utilization of each of the transmit antennas (1614, 1616), e.g., in terms of time or duty cycle in relation to the other transmit antennas, and changes in antenna utilization to be performed.

Different sets of switching control information (antenna element 1 switching control information 1678, antenna element N switching control information 1680) are maintained by the WT 1600 corresponding to the different sets of antenna feedback information (antenna element 1 feedback information 1658, antenna element N feedback information 1680).

Communication routine 1634 implements the various communications protocols used by the WT 1600. The mobile node control routine 1636 controls the WT functionality including operation of receiver module 1602, transmitter module 1604, user I/O devices 1624, and implements the methods of the present invention including the processing of feedback information indicative of uplink signaling and the implementation and control of channel estimation boundary switching of the single transmitter chain 1618 between different antennas or antenna elements (1614, 1616), in accordance with the present invention.

Transmitter antenna switching control module 1638 uses the data/information 1632 to implement the channel estimation boundary switching method including making decisions regarding: antenna utilization, sequences, changes in sequences, and changes due to quality feedback information. The transmitter antenna switching control module 1638 controls the operation of the channel estimation boundary switching module 1618, e.g., via control select signals, to implement switching decisions. Uplink channel feedback module 1640 controls the processing of received feedback signals extracting transmission power control signal information 1654 and/or transmission acknowledgment signal information 1656. Uplink channel feedback module 1640 can also separate the received feedback information 1652, using its knowledge as it which channel estimation was associated with which WT transmit antenna, into sets of information associated with different antennas (antenna element 1 feedback information 1658, antenna element N feedback information 1660). In some embodiments, the base station communicates different channel estimation reports to WT 1600 for each of the antennas (1614, 1616), and the uplink channel feedback module can store such information in the appropriate feedback info set (1658, 1660). The output information obtained from the uplink channel feedback module 1640 can be used as input by the transmitter antenna switching control module 1638 to be used in reaching channel estimation boundary switching decisions.

The optional receiver antenna switching control module 1642, when implemented, is used to control the switching of the receive chain switching control module 1612 to connect, at any one time, one of the plurality of receive antennas or antenna elements (1606, 1608) to the single receive chain 1610. Receiver antenna switching control module 1642 sends a control select signal to switching module 1612 to control the antenna selection. The receiver antenna switching control module 1642, by switching between antennas (1606, 1608) can provide receive diversity. Various implementations are possible in regard to the switching decision methodology, e.g., periodic switching between antennas (1606, 1608) and/or switching based on the quality of the received downlink signal, e.g., testing each channel and locking in on the antenna resulting in the best quality downlink channel.

Figure 19:
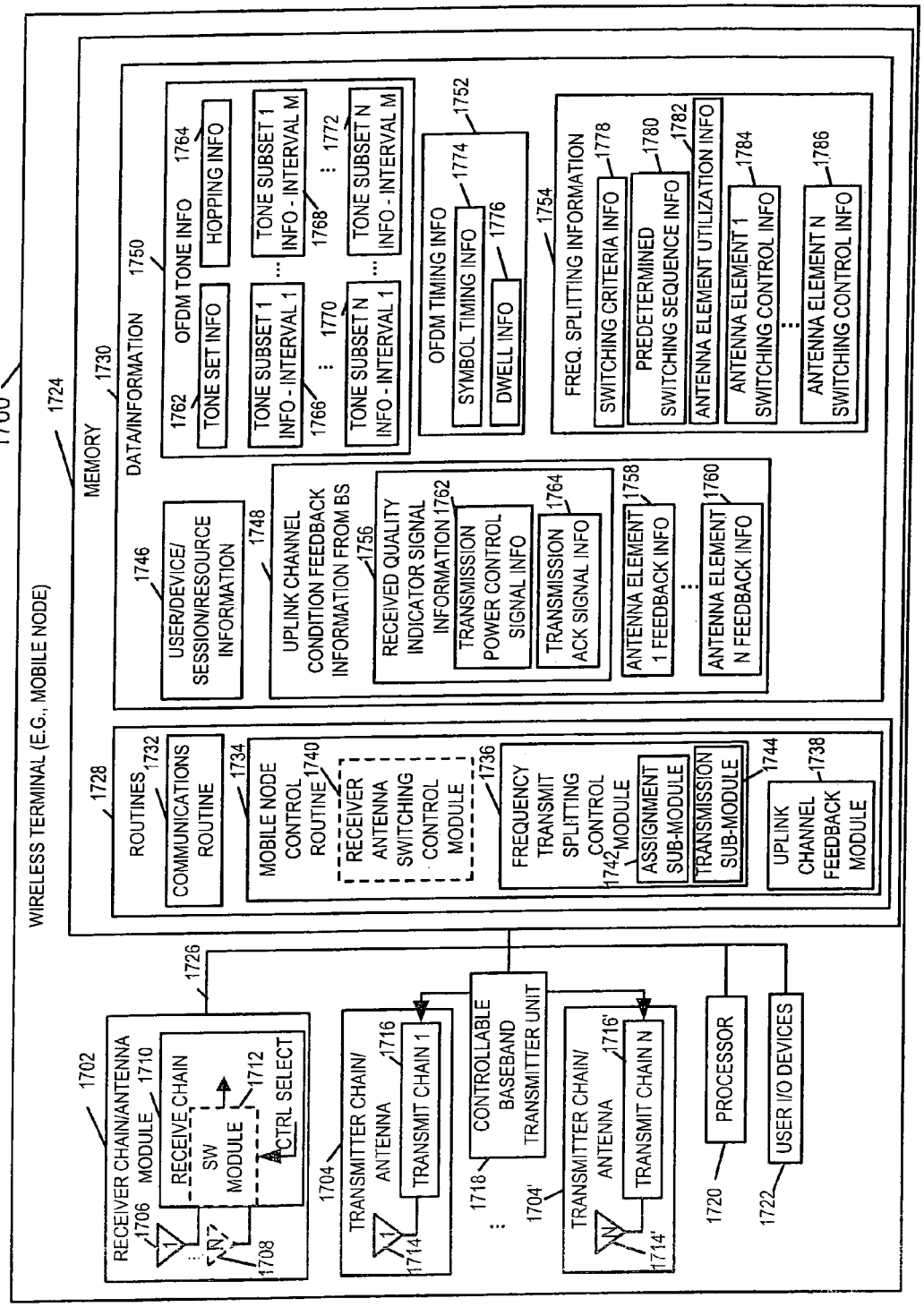
FIG. 19 illustrates another exemplary wireless terminal, implemented in accordance with the present invention and using methods of the present invention including assigning different tone subsets to different transmit antennas or antenna elements and simultaneously transmitting different assigned tone subsets using the different antennas or antenna elements.

FIG. 19 illustrates another exemplary wireless terminal (WT) 1700, e.g., mobile node (MN), implemented in accordance with the present invention. MN 1700 may be any of the exemplary MNs (14, 16, 14', 16') of FIG. 13. Exemplary WT 1700 may be used in conjunction with exemplary BS 1900 of FIG. 16. The mobile node 1700 may be used as a mobile terminal (MT). The mobile node 1700 includes receiver chain/antenna module 1702 and a plurality of transmitter chain/antenna modules (1704, 1704') with a controllable baseband transmitter unit 1718. The receiver chain/antenna module 1702 may be implemented similarly to or the same as that shown in FIG. 8. The plurality of transmitter chain/antenna modules (1704, 1704') with controllable baseband transmitter unit 1718 may be implemented the same as or similarly to any of the embodiments shown in FIG. 27, 28, or 29. The receiver chain/antenna module 1702 includes a receive antenna 1 1706 and a receiver chain 1710. In some embodiments receiver module 1702 includes multiple receive antennas or antenna elements (receive antenna 1 1706, receive antenna N 1708) and a controllable switching module 1712, e.g. switching circuitry. Using multiple transmitter chains/antenna modules 1704, 1704' with different set of frequencies or tones being transmitted at the same time on different antennas or antenna elements is used to obtain diversity, in accordance with the present invention. Transmitter chain/antenna module 1 1704 includes a transmit antenna 1714 coupled to a transmit chain 1716. Similarly, transmitter chain/antenna module N 1704' includes a transmit antenna 1714' coupled to a transmitter chain 1716'. The transmitter chains 1716, 1716' are coupled to the controllable baseband transmitter unit 1718. Receiver module 1702, controllable baseband transmitter unit 1718, a processor 1720, e.g., CPU, user I/O devices 1722, and a memory 1724 are coupled together via a bus 1726 over which the various elements may interchange data and information. User I/O devices 1722, e.g., keypads, keyboard, mouse, video camera, microphone, display, speaker, etc., allow the user of WT 1700 to input user data/information to peer nodes and output user data/information from peer nodes. Memory 1724 includes routines 1728 and data/information 1730.

Processor 1720, under control of one or more routines 1728 stored in memory 1724 causes the mobile node 1700 to operate in accordance with the methods of the present invention. Routines 1728 include communications routine 1732 and mobile node control routine 1734. Communications routine 1732 performs the various communications protocols and functions used by WT 1700. The mobile node control routine 1734 is responsible for insuring that the mobile node 1700 operates in accordance with the methods of the present invention.

The mobile node control routine 1734 includes a frequency transmit splitting control module 1736 and an uplink channel feedback module 1738. In some embodiments, e.g., embodiments including receiver controllable switching module 1712 and multiple receive antennas (1706, 1708), control routine 1734 includes a receiver antenna switching control module 1740. In such embodiments, receiver antenna switching control may be performed under direction of receiver antenna switching control module 1740 which, when executed by the processor 1720, is responsible for the generation of antenna switching control signal used to control switching performed by the switching circuits in modules 1712 in the receiver chain 1710.

The frequency transmit splitting control module 1736 controls the operation of the controllable baseband transmitter unit 1718 to split the frequencies, e.g., set of tones, used for transmission, thus routing some of the information using a first subset of tones to transmitter chain antenna module 1 1704 and some of the information using a second subset of tones, to transmitter chain/antenna module N 1704', the first and second subsets of tones being different from one another by at least one tone. In some embodiments, more than two antennas or antenna elements are used for simultaneous transmission and more than two subsets of tones are simultaneously transmitted, e.g., one subset of tones corresponding to each antenna or antenna element to be used simultaneously. In some embodiments, the different subsets of tones associated with different transmitter chains/antennas are mutually exclusive. In some embodiments, there is partial overlapping between the tone subsets. In accordance with the invention, WT 1700 can simultaneously transmit both first and second sets of tones, the first set of tones being convey by a first communications channel from antenna 1 1714 to the BS, and the second set of tones being conveyed by a second communications channel from antenna N 1714' to the same base station. The frequency splitting control module 1736 includes an assignment sub-module 1742 for assigning tones from a set of tones to a plurality of different tone sub-sets including at least a first and a second tone subset, each of said different tone subsets being different from one another by at least one tone. The frequency splitting control module 1736 also includes a transmission sub-module for controlling the transmission of the selected subsets of tones.

Assignment sub-module 1742 uses data/information 1730 including predetermined switching sequence information 1780, switching criteria information 1778, antenna element 1 feedback info 1758, antenna element N feedback info 1760, tone set info 1762, and/or hopping info 1764 to decide on and assign tones to the tone subsets (tone subset 1 info—interval 1 1766, tone subset N info—interval 1 1770, tone subset 1 info—interval M 1768, tone subset N info—interval M 1772). The assignment sub-module 1742 also generates and stores antenna element control information (antenna element 1 switching control information 1784, antenna element N switching control information 1786). Transmission sub-module 1744 uses the data/information 1730 including the tone subsets (1766, 1770, 1768, 1772), OFDM timing information 1752, and antenna element switching control information (1784, 1786) to implement the decisions of the assignment sub-module 1742 and control the operation of the controllable baseband transmitter unit 1718.

Uplink channel feedback module 1738 processes uplink channel quality feedback signals from the BS obtaining uplink channel condition feedback information from BS 1748 including transmission power control signal information 1762 and transmission acknowledgement signal information 1764. In many embodiments, the BS need not and does not know the tone subset information corresponding to particular WT transmit antenna chains/antennas (1704, 1704') used; however, the WT 1700 knowing the tone subset information (1766, 1770, 1768, 1772), e.g., weighting in terms of numbers of tones allocated to each antenna or antenna element during a specific dwell, correlates the feedback information 1756 to specific antenna elements and stores the information as antenna element 1 feedback information 1758, antenna element N feedback information 1760.

Data/information 1730 includes user/device/session/resource information 1746, uplink channel condition feedback information from the BS 1748, OFDM tone information 1750, OFDM timing information 1752, and frequency splitting information 1754. User/device/session/resource information 1746 includes user/device identification information, session information including peer node identification and routing information, and resource information including uplink and downlink segments assigned by the BS to WT 1700.

Uplink channel condition feedback information from BS 1748 includes received quality indicator signal information 1762 and a plurality of set of antenna element feedback information (antenna element 1 feedback information 1758), antenna element N feedback information 1760). The received quality indicator signal information 1756 includes transmission power control signal information 1762, e.g., a received power level of a WT uplink signal, an SNR value, a WT transmission power adjustment signal, etc. indicative of channel quality, and transmission acknowledgment signal information 1764, e.g., information from a received transmission acknowledgement signal indicating the success or failure in receipt of a WT transmitted uplink signal or signals. Antenna element 1 feedback information 1758 and antenna element N feedback information 1760 includes information which has been extracted and/or processed from the received quality indicator signal information 1762,1764 by WT 1700 to be associated with each of the transmitter chains/antennas (1704, 1704') used by the WT 1700.

OFDM tone information 1750 includes tone set information 1762, e.g., a set of tones used for uplink signaling by the WT, and hopping information 1764, e.g., uplink hopping sequence information including information defining a hopping sequence based on dwells which hops logical tones to physical tones. OFDM tone information 1750 also includes a plurality of tone subsets (tone subset 1 information—interval 1 1766, tone subset N information—interval 1 1770, tone subset 1 information—interval M 1768, tone subset N information—interval M 1772). Each tone subset of information (1766, 1770) being associated with a different transmitter chain/antenna (1704, 1704'), and the tone subsets (1766, 1770) are to be transmitted simultaneously, in accordance with the invention. Similarly, each of the tone subsets of information (1768, 1772) is associated with a different transmitter chain/antenna (1704, 1704'), and the tone subsets (1768, 1772) are to be transmitted simultaneously, in accordance with the invention. The weighting of tones, e.g., number of tones associated with each of the subsets, can change as a function of time. For example, during interval 1, tone subset 1 associated with transmitter chain/antenna 1 may use 6 tones and tone subset 2 associated with transmitter chain/antenna 2 may use 6 tones; however during the next successive interval, tone subset 1 associated with transmitter chain/antenna 1 may use 7 tones and tone subset 2 associated with transmitter chain 2/antenna 2 may use 5 tones. In addition, from dwell to dwell the set of tone may be hopped according to an uplink tone hopping sequence.

OFDM timing information 1752 includes symbol timing information 1774 and dwell information 1776. Symbol timing information including the timing defining the transmission of a single OFDM symbol conveying modulation symbols conveyed on each of the tones transmitted. Dwell information 1776 includes information identifying a number of successive of OFDM symbols, e.g., 7, where the uplink tone mapping from logical to physical tones does not change during the dwell; the tones being hopped differently from dwell to dwell. Dwell information 1752 also includes information identifying dwell boundaries. In accordance with some embodiments of the invention, changes in weighting to subsets are performed on dwell boundaries but not in-between.

In some embodiments, the frequency splitting is on a predetermined basis, e.g., the tones being divided among the plurality of transmitter chain/antenna modules (1704, 1704'), e.g., in an alternating sequence with respect to physical indexing numbers. In other embodiments, weighting between the different transmitter chain/antenna modules (1704, 1704') changes as a function of uplink channel condition feedback information 1748 and the switching criteria information 1778 in the frequency splitting criteria information 1754. For example, if the WT 1700 includes a first and second transmitter chain/antenna module 1704 and 1704' and the feedback information indicates that the channel qualities are substantially equivalent, e.g., the difference in channel qualities is below a first criteria level, the tones may be split evenly between the two modules 1704, 1704'. However, if the same exemplary WT determines that the quality of the channel corresponding to transmitter chain/antenna module 1704 is significantly better than the channel quality corresponding to transmitter module 1704', yet the channel quality of both channels is still acceptable, based on feedback information and comparisons to second and third criteria levels, then the frequency splitting control module 1736 can control baseband transmitter unit 1718 to dedicate more tones, e.g., twice as many tones to module 1704 as to module 1704'.

Frequency splitting information 1754 includes switching criteria information 1778, predetermined switching sequence information 1780, antenna element utilization information 1782, and a plurality of sets of antenna element switching control information (antenna element 1 switching control information 1784, antenna element N switching control information 1786). Switching criteria information 1778 includes threshold limits used by the assignment sub-module 1742 in evaluating the antenna element feedback info (1758, 1760) in making decisions as to whether, when, and to what extend to change the balance of tones split between the various transmitter chains/antennas (1704, 1704'). Predetermined switching sequence information 1780 includes a plurality of predetermined sequences that may be selected among by the assignment module. For example, a first predetermined sequence may alternate, e.g., on dwells, between (i) a 50-50 split of uplink tones between a first transmitter chain/antenna and second transmitter chain/antenna and (ii) a 60-40 split of uplink tones between the first transmitter chain/antenna and the second transmitter chain/antenna; a second predetermined sequence may alternate, e.g., on dwells, between (i) a 50-50 split of uplink tones between a first transmitter chain/antenna and second transmitter chain/antenna and (ii) a 40-60 split of uplink tones between the first transmitter chain/antenna and the second transmitter chain/antenna. In some embodiments, the WT shall follow a predetermined switching sequence, which does not change as a function of feedback information, e.g., a fixed predetermined sequence which results in equal or nearly equal frequency splitting among transmitter chains/antennas (1704, 1704') over time.

Figure 21:
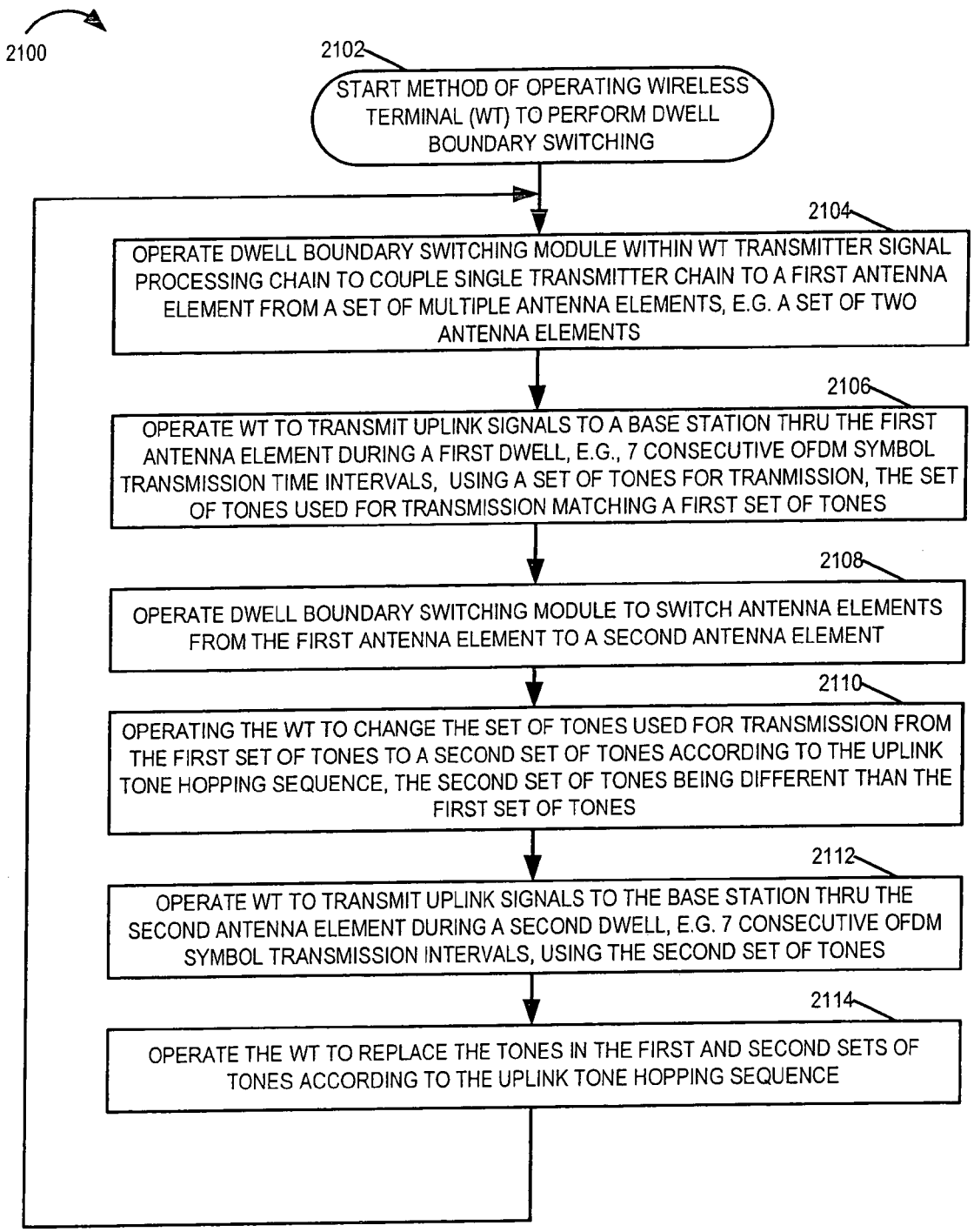
FIG. 21 is a flowchart of an exemplary method of operating a wireless terminal to communicate with a base station including performing dwell boundary switching of transmitter antenna elements, in accordance with the present invention.

FIG. 21 is a flowchart 2100 of an exemplary method of operating a WT to communicate with a base station including performing dwell boundary switching of transmitter antenna elements, in accordance with the present invention. The WT may be, e.g., an exemplary WT similar to or the same as WT 1500 of FIG. 17, and the BS may be, e.g., an exemplary BS similar to or the same as BS 1400 of FIG. 14. Operation starts in step 2102 and proceeds to step 2104. In step 2104, a dwell boundary switching module within the WT transmitter signal processing chain is operated to couple a first antenna element from a set of multiple antenna elements, e.g., a set of two antenna elements, to a single transmitter chain. Operation proceeds from step 2104 to step 2106. In step 2106, the WT is operated to transmit uplink signals to a base station through the first antenna element during a first dwell using a set of tones for transmission, the set of tones used for transmission matching a first set of tones. The first dwell is a set of consecutive OFDM symbol transmission time intervals, e.g., a set of 7 consecutive OFDM symbol transmission time intervals during which the tone assignments from logical tone designation to physical tone designation do not change.

Next, in step 2108, the dwell boundary switching module is operated to switch antenna elements from the first antenna element to the second antenna element. Operation proceeds from step 2108 to step 2110. In step 2110, the WT is operated to change the set of tones used for transmission from the first set of tones to a second set of tones according to an uplink tone hopping sequence, the second set of tones being different than the first set of tones. Next, in step 2112, the WT is operated to transmit uplink signals to the base station through the second antenna element during a second dwell using the second set of tones. Operation proceeds from step 2112 to step 2114, in which the WT is operated to replace the tones in the first and second sets of tones according to the uplink tone hopping sequence 2114. Operation proceeds from step 2114 to step 2104.

The operations of flowchart 2100 result in a predetermined and periodic switching sequence between first and second antenna elements. Assuming that the exemplary WT has only two transmitter antenna elements, the operations of flowchart 2100 result in uniform utilization of antenna elements. In some embodiments, each of the antenna elements are oriented in a different direction. In some embodiments, the first and second antenna elements are spaced apart so that a different communications path exists between each of the first and second antenna elements and the base station. In some embodiments, the spacing between antenna elements is a t least ¼ of a wavelength of the lowest frequency tone transmitted from the antenna element.

The methods of flowchart 2100 can be extended to include embodiments with more than two antenna elements. In addition in some embodiments, the antenna may remain coupled to a selected antenna element for more than one consecutive dwell, e.g., a fixed number of dwells greater than 1, before switching to a different antenna element.

Figure 22:
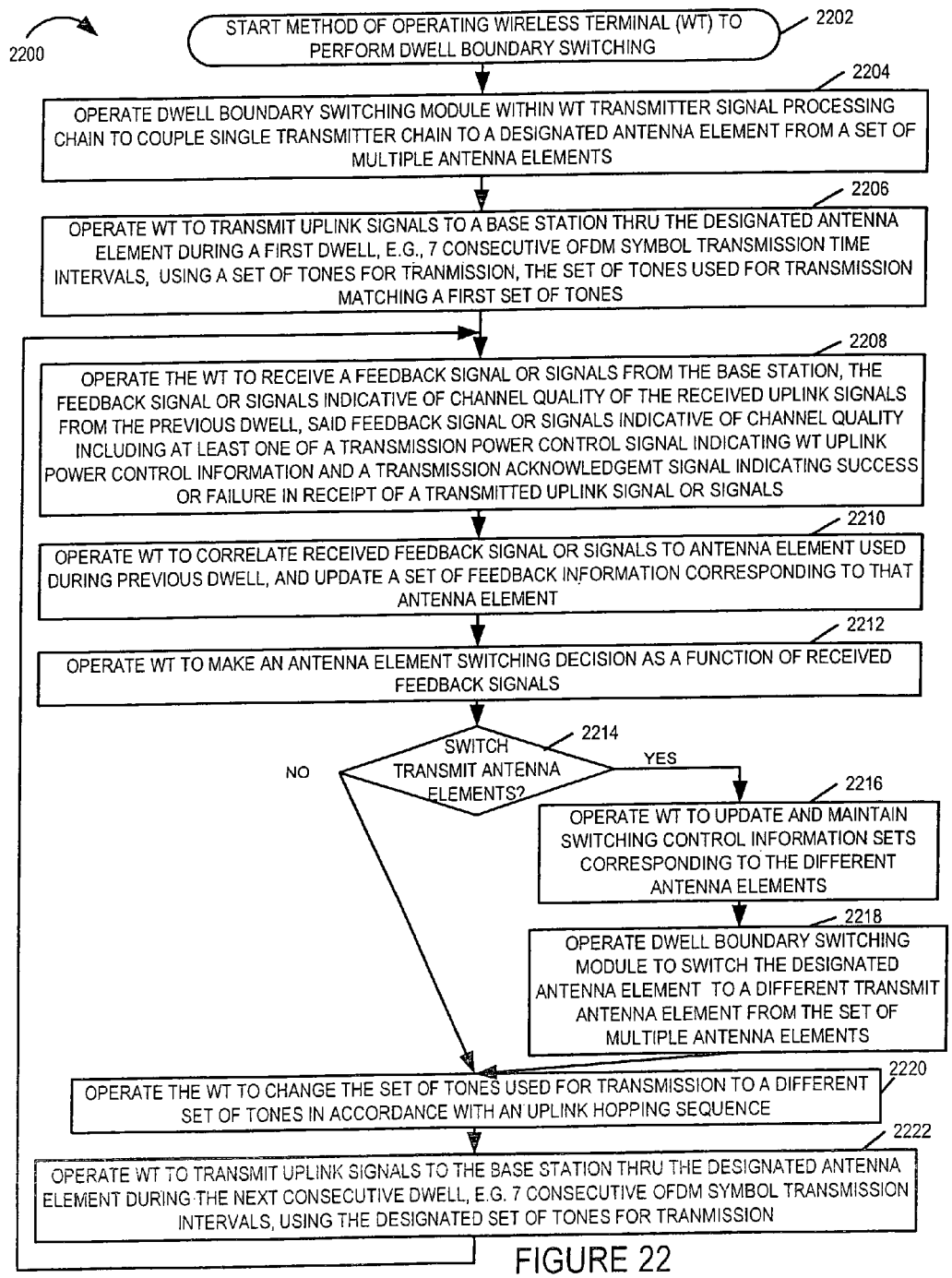
FIG. 22 is a flowchart of an exemplary method of operating a wireless terminal to communicate with a base station including performing dwell boundary switching of transmitter antenna elements based on quality indicator feedback information, in accordance with the present invention.

FIG. 22 is a flowchart 2200 of an exemplary method of operating a WT to communicate with a base station including performing dwell boundary switching of transmitter antenna elements, in accordance with the present invention. The WT may be, e.g., an exemplary WT similar to or the same as WT 1500 of FIG. 17, and the BS may be, e.g., an exemplary BS similar to or the same as BS 1400 of FIG. 14. Operation starts in step 2202 and proceeds to step 2204, where a dwell boundary switching module within the WT transmitter signal processing chain is operated to couple the single transmitter chain of the WT to a designated antenna element form a set of multiple antenna elements, e.g., two transmit antenna elements. Then, in step 2206, the WT is operated to transmit uplink signals to a base station through the designated antenna element during a first dwell using a set of tones for transmission, the set of tones used for transmission matching a first set of tones. The first dwell is, e.g., a set of seven consecutive OFDM symbol transmission time intervals. Operation proceeds from step 2206 to step 2208. In step 2208, the WT is operated to receive a feedback signal or signals from the base station, the feedback signal or signals indicative of channel quality of the received uplink signals from the previous dwell. The feedback signal or signals that are indicative of channel quality include at least one of a transmission power control signal indicating WT uplink power control information and a transmission acknowledgement signal indicating success or failure in receipt of a transmitted uplink signal or signals. Operation proceeds from step 2208 to step 2210. In step 2210, the WT is operated to correlate received feedback signals or signals to the antenna element that was used during the previous dwell and update a set of feedback information corresponding to that antenna element. The base station, which sent the feedback information, need not, and in many embodiments, does not know which antenna element was used for transmission of that dwell, the WT performing the tracking and matching of antenna elements used with received feedback information. In step 2212, the WT is operated to make an antenna element switching decision as a function of received feedback signals. For example, if the power control feedback signal indicates that the WT transmission power level should remain constant or be reduced and the ack/nak signals indicate a very high ratio of acks to naks, indicating a strong and reliable uplink signal, the WT can be allowed to remain coupled to the currently selected transmitter antenna element. However, if the power control feedback signal indicates that a large increase in WT transmission power is required and/or the ack/nak signals indicate a very high ratio of naks to acks, then the WT can decide to switch to another antenna element, e.g., selecting an antenna element expected to produce a large channel variation, e.g., an antenna element with the greatest spacing and/or largest orientation difference with respect to the currently selected antenna element. Stored information on the quality of channels with previous WT transmission antenna element connections can also be used in the selection process. In a case, where the quality indicator information indicates a marginal condition, the WT can be operated to select an antenna element with a slight difference in spacing or orientation with respect to the currently selected antenna element.

Operation proceeds from step 2212 to step 2214. In step 2214, operation proceeds based upon whether or not the WT has decided to switch antenna elements. If the WT has decided in step 2212 not to switch antenna elements, then operation proceeds from step 2214, to step 2220; otherwise operation proceeds to step 2216. In step 2216, the WT is operated to update and maintain switching control information sets corresponding to different antenna elements, e.g., operations including setting a bit corresponding to the antenna element to be connected to the single transmitter chain and clearing a bit corresponding to the antenna element to be disconnected from the single transmitter chain. Operation proceeds from step 2216 to step 2218, in which the dwell boundary switching module is operated to switch the designated antenna element to a different transmit antenna element form the set of multiple antenna elements, the different antenna element being the antenna element selected in step 2212 and configured with control activation information in step 2216. In accordance with the invention, switching is controlled to be performed at dwell boundaries, but not in-between. Operation proceeds form step 2218 to step 2220.

In step 2220, the WT is operated to change the set of tones used for transmission to a different set of tones in accordance with an uplink hopping sequence. Then in step 2222, the WT is operated to transmit uplink signals to the base station through the designated antenna element during the next consecutive dwell, e.g., 7 consecutive OFDM symbol transmission intervals, using the designated set of tones for transmission from step 2220. Operation proceeds from step 2222 back to step 2208.

The operations of flowchart 2200 result in dwell switching between a plurality of antenna elements based upon uplink channel quality feedback information. In some embodiments, each of the antenna elements are oriented in a different direction. In some embodiments, the antenna elements are spaced apart so that a different communications path exists between each antenna elements and the base station. In some embodiments, the spacing between antenna elements is at least ¼ of a wavelength of the lowest frequency tone transmitted from the antenna element.

The methods of flowchart 2200 include embodiments with only two antenna elements and embodiments with more than two antenna elements. In addition in some embodiments, the antenna may remain coupled to a selected antenna element for more than one consecutive dwell, e.g., a fixed number of dwells greater than 1, before a switching decision is performed as to whether to switch to another antenna element. In some embodiments, feedback information is communicated more frequently or less frequently than once per dwell.

Figure 23:
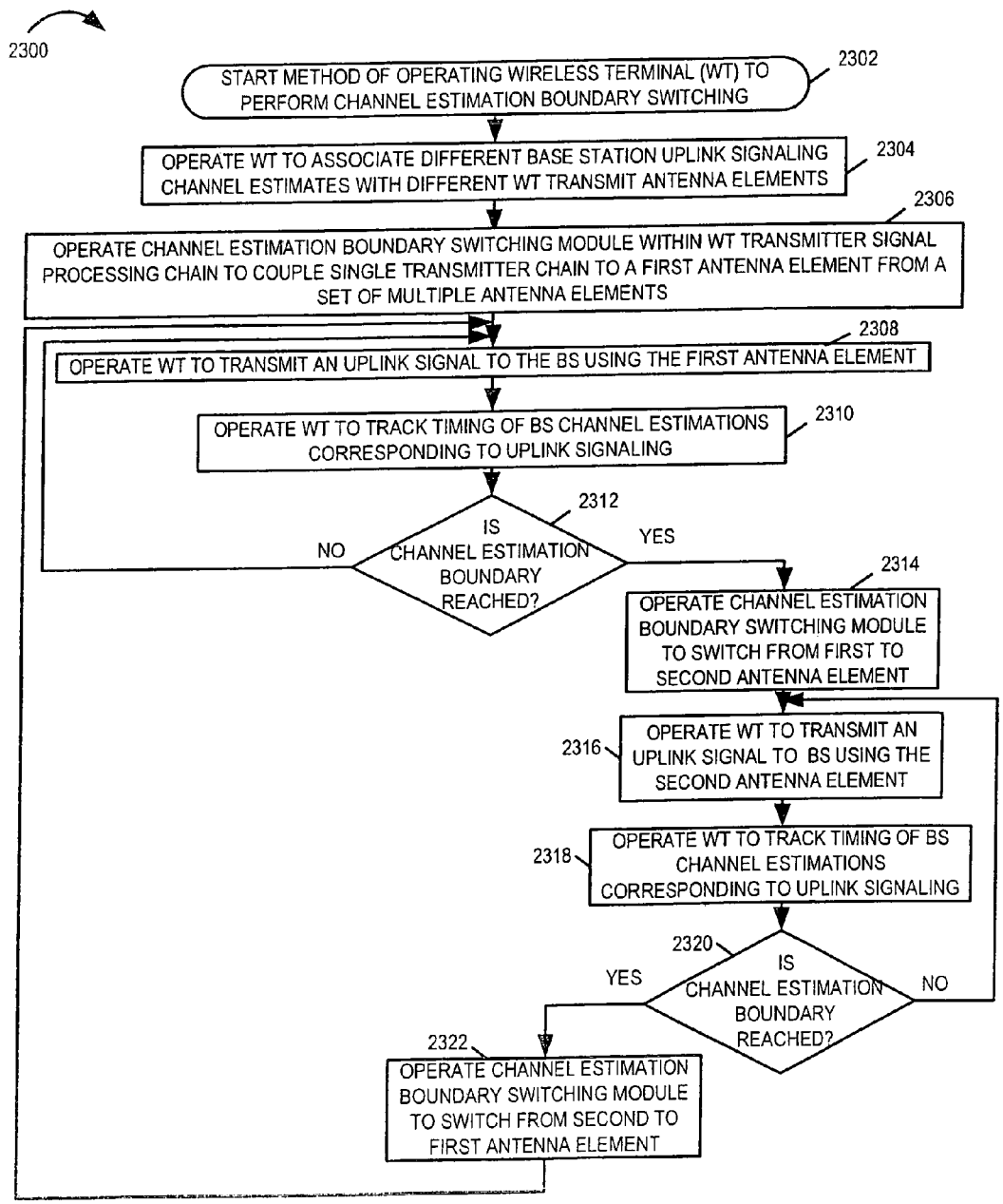
FIG. 23 is a flowchart of an exemplary method of operating a wireless terminal to communicate with a base station including performing channel estimation boundary switching of transmitter antenna elements, in accordance with the present invention.

FIG. 23 is a flowchart 2300 of an exemplary method of operating a WT to communicate with a base station including performing channel estimation boundary switching of transmitter antenna elements, in accordance with the present invention. The WT may be, e.g., an exemplary WT similar to or the same as WT 1600 of FIG. 18, and the base station may be, e.g., an exemplary BS similar to or the same as BS 1800 of FIG. 15. Operation starts in step 2302 and proceeds to step 2304. In 2304, the WT is operated to associate different base station uplink signaling channel estimates with different WT transmitter antenna elements. For example, based on some received downlink broadcast signals from the base station, the WT obtains information used to determine the timing of the base station with regard to its channel estimations of received uplink signaling, e.g., information defining boundaries between a plurality of channel estimates being performed and/or information defining boundaries defining initialization or resets of channel estimates. For example, if the base station alternates periodically between two channel estimates of uplink signaling, and the WT has two transmit antenna elements, the wireless terminal may associate a first channel estimate with a first antenna element and a second channel estimate with a second antenna element, and synchronize its uplink signaling timing such to correspond to the distinct BS channel estimates. Then, in step 2306, a channel estimation boundary switching module within the WT transmitter signal processing chain is operated to couple a first antenna element from a set of multiple antenna elements, e.g., a set of two antenna elements, to a single transmitter chain. Operation proceeds from step 2306 to step 2308. In step 2308, the WT is operated to transmit an uplink signal to the base station using the first antenna element, and in step 2310 the WT is operated to track the timing of the BS channel estimations corresponding to the uplink signaling.

Operation proceeds from step 2310 to step 2312, where a check is performed as to whether a channel estimation boundary is reached. If a channel estimation boundary is not reached operation proceeds to step 2308, where the WT is operated to transmit an additional uplink signal using the same antenna element, the first antenna element. However, if it is determined in step 2312 that a channel estimation boundary was reached, then operation proceeds from step 2312 to step 2314. In step 2314, the channel estimation boundary switching module is operated to switch from the first antenna element to the second antenna element. Operation proceeds from step 2314 to step 2316. In step 2316, the WT is operated to transmit an uplink signal to the BS using the second antenna element, and in step 2318 the WT is operated to track the timing of the BS channel estimations corresponding to uplink signaling.

Operation proceeds from step 2318 to step 2320, where a check is performed as to whether a channel estimation boundary is reached. If a channel estimation boundary is not reached operation proceeds to step 2316, where the WT is operated to transmit an additional uplink using the same antenna element, the second antenna element. However, if it is determined in step 2320 that a channel estimation boundary was reached, then operation proceeds from step 2320 to step 2322. In step 2322, the channel estimation boundary switching module is operated to switch from the second antenna element to the first antenna element. Operation proceeds from step 2322 to step 2308, where the WT is operated to transmit an uplink signal to the BS using the first antenna element.

The operations of flowchart 2300 result in a predetermined and periodic switching sequence between first and second antenna elements. Assuming that the exemplary WT has only two transmitter antenna elements, the operations of flowchart 2300 can result in uniform utilization of antenna elements. In some embodiments, each of the antenna elements is oriented in a different direction. In some embodiments, the first and second antenna elements are spaced apart so that a different communications path exists between each of the first and second antenna elements and the base station. In some embodiments, the spacing between antenna elements is at least ¼ of a wavelength of the lowest frequency tone transmitted from the antenna element.

The methods of flowchart 2300 can be extended to include embodiments with more than two antenna elements. The method of flowchart 2300 is well suited for both OFDM and CDMA applications. In some OFDM embodiments, channel estimation boundaries may correspond to dwell boundaries or multiples of dwell boundaries. In some CDMA embodiments, each of the different channel estimates may correspond to different codewords.

Figure 24:
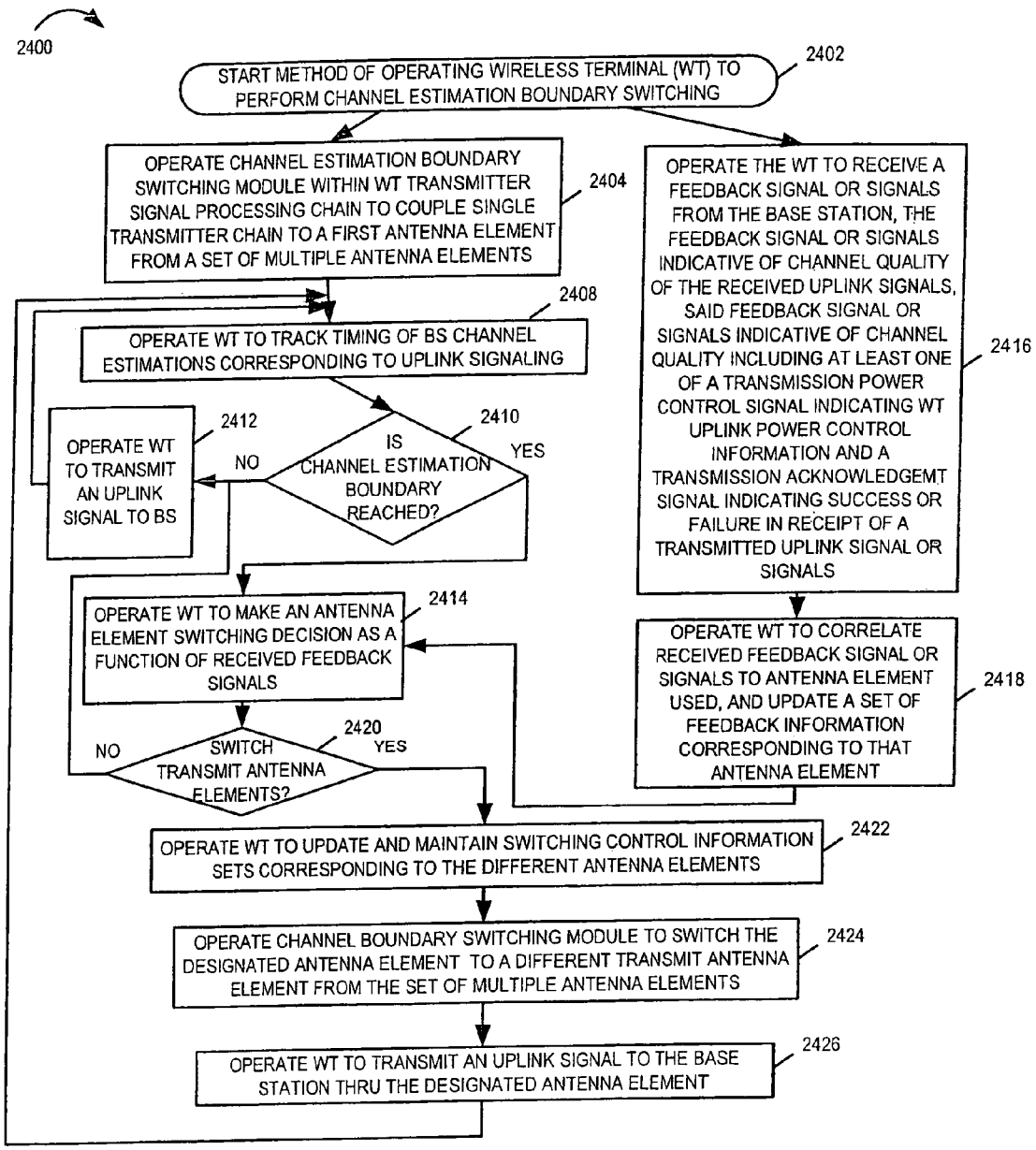
FIG. 24 is a flowchart of an exemplary method of operating a wireless terminal to communicate with a base station including performing channel estimation boundary switching of transmitter antenna elements based on quality indicator feedback information, in accordance with the present invention.

FIG. 24 is a flowchart 2400 of an exemplary method of operating a WT to communicate with a base station including performing channel estimation boundary switching of transmitter antenna elements, in accordance with the present invention. The WT may be, e.g., an exemplary WT similar to or the same as WT 1600 of FIG. 18, and the base station may be, e.g., an exemplary BS similar to or the same as BS 1800 of FIG. 15. Operation starts in step 2402 and proceeds to step 2404 and step 2416 in parallel. In step 2404 a channel estimation boundary switching module within the WT transmitter signal processing chain is operated to couple the single transmitter chain of the WT to a designated antenna element form a set of multiple antenna elements. Then, in step 2408, the WT is operated to track the timing of the BS channel estimations corresponding to uplink signaling. For example, based on some received downlink broadcast signals from the base station, the WT obtains information used to determine the timing of the base station with regard to its channel estimations of received uplink signaling, e.g., information defining boundaries between a plurality of channel estimates being performed and/or information defining boundaries defining initialization or resets of channel estimates. For example, consider an exemplary embodiment where the BS performs a channel estimate of received uplink signaling which it uses for a fixed interval, reinitializes the estimate filter, and then starts another estimate which it uses for a subsequent interval of the same duration, and periodically repeats this method of channel estimation. Broadcast timing information from the BS may allow the WT to synchronize its uplink signaling with these channel estimation boundaries. Operation proceeds from step 2408 to step 2410 where a check is performed as to whether a channel estimation boundary is reached. If a channel estimation boundary has not been reached, then operation proceeds from step 2410 to step 2412. In step 2412, the WT is operated to transmit an uplink signal to the BS, and operation returns to step 2408. However, if a channel estimation boundary was reached in step 2410, then operation proceeds to step 2414, where the WT is operated to make an antenna element switching decision as a function of received feedback signals.

Returning to step 2416, in step 2416, the WT is operated to receive a feedback signal or signals from the base station, the feedback signal or signals indicative of channel quality of the received uplink signals. The feedback signal or signals indicative of channel quality of received uplink signals including at least one of a transmission power control signal indicating WT uplink power control information and a transmission acknowledgement signal indicating success or failure in receipt of transmitted uplink signal or signals. Operation proceeds from step 2416 to step 2418. In step 2418, the WT is operated to correlate the received signal or signals to an antenna element used and update a set of feedback information corresponding to that antenna element. The base station, which sent the feedback information, need not, and in many embodiments, does not know which antenna element was used for transmission of the uplink signals corresponding to that channel estimation, the WT performing the tracking and matching of antenna elements used with received feedback information. The information of step 2418 is made available to the WT to be used in making the antenna element switching decision of step 2414.

In step 2414, quality indicator information corresponding to the currently selected antenna element may be compared to thresholds used for maintaining the connection. Quality indicator information corresponding to the set of candidate replacement antenna elements may be used to determine which antenna element to select when a decision has been made to switch. In addition, in some embodiments, switching may be performed, e.g., periodically, between antenna elements, irrespective or with minimal concern for the stored channel quality information, for the purposes of obtaining new channel quality information and evaluating alternate channels corresponding to alternate antenna elements. Operation proceeds from step 2414 to step 2420.

If in step 2414, a decision has been made to remain on the currently selected antenna element, then operation proceeds from step 2420 to step 2412, where the WT is operated to transmit an uplink signal to the BS. However, if the WT has decided to switch transmitter antenna elements, then operation proceeds from step 2420 to step 2422. In step 2422, the WT is operated to update and maintain switching control information sets corresponding to different antenna elements, e.g., setting a control bit corresponding to activation of the newly selected antenna element and clearing a control bit corresponding to the previously used antenna element. Then, in step 2424, the channel boundary switching module is operated to switch the designated antenna element used for transmission to a different antenna element from the set of multiple antenna elements, e.g., the antenna element selected in step 2414 and configured for in step 2422. In accordance with the invention, switching is controlled to be performed at signal boundaries corresponding to base station channel estimation signal boundaries, but not in-between. Operation proceeds form step 2224 to step 2426.

In step 2426, the WT is operated to transmit an uplink signal to the base station thru the designated antenna element. Operation proceeds from step 2426 to step 2408.

The method of flowchart 2400 is well suited for both OFDM and CDMA applications. In some OFDM embodiments, channel estimation boundaries may correspond to dwell boundaries or multiples of dwell boundaries. In some OFDM embodiments, each channel estimation signal interval includes multiple OFDM symbol transmission time periods and the tones used the WT in each channel estimation signal interval are determined according to a tone hopping sequence. In some CDMA embodiments, each of the different channel estimates may correspond to different codewords.

In some embodiments, each of the antenna elements is oriented in a different direction. In some embodiments, the first and second antenna elements are spaced apart so that a different communications path exists between each of the first and second antenna elements and the base station. In some embodiments, the spacing between antenna elements is at least ¼ of a wavelength of the lowest frequency tone transmitted from the antenna element.

Figure 25:
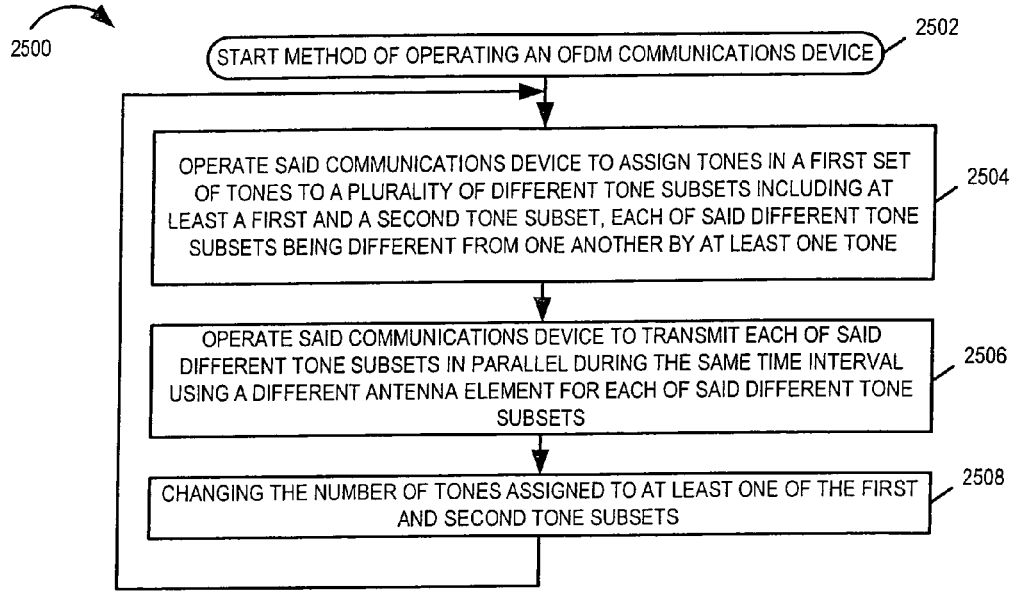
FIG. 25 is a flowchart of an exemplary method of operating an OFDM communication device including assigning different tone subsets to different antenna elements and transmitting over multiple antenna elements in parallel, in accordance with the present invention.

FIG. 25 is a flowchart 2500 of an exemplary method of operating an exemplary OFDM communications device, e.g., an exemplary WT similar to or the same as WT 1700 of FIG. 18, including assigning different tone subsets to different antenna elements and transmitting over multiple antenna elements in parallel, in accordance with the present invention. Operation starts in step 2502 and proceeds to step 2504. In step 2504, the communications device is operated to assign tones in a first set of tones to a plurality of different tone subsets including at least a first and a second tone subset, each of said different tone subsets being different form one another by at least one tone. In some embodiments, the tones assigned to the first and second tone subset are mutually exclusive. Operation proceeds from step 2504 to step 2506. In step 2506, the communications device is operated to transmit each of said different tone subsets in parallel during the same time interval using a different antenna element for each of said different tone subsets. Operation proceeds from step 2506 to step 2508, where the communications device changes the number of tones assigned to at least one of the first and second tone subsets. Operation proceeds from step 2508 back to step 2504. In some embodiment, the assignment of tones changes on a periodic basis.

In some embodiments, the communications device of the flowchart 2500 is a wireless terminal transmitting uplink signals, e.g., uplink signals using tones which are hopped according to an uplink hopping sequence on a dwell by dwell basis, to a base station, and the base station receives the uplink signals. In other embodiments, the communications device of the flowchart 2500 is a base station, e.g., similar to or the same as exemplary BS 1900 of FIG. 16, transmitting downlink signals, e.g., downlink signals using tones which are hopped according to a downlink hopping sequence for each OFDM symbol transmission time interval, and a wireless terminal receives the downlink signals.

Figure 26:
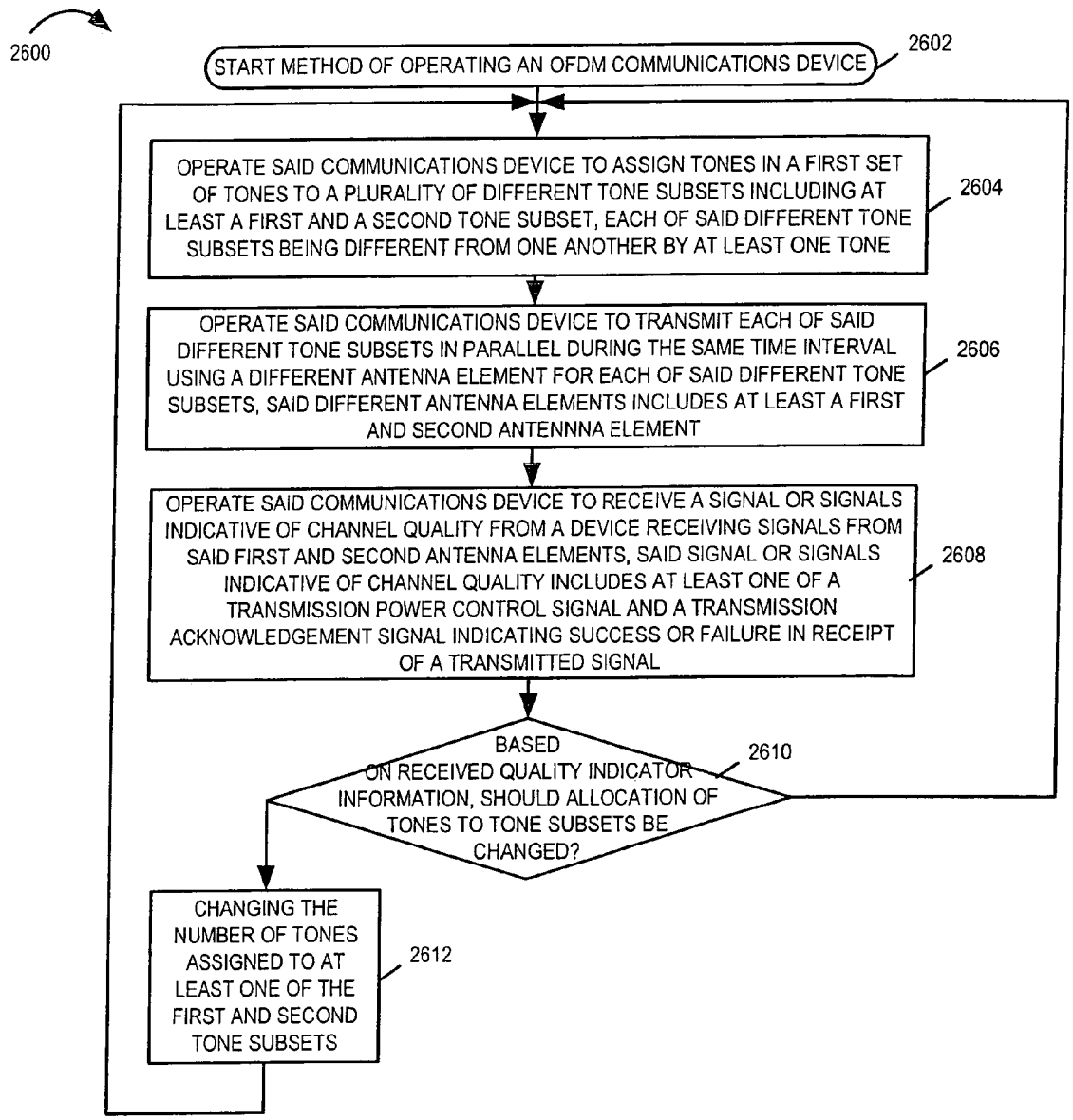
FIG. 26 is a flowchart of an exemplary method of operating an OFDM communications device including receiving and processing channel quality indicator information, assigning different tone subsets to different antenna elements, and transmitting over multiple antenna elements in parallel, in accordance with the present invention.

FIG. 26 is a flowchart 2600 of an exemplary method of operating an exemplary OFDM communications device, e.g., an exemplary WT similar to or the same as WT 1700 of FIG. 19, including receiving and processing channel quality indicator information, assigning different tone subsets to different antenna elements, and transmitting over multiple antenna elements in parallel, in accordance with the present invention. Operation starts in step 2602 and proceeds to step 2604. In step 2604, the communications device is operated to assign tones in a first set of tones to a plurality of different tone subsets including at least a first and a second tone subset, each of said different tone subsets being different from one another by at least one tone. In some embodiments, the assignment of tones changes on a periodic basis. Operation proceeds from step 2604 to step 2606, where the communications device is operated to transmit each of said different tone subsets in parallel during the same time interval using a different antenna element for each of said different tone subsets, said different antenna elements including at least a first and second antenna element. Operation proceeds from step 2606 to step 2608. In step 2608, the communications device is operated to receive a signal or signals indicative of channel quality including at least one of a transmission power control signal indicative of the communication device transmission power and a transmission acknowledgement signal indicating success or failure in the receipt of a communication device transmitted signal or signals.

Then, in step 2610, based on the received quality indicator information, the communications device decides whether or not the allocation of tones to tone subsets should be changed. For example, if there is insufficient quality indicator information stored to make a reasonable judgment as to which antenna element has better channel quality and should be favored, then the communications device may decide to change the allocation of tones to favor one antenna, such that quality indicator feedback information may be collected with a high weighting toward an individual antenna element, and the communications device may periodically cycle through each of the antenna elements. If sufficient information exists to make a tone allocation decision, the communications device can decide to change allocation of tones to tone subsets to attempt to achieve more favorable channel conditions, e.g., changes resulting in a lower WT transmission power level to achieve the same ack/nak ratio, changes resulting in an improved ack/nak ration, and/or changes resulting in lower communications device transmission power levels. If it is decided in step 2610 not to change the allocation of tones to tone subsets, then operation returns to step 2604. However, if it is decided in step 2610 that the allocation of tones to tone subsets should be changed, then operation proceeds to step 2612, where the communications device is operated to change the number of tones in at least one of the first and second tone subsets. In some embodiments, the first tone subset is allocated a plurality of tones and the second tone subset is allocated zero tones. Operation proceeds from step 2612 to step 2604.

In some embodiments, the tone allocation is performed as a function of multiple signals received from the device communicating with the communications device and the method includes maintaining different sets of tone allocation control information for signals received from said device communicating with said communications device corresponding to signals transmitted from said communications device using different antenna elements.

In some embodiments, the communications device of the flowchart 2600 is a wireless terminal transmitting uplink signals, e.g., uplink signals using tones which are hopped according to an uplink hopping sequence on a dwell by dwell basis, to a base station, and a base station receives the uplink signals and transmits feedback channel quality signals. In other embodiments, the communications device of the flowchart 2600 is a base station, e.g. BS 1900 of FIG. 16, transmitting downlink signals, e.g., downlink signals using tones which are hopped according to a downlink hopping sequence for each OFDM symbol transmission time interval, and a wireless terminal receives the downlink signals and transmits feedback channel quality signals.

The invention will now be described further. While portions of the following discussion may repeat some of the above discussion, features of some embodiments are discussed in greater detail. As discussed above, the invention uses a novel technique that enables a mobile transmitter to realize uplink transmit diversity without any significant cost or complexity using a single RF chain and multiple physical antennas.

For the sake of illustration, consider the invention in the context of the spread spectrum OFDM (orthogonal frequency division multiplexing) multiple-access system. Note that the present transmit diversity technique is applicable to other systems as well.

In the exemplary OFDM system, tones hop to realize spread spectrum advantages. In the downlink (from the base station to the wireless terminal), tones hop every OFDM symbol. Every logical tone is mapped to a different physical tone and this mapping is varied on every OFDM symbol boundary. This hopping ensures that a coding block including some subset of logical tones is spread across the entire available frequency band. In the uplink (from the wireless terminal to the base station), every logical tone is mapped to a physical tone with the mapping held constant for a few OFDM symbol periods. This duration is known as a dwell period. The process of uplink hopping across dwell periods is illustrated in 5.

The invention can be used at the transmitter of the wireless terminal to achieve transmit diversity in the cellular uplink. The invention requires the mobile transmitter to have multiple physical transmit antennas, but does not require it to include multiple RF chains. A preferred embodiment of the invention is to switch the transmit antennas at the dwell boundaries of the uplink signal.

To illustrate this, consider FIG. 6, which illustrates a codeword being transmitted on the uplink over four successive dwell periods. Assume that the mobile transmitter has two physical transmit antennas and a single RF chain as illustrated in FIG. 3. While the transmitter illustrated in FIG. 3 is representative of any system that uses selection diversity, this invention achieves transmit diversity on a fast time-scale within a codeword. A switching module operating under direction of a switching control module in the transmitter can direct the transmit signal through either of the transmit antennas. The switching control module in one embodiment is aware of dwell information. The switching control module may receive such information and/or switching instructions from a baseband unit in the mobile transmitter. The switching control module instructs the switching unit to transmit the codeword through antenna 1 in dwells 1 and 3, and antenna 2 in dwells 2 and 4. At the receiver, part of the coding block experiences the channel response $H_1$ from antenna 1, and part of it experiences the response $H_2$ from antenna 2. In one exemplary OFDM system, the base station receiver does not assume any channel coherence from one dwell to another and estimates the channel independently within each dwell. Thus, switching on dwell boundaries does not interfere with base station channel estimates or necessitate additional estimates. Then, switching transmit antennas at the dwell boundaries does not affect the operations carried out at the receiver. Indeed, in this situation, the base station receiver may not even be aware of the use of the present transmit diversity invention. Assuming the channel responses $H_1$ and $H_2$ are independent, the receiver may realize diversity gain over the coding block.

In general, Let N denote the number of the transmit antennas at the mobile transmitter and let $\{H_k, k=1\ldots, N\}$ denote the wireless channel response from each of the transmit antennas to the receiver. The transmit antennas are preferably spatially arranged in such a manner that the ensemble of channel responses, $\{H_k\}$, are substantially independent. In some embodiments the antennas are spaced apart by more than ½ the wavelength of a carrier frequency being used to transmit the signals. In many cases antenna spacing is more than one carrier wavelength apart. By switching from one transmit antenna to another over the length of a coding block, the effective channel response from the transmitter to the receiver varies among $\{H_k\}$, therefore realizing transmit diversity. As another generalization of the invention, the transmitter may switch the antenna once every dwell or once every few dwells.

In the above descriptions, the switching block at the transmitter chooses each of the transmit antennas substantially equally. However, non-equal use of antennas is possible. In some embodiments the base station provides channel feedback information to the mobile indicating the quality of the uplink channels corresponding to the different antennas being used. The mobile responds to used information by controlling the switching module to cause the antenna or antennas corresponding to the better channel(s) to be used more than the antennas which correspond to lower quality channels. Suppose that the base station the receiver feeds back some indication of the channel quality to the transmitter. The transmitter can find out which transmit antenna results in better channel quality and choose to either use that antenna for a substantial fraction of the time. The transmitter normally continues to use the antenna that is known to be less desirable for at least some period of time in order that the base station receiver may monitor changing channel conditions. The base station may then instruct the mobile transmitter to switch the antennas according to the time-varying channel conditions. The feedback and antenna channel selection technique is particularly useful where channel conditions vary slowly, e.g., remain constant over multiple dwells. Such conditions may be encountered, e.g., in cases where a wireless terminal remains stationary for a period of time, e.g., while a person is working from the same location for the duration of a communications session.

This inventive form of realizing transmit diversity at the mobile transmitter may be coupled with traditional forms of realizing receive diversity at the base station receiver as well to yield additional diversity gains.

This embodiment of the invention is particularly valuable in the context of the cellular uplink since it requires a single RF chain at the transmitter. This substantially reduces the cost and complexity of realizing transmit diversity gains on a mobile device.

Various aspects of uplink transmit diversity using tone-splitting shall now be further described. Various embodiments of the proposed invention also incorporates another technique to achieve uplink transmit diversity in the context of the exemplary OFDM multiple-access system. This embodiment of the invention requires the mobile transmitter to simultaneously transmit information using more than one transmit antenna.

For the sake of illustration, consider a mobile transmitter that has two transmit antennas. A subset of tones in each OFDM symbol is transmitted through the first antenna, with the remaining set of tones being transmitted through the second antenna as illustrated in FIG. 9. In the exemplary OFDM system, the uplink hopping sequence that maps logical to physical tones is varied on dwell boundaries. Therefore, the subset of tones that are transmitted through each antenna is kept fixed for the entire dwell, thus maintaining channel coherence at the receiver. Once again, the base station receiver does not need to be explicitly aware of the tones being split among the different antenna at the transmitter.

When a codeword is transmitted over several dwell periods in this manner, diversity gain is realized at the receiver since different parts of the codeword are received over different channels corresponding to the responses from the multiple transmit antennas.

There can be several different motivations to determine the tone splitting. Tones may be split in a manner that maximizes the diversity gain for a particular uplink channel. Another motivation may be to minimize the peak-to-average ratio for any of the power amplifiers driving each of the antennas.

A practical benefit of the tone-splitting benefit is the ability to transmit at higher power without disproportionately increased cost. In the embodiment of this invention that uses two transmit antennas, the power amplifiers driving the antennas can be rated at 1 W (watt) each, leading to a total power of 2 W (watts). This is typically much lower in cost when compared to a single power amplifier that is rated at 2 W (watts).

Figure 27:
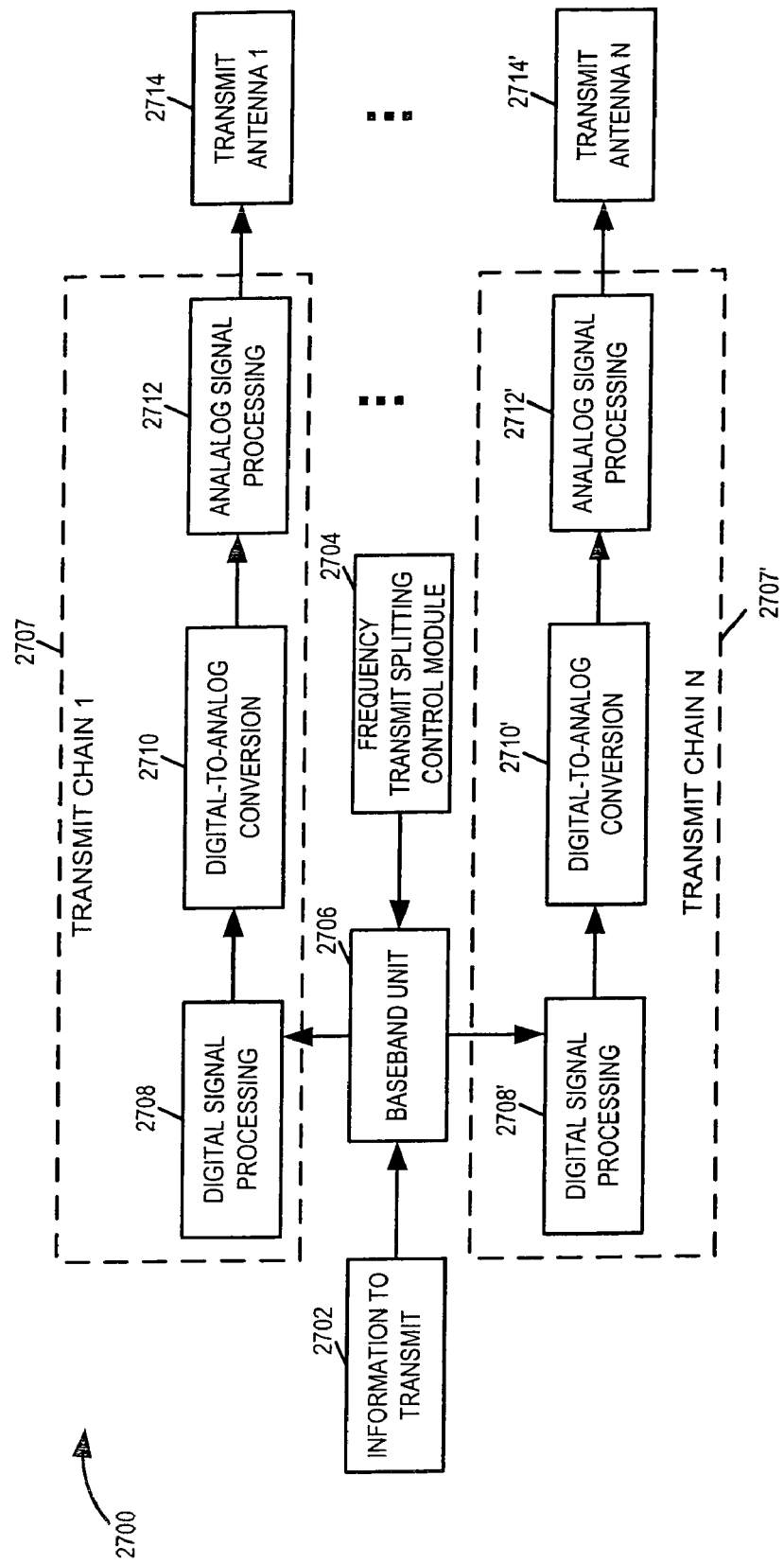
FIG. 27 is a drawing illustrating an exemplary transmitter configuration which may be used in tone-splitting embodiments of the present invention.

This technique can be generalized easily to multiple antennas. Each physical transmit antenna is coupled to an RF chain as illustrated in FIG. 27. FIG. 27 is a drawing 2700 illustrating an exemplary transmitter configuration which may be used in tone-splitting embodiments of the present invention. The exemplary transmitter of FIG. 27 includes a single baseband unit 2706 and a single frequency transmit splitting control module 2704. The baseband unit 2706 receives information to transmit 2702, e.g., encoded user data, and control signals from the frequency transmit splitting control module 2704. The information 2702 is mapped to a set of tones to be used for transmission. Different subsets of tones are formed from the set of tones, the different tone subsets being different from one another by at least one tone. In some embodiments, the different subsets of tones are mutually exclusive. In some embodiments, tone subsets may overlap. In some embodiments, the number of tones in each subset are the same. In some embodiments, the number of tones in one tone subset is controlled to be different than the number of tones in another tone subset. In some embodiments some of the tone subsets are null sets. The control signals from the frequency transmit splitting control module 2704 determine the characteristics of the tone subsets, e.g., number and selection of tones in a given tone subset, and identifies each tone subset with a specific transmit chain/transmit antenna at specified time intervals. The baseband module 2706 outputs signals to a plurality of transmit chains (transmit chain 1 2707, transmit chain N 2707'). Information 2702 input to the baseband unit 2706 is routed to one or more of the transmit chains 2707, 2707' as a function of control signals from the frequency transmit splitting control module 2704. For a given OFDM symbol transmission time interval, the baseband unit 2706 maps the information bits to be transmitted to a set of tones to be used for transmission, and then identifies subsets of tones with its associated transmitter chain/transmitter antenna (2707/2114, 2707'/2714') pair; this information is conveyed in a digital format to the digital signal processing modules (2708, 2708'). Each transmit chain (2707, 2707') includes a digital signal processing block (2708, 2708'), a digital-to-analog conversion block (2710, 2710'), and an analog signal processing block (2712, 2712'), respectively. The digital signal processing blocks (2708, 2708') converts the received information to digital signals to be communicated. The digital-to-analog conversion modules (2710, 2710') convert the digital signals to analog signals, e.g., analog modulation symbols on selected tones or sub-carrier frequencies using a selected carrier frequency, and the analog signal processing chain (2712, 2712') performs additional analog signal processing, e.g., amplifying and filtering the signal to be transmitted. Each analog signal processing block (2712, 2712') is coupled to a transmit antenna (transmit antenna 1 2714, transmit antenna N 2714'), respectively. Different the analog signals are transmitted through a plurality of antennas (transmit antenna 1 2714, transmit antenna N 2714') simultaneously, the composite of the analog signals including the set of original encoded information bits included in information 2702.

Figure 28:
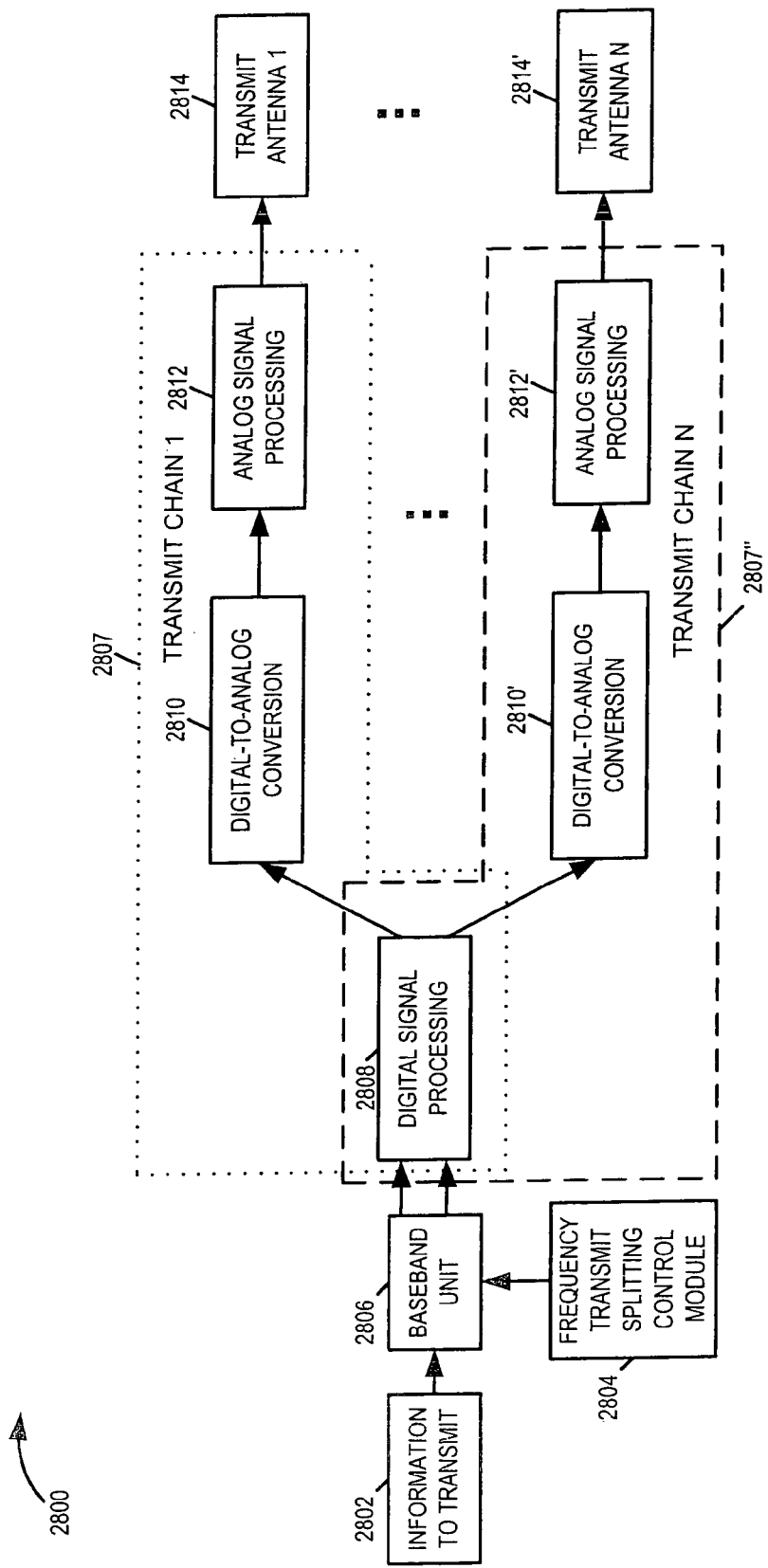
FIG. 28 is a drawing illustrating an exemplary variation of the transmitter configuration of FIG. 27 including commonality in the digital section, in accordance with the present invention.

FIG. 28 is a drawing 2800 illustrating another exemplary transmitter configuration which may be used in tone-splitting embodiments of the present invention. The various elements (2802, 2804, 2806, 2810, 2812, 2814, 2810', 2812', 2814') of FIG. 28 are similar or the same as elements (2702, 2704, 2706, 2710, 2712, 2714, 2710', 2712', 2714'), respectively, of FIG. 27 which have been previously described. Transmitter chain 1 2807 and transmitter chain N 2807' of FIG. 28 are similar to chains (2707, 2707') of FIG. 27; however, chains 2807 and 2807' share a common digital signal processing block 2808. The common digital signal processing block 2808 performs both the functions of digital signal processing block 2708 and 2708', e.g., on a time shared basis, providing efficiencies in terms of hardware cost, reduced weight, reduced size, and/or lower power consumption.

Figure 29:
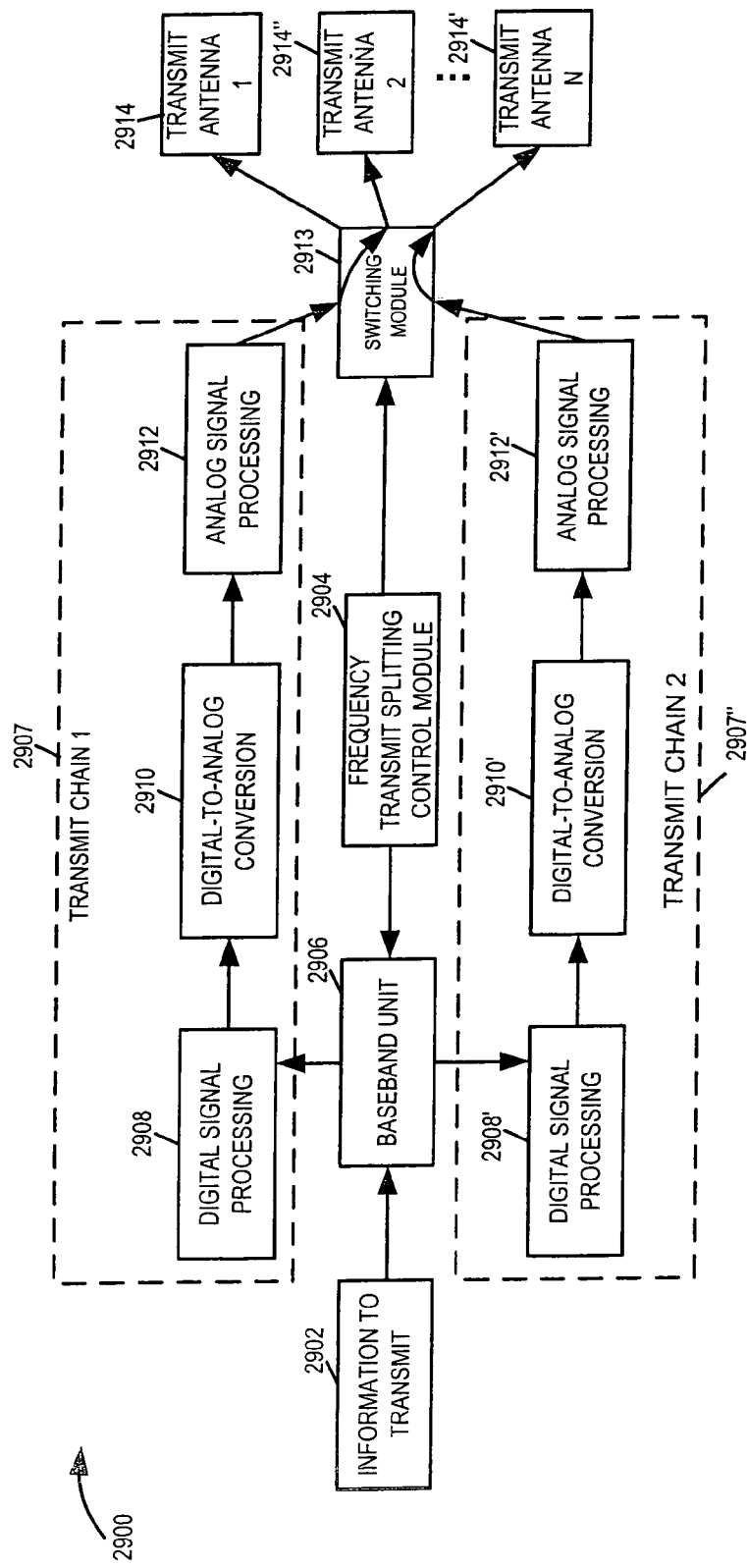
FIG. 29 is a drawing illustrating another variation of the transmitter configuration of FIG. 27, including only two transmit chains, an antenna switching module, and more than two transmitter antennas, in accordance with the present invention.

FIG. 29 is a drawing 2900 illustrating another exemplary transmitter configuration which may be used in tone-splitting embodiments of the present invention. The various elements (2902, 2906, 2908, 2910, 2912, 2808', 2810', 2812') of FIG. 29 are similar or the same as elements (2702, 2706, 2708, 2710, 2712, 2708', 2710', 2712'), respectively, of FIG. 27 which have been previously described. The transmitter 2900 of FIG. 29 includes two transmit chains (transmit chain 1 2907, transmit chain 2 2907"), while the transmitter 2700 of FIG. 27 includes N transmitter chains. Both transmitter 2700 and transmitter 2900 include N antennas or antenna elements. The transmitter 2900 of FIG. 29 uses an additional antenna switching module 2813 to couple two of the antennas (antenna 1 2914, antenna 2 2914", antenna N 2914') to the transmitter chains at any given time. As shown in FIG. 29, transmit chain 1 2907 is presently coupled to transmit antenna 2 2914", while transmit antenna N 2914' is coupled to transmit chain 2 2907". Frequency transmit splitting control module 2904, in addition to performing the function of module 2904 of FIG. 27, performs selection and control of antenna matching to transmit chain, and module 2904 sends control signals to the switching module 2913.

In some embodiments, the plurality of antennas or antenna elements used to obtain diversity, in accordance with the methods of the present invention, may be mounted or situated remotely from the mobile communications device, e.g., at different locations on a vehicle.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, antenna switching, message generation and/or transmission steps. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A wireless terminal for use in a communication system including a base station, the wireless terminal comprising:
   a transmitter signal processing chain including a switching module for coupling said transmitter chain to a plurality of antenna elements, said switching module configured to perform switching on signal boundaries corresponding to base station channel estimation memory reset points but not in between, said plurality of antenna elements including at least a first antenna element and a second antenna element each of which can be used independently; and
   a switching control module configured to control the switching module during a first period of time to switch between said first and second antenna elements on at least some signal boundaries corresponding to base station channel estimation memory reset points which occur during said first period of time to thereby change the antenna element used to transmit signals from said transmitter signal processing chain, each switch, during said first period of time, being preceded and followed by at least one dwell, a dwell being a period of time during which said wireless terminal uses a single set of tones to transmit signals to said base station, a different set of tones being used in immediately consecutive dwells during said first period of time.

2. The wireless terminal of claim 1, wherein said switching module switches between said first and second antenna elements according to a predetermined switching sequence.

3. The wireless terminal of claim 1, wherein said transmitter signal processing chain is an orthogonal frequency division multiplexing (OFDM) signal processing chain.

4. A wireless terminal for use in a communication system including a base station, the wireless terminal comprising:
   a transmitter signal processing chain including switching means for coupling said transmitter chain to a plurality of antenna elements, said switching means switching on signal boundaries corresponding to base station channel estimation memory reset points but not in between, said plurality of antenna elements including at least a first antenna element and a second antenna element each of which can be used independently; and
   switching control means for controlling the switching means during a first period of time to switch between said first and second antenna elements on at least some signal boundaries corresponding to base station channel estimation memory reset points which occur during said first period of time to thereby change the antenna element used to transmit signals from said single transmitter signal processing chain, each switch during said first period of time being preceded and followed by at least one dwell, a dwell being a period of time during which said wireless terminal uses a single set of tones to transmit signals to said base station, a different set of tones being used in immediately consecutive dwells during said first period of time.

5. The wireless terminal of claim 4, wherein said switching means switches between said first and second antenna elements according to a predetermined switching sequence.

6. The wireless terminal of claim 4, wherein said transmitter signal processing chain is an orthogonal frequency division multiplexing (OFDM) signal processing chain.

7. A computer readable medium including machine executable instructions, for use in a wireless terminal in a communication system including a base station, said wireless terminal including a transmitter signal processing chain including a switching module for coupling said single transmitter chain to a plurality of antenna elements, the computer readable medium comprising:
   instructions for causing said switching module to perform switching on signal boundaries corresponding to base station channel estimation memory reset points but not in between, said plurality of antenna elements including at least a first antenna element and a second antenna element each of which can be used independently; and
   instructions for causing the switching module, during a first period of time, to switch between said first and second antenna elements on at least some signal boundaries corresponding to base station channel estimation memory reset points which occur during said first period of time to thereby change the antenna element used to transmit signals from said single transmitter signal processing chain, each switch during said first period of time being preceded and followed by at least one dwell, a dwell being a period of time during which said wireless terminal uses a single set of tones to transmit signals to said base station, a different set of tones being used in immediately consecutive dwells during said first period of time.

8. A wireless terminal for use in a communications system including a base station, said wireless terminal the comprising:
   a transmitter processing chain including a switching module for coupling said transmitter processing chain to a plurality of antenna elements, said switching module configured to switch on signal boundaries corresponding to base station channel estimation reset points but not in between, a base station channel estimation reset point being a signal point where said base station transitions between channel estimation intervals and resets a channel estimate included in the base station, the channel estimation performed by a base station in a channel estimation interval immediately preceding a channel reset being independent of the channel estimation performed in a subsequent channel estimation interval immediately following the channel estimate reset, said plurality of antenna elements including at least a first antenna element and a second antenna element each of which can be used independently; and a switching control module configured to control the switching module during a first period of time to switch between said first and second antenna elements on at least some signal boundaries corresponding to base station channel estimation reset points which occur during said first period of time to thereby change the antenna element used to transmit signals from said transmitter signal processing chain.

9. The wireless terminal of claim 8, wherein said switching module switches between said first and second antenna elements according to a predetermined switching sequence.

10. The wireless terminal of claim 8, wherein said transmitter processing chain is an orthogonal frequency division multiplexing (OFDM) signal processing chain.

11. A wireless terminal for use in a communications system including a base station, said wireless terminal the comprising:

a transmitter processing chain including switching means for coupling said transmitter processing chain to a plurality of antenna elements, said switching means switching on signal boundaries corresponding to base station channel estimation reset points but not in between, a base station channel estimation reset point being a signal point where said base station transitions between channel estimation intervals and resets a channel estimate included in the base station, the channel estimation performed by a base station in a channel estimation interval immediately preceding a channel reset being independent of the channel estimation performed in a subsequent channel estimation interval immediately following the channel estimate reset, said plurality of antenna elements including at least a first antenna element and a second antenna element each of which can be used independently; and switching control means for controlling the switching means, during a first period of time, to switch between said first and second antenna elements on at least some signal boundaries corresponding to base station channel estimation reset points which occur during said first period of time to thereby change the antenna element used to transmit signals from said transmitter signal processing chain.

12. The wireless terminal of claim 11, wherein said switching means switches between said first and second antenna elements according to a predetermined switching sequence.

13. The wireless terminal of claim 11, wherein said transmitter processing chain is an orthogonal frequency division multiplexing (OFDM) signal processing chain.

14. A computer readable medium including machine executable instructions, for use in a wireless terminal in a communications system including a base station, said wireless terminal including a transmitter processing chain including a switching module for coupling said transmitter processing chain to a plurality of antenna elements, the computer readable medium comprising:

instructions for causing the switching module to switch on signal boundaries corresponding to base station channel estimation reset points but not in between, a base station channel estimation reset point being a signal point where said base station transitions between channel estimation intervals and resets a channel estimate included in the base station, the channel estimation performed by a base station in a channel estimation interval immediately preceding a channel reset being independent of the channel estimation performed in a subsequent channel estimation interval immediately following the channel estimate reset, said plurality of antenna elements including at least a first antenna element and a second antenna element each of which can be used independently; and instructions for causing the switching module to, during a first period of time, switch between said first and second antenna elements on at least some signal boundaries corresponding to base station channel estimation reset points which occur during said first period of time to thereby change the antenna element used to transmit signals from said single transmitter signal processing chain.

* * * * *

UNITED STATES PATENT AND TRADEMARK OFFICE
CERTIFICATE OF CORRECTION

PATENT NO. : 7,610,024 B2  Page 1 of 1
APPLICATION NO. : 11/284285
DATED : October 27, 2009
INVENTOR(S) : Laroia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,610,024 B2
APPLICATION NO. : 11/284285
DATED : October 27, 2009
INVENTOR(S) : Laroia et al.

It is certified that error appears in the above-identified patent and that said Letters Patent is hereby corrected as shown below:

Column 46, line 49, claim 8: "terminal the comprising:" to read as --terminal comprising:--

Column 47, line 17, claim 11: "terminal the comprising:" to read as --terminal comprising:--

Signed and Sealed this
Seventh Day of August, 2012

David J. Kappos
*Director of the United States Patent and Trademark Office*